United States Patent
Cui et al.

(10) Patent No.: US 12,483,671 B2
(45) Date of Patent: Nov. 25, 2025

(54) VIDEO PROCESSING METHOD AND ELECTRONIC DEVICE

(71) Applicant: Honor Device Co., Ltd., Shenzhen (CN)

(72) Inventors: Hantao Cui, Shenzhen (CN); Zuochao Zhang, Shenzhen (CN); Weilong Hou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/269,894

(22) PCT Filed: Jan. 3, 2023

(86) PCT No.: PCT/CN2023/070152
§ 371 (c)(1),
(2) Date: Jun. 27, 2023

(87) PCT Pub. No.: WO2023/207210
PCT Pub. Date: Nov. 2, 2023

(65) Prior Publication Data
US 2024/0314268 A1    Sep. 19, 2024

(30) Foreign Application Priority Data
Apr. 29, 2022   (CN) .................... 202210469119.8

(51) Int. Cl.
*G06T 3/40* (2024.01)
*H04N 7/01* (2006.01)

(52) U.S. Cl.
CPC ............. *H04N 7/013* (2013.01); *G06T 3/40* (2013.01); *H04N 7/0135* (2013.01)

(58) Field of Classification Search
CPC ......... H04N 7/013; H04N 7/0135; G06T 3/40
See application file for complete search history.

(56) References Cited

U.S. PATENT DOCUMENTS

| | | | |
|---|---|---|---|
| 6,424,789 B1 | 7/2002 | Abdel-Mottaleb |
| 9,558,784 B1 | 1/2017 | Gray et al. |
| 10,404,923 B1 | 9/2019 | Pena et al. |
| 11,197,039 B2 | 12/2021 | Obara |
| 2015/0221335 A1 | 8/2015 | Licata |
| 2015/0341547 A1 | 11/2015 | Petrescu et al. |
| 2016/0225405 A1 | 8/2016 | Matias et al. |
| 2018/0046353 A1 | 2/2018 | Lee et al. |
| 2018/0090170 A1 | 3/2018 | Weksler et al. |
| 2018/0268866 A1 | 9/2018 | Takahashi |

(Continued)

FOREIGN PATENT DOCUMENTS

| | | |
|---|---|---|
| CN | 109120992 A | 1/2019 |
| CN | 109714644 A | 5/2019 |
| CN | 109964275 A | 7/2019 |

(Continued)

*Primary Examiner* — Yassin Alata
(74) *Attorney, Agent, or Firm* — Slater Matsil, LLP

(57) ABSTRACT

Embodiments of this application provide a video processing method and an electronic device, and relate to the field of terminal technologies. When recording a video, the electronic device collects image frames based on a first frame rate, and generates an original video file; automatically performs frame interpolation or frame extraction processing on image frames in the original video file that include a specified action; and plays a processed video file based on the first frame rate.

20 Claims, 35 Drawing Sheets

(56) References Cited

U.S. PATENT DOCUMENTS

| 2022/0230438 | A1 | 7/2022 | Chen et al. |
| 2022/0301351 | A1 | 9/2022 | Zhao et al. |

FOREIGN PATENT DOCUMENTS

| CN | 110769158 | A | 2/2020 |
| CN | 111800652 | A | 10/2020 |
| CN | 112422863 | A | 2/2021 |
| CN | 112532865 | A | 3/2021 |
| CN | 112532880 | A | 3/2021 |
| CN | 112532903 | A | 3/2021 |
| CN | 113067994 | A | 7/2021 |

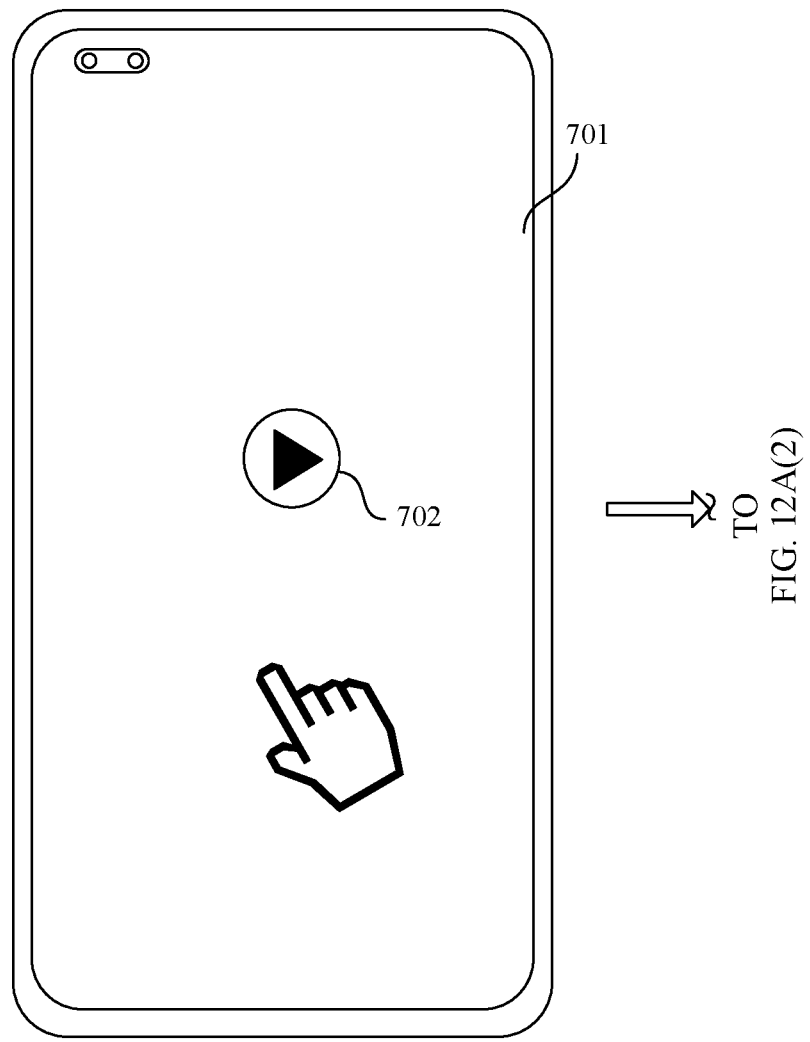
FIG. 12A(1)

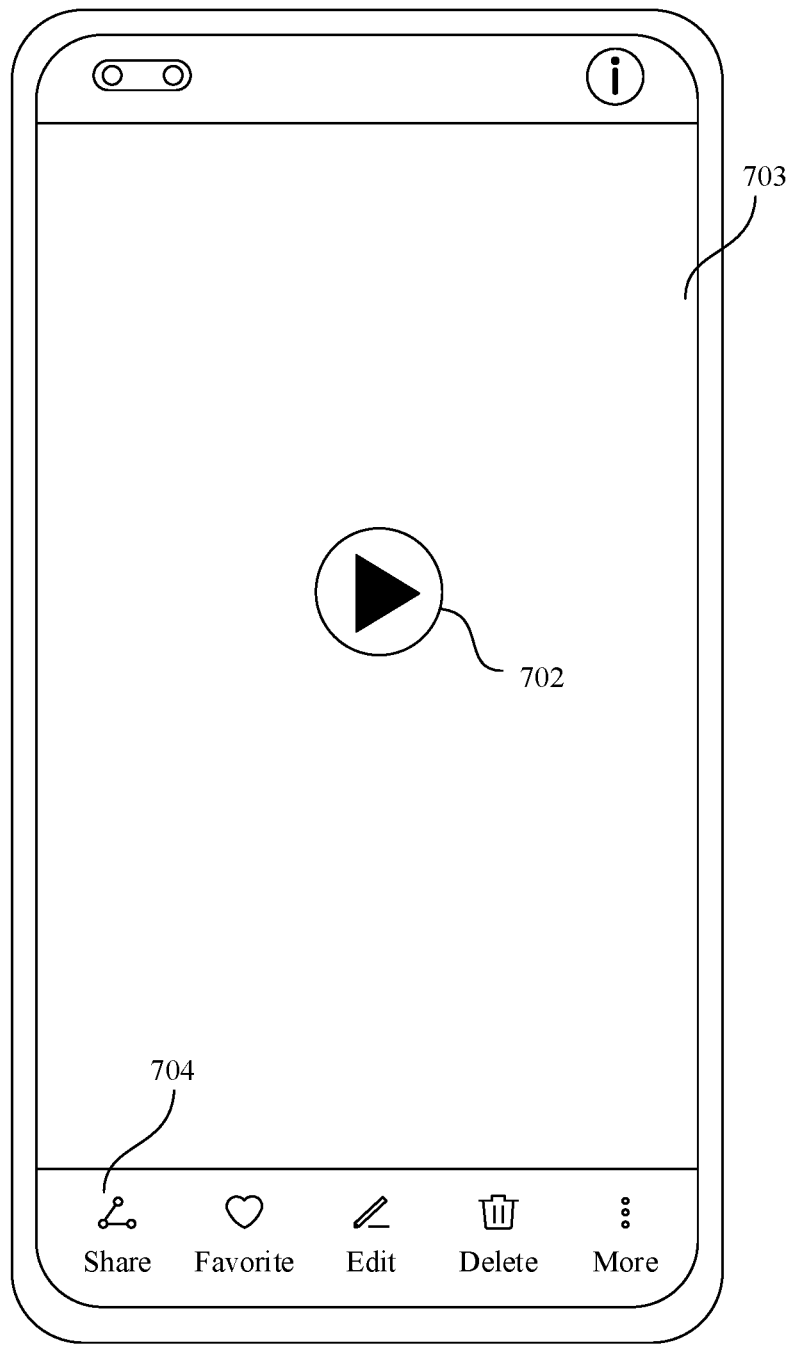
FIG. 12A(2)

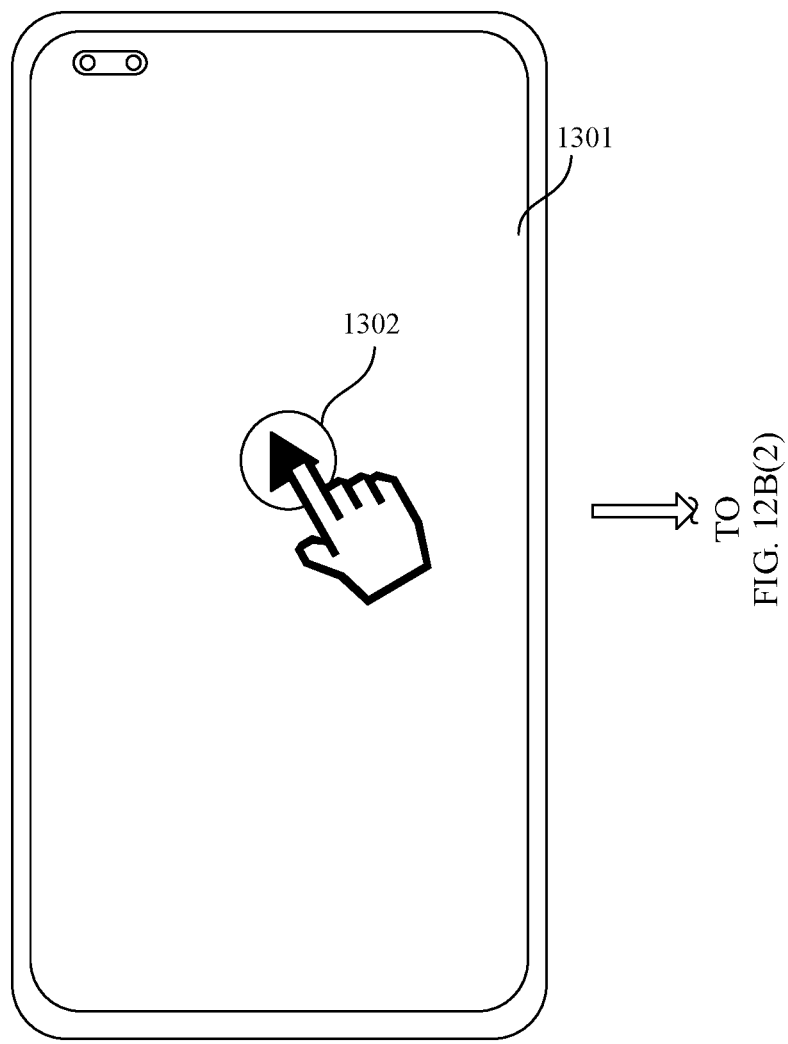
FIG. 12B(1)

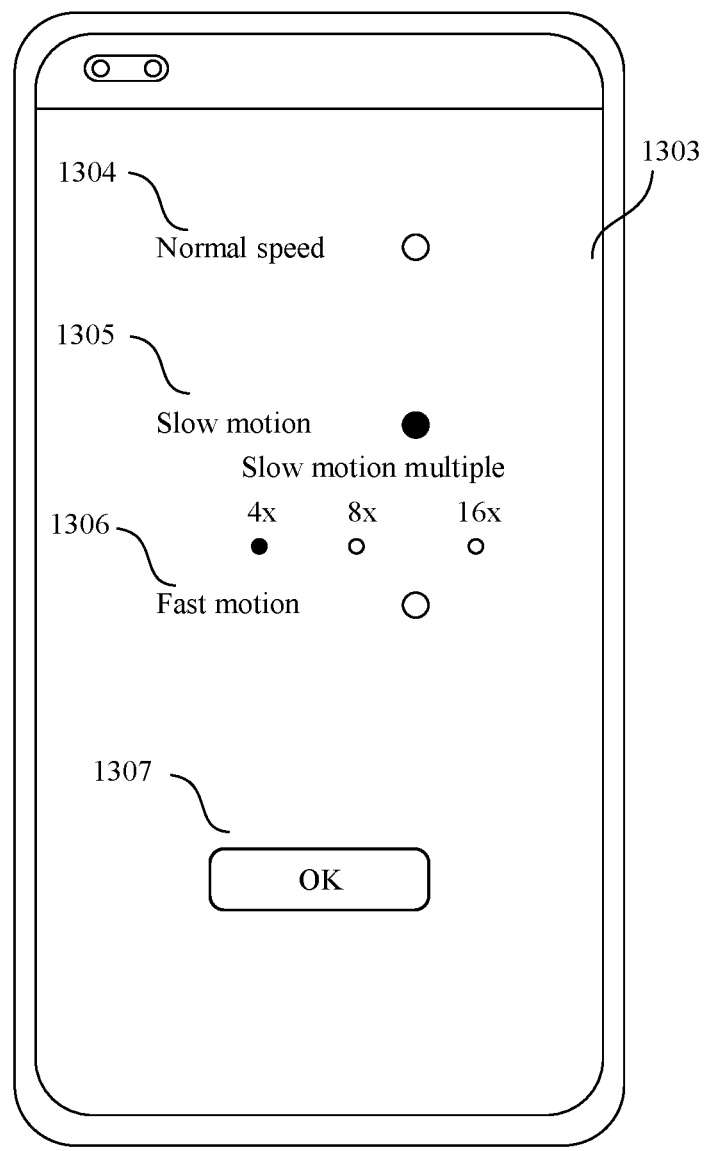
FIG. 12B(2)

S2101: An electronic device obtains a first video file, where the first video file includes first image frames and first audio frames, and a shooting frame rate of the first image frames is a first frame rate

S2102: The electronic device obtains, based on a mark file and the first video file, a first video part in the first image frames that does not include a speech

S2103: The electronic device processes the first video part to generate a third video part

S2104: The electronic device replaces the first video part in the first video file with the third video part to generate a second video file

S2105: The electronic device plays the second video file based on the first frame rate

FIG. 21

VIDEO PROCESSING METHOD AND ELECTRONIC DEVICE

CROSS-REFERENCE TO RELATED APPLICATIONS

This application is a national stage of International Application No. PCT/CN2023/070152 filed on Jan. 3, 2023, which claims priority to Chinese Patent Application No. 202210469119.8 filed on Apr. 29, 2022. The disclosures of both of the aforementioned application are hereby incorporated by reference in their entireties.

TECHNICAL FIELD

This application relates to the field of terminal technologies, and in particular, to a video processing method and an electronic device.

BACKGROUND

Generally, an electronic device plays a video at a fixed playing frame rate. For example, a playing frame rate of a movie is 24 fps (frames per second). 24 fps is accompanied by natural motion blur, and brings smooth viewing feeling for moving images. In other words, 24 fps represents the sense of movie. A playing frame rate of a video on a mobile phone is also usually 24 fps.

Usually, when a shooting frame rate of a video is the same as a playing frame rate of the video, natural and smooth viewing feeling can be brought to a user. In some scenarios, a shooting frame rate of a video may be different from a playing frame rate of the video. For example, when the shooting frame rate of the video is greater than the playing frame rate of the video, a slow-motion effect is generated; and when the shooting frame rate of the video is less than the playing frame rate of the video, a fast-motion effect is generated. Slow motion or fast motion helps express a special emotion, thereby improving viewing feeling of the user. Slow-motion and fast-motion shooting formats are widely welcomed by users.

However, slow-motion and fast-motion shooting technologies relate to understanding of narrative scenes and adjustment of professional parameters. It is difficult for an ordinary user to control the technologies, and therefore the ordinary user often cannot shoot an ideal slow-motion or fast-motion video.

SUMMARY

Embodiments of this application provide a video processing method and an electronic device, to automatically generate a slow-motion video or a fast-motion video with a relatively good effect without a manual operation of a user.

To achieve the foregoing objective, the following technical solutions are used in the embodiments of this application.

According to a first aspect, a video processing method is provided. The method is applied to an electronic device, the electronic device includes a photographing apparatus, and the method includes: in response to an operation of starting to record a video, the electronic device collects image frames based on a first frame rate by using the photographing apparatus; when receiving an operation of ending recording of the video, the electronic device stops collecting image frames, and generates a first video file, where the first video file includes a first video part including first image frames and a second video part including second image frames, and the first image frames include a specified action; the electronic device processes the first video file to generate a second video file, where the second video file includes a third video part and the second video part, the third video part is obtained by processing the first video part, and a quantity of image frames in the third video part is different from a quantity of image frames in the first video part; and the electronic device plays the second video file based on the first frame rate.

In this method, when recording the video, the electronic device collects the image frames based on the first frame rate, and generates an original video file; after recording ends, automatically performs processing (for example, frame interpolation or frame extraction) on image frames in the original video file that include the specified action; and plays a processed video file based on the first frame rate. Therefore, slow-motion playing or fast-motion playing is automatically performed on image frames in a video that include a specified action, and a user does not need to manually capture the specified action. In addition, the video is recorded at a shooting frame rate that is the same as a playing frame rate, so that recording at a high frame rate can be avoided. In this way, use of an advanced capability such as DCG or PDAF during video recording can be supported, thereby improving video quality.

In an example, when receiving an operation of sharing the video, the electronic device forwards the second video file. The processed video file is forwarded. In this way, another electronic device receives the second video file, and plays the second video file, to implement slow-motion playing or fast-motion playing in a motion interval.

With reference to the first aspect, in an implementation, before the electronic device processes the first video file, the method further includes: the electronic device marks the image frames in the first video file that include the specified action, and generates mark information. The mark information includes specified-action start information and specified-action end information.

In this method, after the video is successfully recorded and an original video stream is obtained, image frames in the original video stream that include the specified action are marked. In this way, the image frames including the specified action can be directly determined based on the mark information and the original video stream.

With reference to the first aspect, in an implementation, before the electronic device marks the image frames in the first video file that include the specified action, the method further includes: performing resolution reduction processing on image frames collected by the photographing apparatus, to obtain corresponding low-resolution image frames; and detecting the specified action in the low-resolution image frames.

In this method, instead of a full-resolution preview stream, a low-resolution preview stream is analyzed. In this way, a processing speed of a video pre-processing algorithm unit can be improved, thereby improving performance.

With reference to the first aspect, in an implementation, the electronic device obtains the first video part based on the mark information and the first video file.

With reference to the first aspect, in an implementation, the method further includes: when receiving an operation of editing the video, the electronic device displays a first interface, where the first interface includes some or all image frames of the first video file; and when receiving an operation in which a user modifies, in the first interface, an image frame interval range including the specified action, the electronic device updates the mark information based on a modified image frame interval range including the specified action.

In this method, the user is supported in manually adjusting the image interval including the specified action.

With reference to the first aspect, in an implementation, after receiving an operation of playing the video, the electronic device processes the first video file.

With reference to the first aspect, in an implementation, the electronic device performs frame interpolation processing on the first video sub-file, where playing duration of the second video file is greater than shooting duration of the first video file. In other words, automatic slow-motion playing is implemented.

With reference to the first aspect, in an implementation, the electronic device performs frame extraction processing on the first video file, where playing duration of the second video file is less than shooting duration of the first video file. In other words, automatic fast-motion playing is implemented.

With reference to the first aspect, in an implementation, the electronic device includes a recording apparatus, and the method further includes: in response to the operation of starting to record the video, the electronic device collects audio frames by using the recording apparatus; when receiving the operation of ending recording of the video, the electronic device stops collecting audio frames, and generates first audio frames in the first video file, where the first audio frames include a first audio part corresponding to the first video part on a timeline and a second audio part corresponding to the second video part on the timeline; performs speech recognition on the first audio part, and generates text corresponding to a first audio sub-part that is in the first audio part and that includes a speech; when the electronic device plays the second video file, displays the text in a caption form in a first video sub-part in the third video part, where the first video sub-part in the third video part is obtained by performing frame interpolation processing on a second video sub-part in the first video part, and the second video sub-part is image frames corresponding to the first audio sub-part on the timeline.

In this method, if the specified-action interval in the video includes the speech, text recognition is performed on the speech, and the text is displayed in the caption form in image frames that undergo slow-motion processing.

In an implementation, duration of the first audio sub-part is first duration, display duration of the text is N times the first duration, and N is a frame interpolation multiple of frame interpolation processing.

In an implementation, duration of an audio frame corresponding to first text in the text is first duration, display duration of the first text is N times the first duration, and N is a frame interpolation multiple of frame interpolation processing.

In other words, caption display duration matches images obtained after slow-motion processing.

With reference to the first aspect, in an implementation, the first frame rate is 24 frames per second.

According to a second aspect, a video processing method is provided. The method is applied to an electronic device, and the method includes: the electronic device obtains a first video file, where the first video file includes first image frames and first audio frames, and a shooting frame rate of the first image frames is a first frame rate, where the first audio frames include a first audio part including second audio frames and a second audio part including third audio frames, and the third audio frames include a speech; and the first image frames include a first video part including second image frames and a second video part including third image frames, the second image frames correspond to the second audio frames on a timeline, and the third image frames correspond to the third audio frames on the timeline; the electronic device processes the first video file to generate a second video file, where the second video file includes a third video part and the second video part, the third video part is obtained by processing the first video part, and a quantity of image frames in the third video part is different from a quantity of image frames in the first video part; and the electronic device plays the second video file based on the first frame rate.

In this method, the electronic device obtains a video, where the video may be shot by the electronic device or received from another electronic device; automatically performs processing (for example, frame interpolation or frame extraction) on image frames in a video file that do not include a speech; and plays a processed video file based on a playing frame rate that is equal to a shooting frame rate. Therefore, slow-motion playing or fast-motion playing is automatically performed on a part that is in a video and that does not include a speech, without manual processing of a user; and a part that is in the video and that includes the speech is not processed, to retain hearing feeling of original sound.

With reference to the second aspect, in an implementation, when receiving an operation of sharing the video, the electronic device forwards the second video file. In this way, another electronic device receives the second video file, and plays the second video file, to implement slow-motion playing or fast-motion playing in a motion interval.

With reference to the second aspect, in an implementation, the method further includes: when playing the third video part in the second video file, the electronic device stops playing audio frames; and when playing the second video part in the second video file, the electronic device plays the third audio frames. In other words, when a video interval including the speech is played, original video sound is played.

With reference to the second aspect, in an implementation, the method further includes: when playing the third video part in the second video file, the electronic device plays a soundtrack at first volume; and when playing the second video part in the second video file, the electronic device plays the soundtrack at second volume, where the second volume is less than the first volume, and the second volume is less than playing volume of the original video sound.

In this method, a soundtrack is automatically matched for a processed video. In addition, during fast-motion playing or slow-motion playing, sound of the soundtrack is high, and when a normal-speed video is played, original video sound is played, and sound of the soundtrack is low.

In an implementation, a corresponding soundtrack may be matched based on an overall atmosphere of the video.

With reference to the second aspect, in an implementation, that the electronic device processes the first video sub-file includes: the electronic device performs frame interpolation processing on the first video file, where playing duration of the second video file is greater than shooting duration of the first video file. In other words, automatic slow-motion playing is implemented.

With reference to the second aspect, in an implementation, that the electronic device processes the first video sub-file includes: the electronic device performs frame extraction processing on the first video file, where playing duration of the second video file is less than shooting duration of the first video file. In other words, automatic fast-motion playing is implemented.

With reference to the second aspect, in an implementation, the electronic device includes a photographing apparatus and a recording apparatus, and that the electronic device obtains the first video file includes: in response to an operation of starting to record the video, the electronic device collects image frames based on the first frame rate by using the photographing apparatus, and collects audio frames by using the recording apparatus; and when receiving an operation of ending recording of the video, the electronic device stops collecting image frames and audio frames, and generates the first video file.

With reference to the second aspect, in an implementation, before processing the first video file, the electronic device receives an operation of playing the video. In other words, after receiving the operation of playing the video, the electronic device automatically processes image frames that do not include the speech.

With reference to the second aspect, in an implementation, before the electronic device processes the first video file, the method further includes: before receiving the operation of playing the video, the electronic device marks the image frames corresponding to the third audio frames on the timeline, and generates mark information; and the electronic device obtains the first video part based on the mark information and the first video file.

With reference to the second aspect, in an implementation, when receiving an operation of editing the video, the electronic device displays a first interface, where the first interface includes some or all image frames of the first video file; and when receiving an operation in which a user modifies, in the first interface, an image frame interval range corresponding to audio frames including the speech, the electronic device updates the mark information based on a modified image frame interval range corresponding to the audio frames including the speech.

In this method, the user is supported in manually adjusting an image interval in which fast-motion or slow-motion processing is performed.

With reference to the second aspect, in an implementation, the first frame rate is 24 frames per second.

According to a third aspect, an electronic device is provided. The electronic device has a function of implementing the method according to the first aspect or the second aspect. The function may be implemented by hardware, or may be implemented by hardware by executing corresponding software. The hardware or software includes one or more modules corresponding to the function.

According to a fourth aspect, an electronic device is provided. The electronic device includes a processor and a memory. The memory is configured to store computer-executable instructions. When the electronic device runs, the processor executes the computer-executable instructions stored in the memory, to enable the electronic device to perform the method according to either of the first aspect or the second aspect.

According to a fifth aspect, an electronic device is provided. The electronic device includes a processor. The processor is configured to: after being coupled to a memory and reading instructions in the memory, perform the method according to either of the first aspect or the second aspect according to the instructions.

According to a sixth aspect, a computer-readable storage medium is provided. The computer-readable storage medium stores instructions. When the instructions run on a computer, the computer is enabled to perform the method according to either of the first aspect or the second aspect.

According to a seventh aspect, a computer program product including instructions is provided. When the computer program product runs on a computer, the computer is enabled to perform the method according to either of the first aspect or the second aspect.

According to an eighth aspect, an apparatus (for example, the apparatus may be a chip system) is provided. The apparatus includes a processor, configured to support an electronic device in implementing the function in the first aspect or the second aspect. In a possible design, the apparatus further includes a memory. The memory is configured to store necessary program instructions and data of the electronic device. When the apparatus is a chip system, the apparatus may include a chip, or may include a chip and another discrete device.

For technical effects brought by any one of design manners in the third aspect to the eighth aspect, refer to the technical effects brought by different design manners in the first aspect or the second aspect. Details are not described herein again.

BRIEF DESCRIPTION OF THE DRAWINGS

FIG. 12A(1) and FIG. 12A(2) are schematic diagrams of an example of a scenario of a video processing method according to an embodiment of this application;

FIG. 12B(1) and FIG. 12B(2) are schematic diagrams of an example of a scenario of a video processing method according to an embodiment of this application;

FIG. 21 is a schematic flowchart of a video processing method according to an embodiment of this application.

DETAILED DESCRIPTION OF ILLUSTRATIVE EMBODIMENTS

Figure 1A:
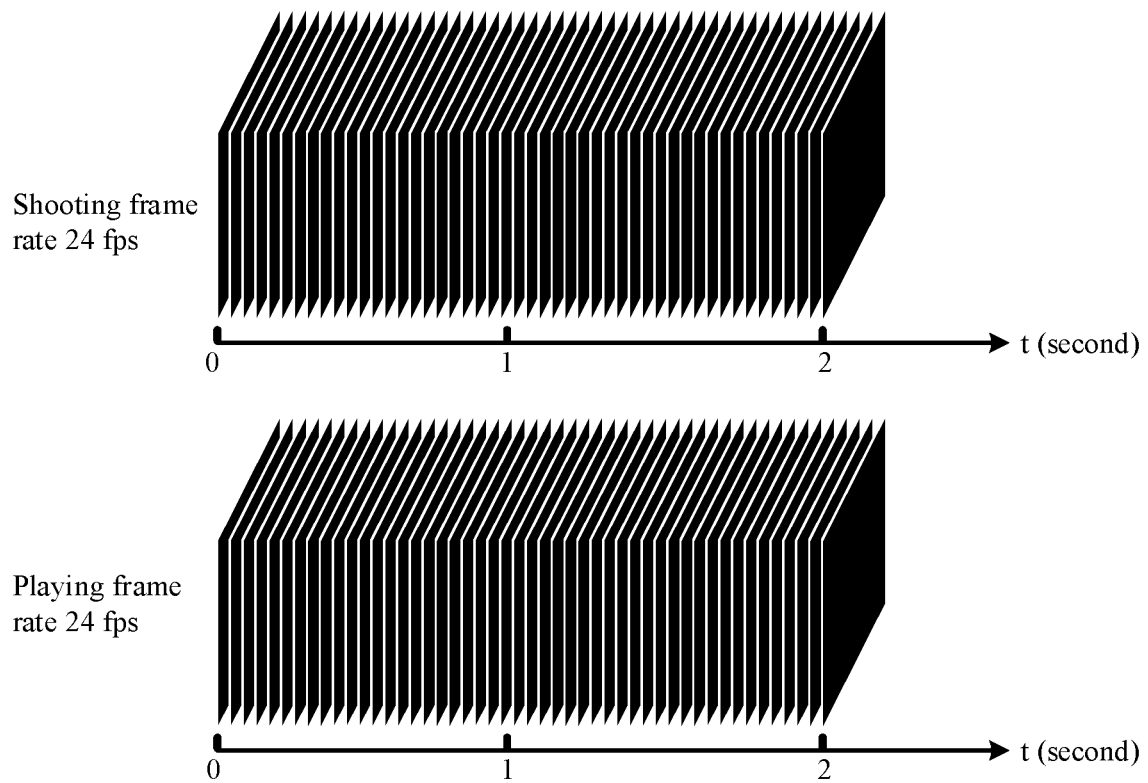
FIG. 1A is a schematic diagram of an example of video collection and playing.

The following describes technical solutions in embodiments of this application with reference to accompanying drawings in the embodiments of this application. In description of the embodiments of this application, terms used in the following embodiments are only intended to describe particular embodiments, and are not intended to limit this application. As used in this specification and the appended claims of this application, singular expressions "a", "the", "the foregoing", and "this" are also intended to include an expression such as "one or more", unless otherwise clearly specified in the context. It should be further understood that, in the following embodiments of this application, "at least one" and "one or more" mean one or at least two (including two). The term "and/or" is used to describe an association relationship between associated objects, and indicates that three relationships may exist. For example, A and/or B may represent the following cases: Only A exists, both A and B exist, and only B exists. A and B may be singular or plural. The character "/" generally indicates an "or" relationship between associated objects.

As described in this specification, referring to "an embodiment", "some embodiments", or the like means that one or more embodiments of this application include particular features, structures, or characteristics described with reference to the embodiment. Therefore, statements such as "in an embodiment", "in some embodiments", or "in some other embodiments" that appear in different parts of this application do not necessarily refer to same embodiments, but mean "one or more but not all embodiments", unless otherwise specially emphasized. The terms "include", "comprise", and "have" and variants thereof all mean "include but are not limited to", unless otherwise specially emphasized. The term "connection" includes a direct connection and an indirect connection, unless otherwise specified. The terms "first" and "second" are used for descriptive purposes only and should not be construed as indicating or implying relative importance or implicitly indicating a quantity of indicated technical features.

In the embodiments of this application, words such as "example" or "for example" are used to represent giving an example, an illustration, or a description. Any embodiment or design solution described as "example" or "for example" in the embodiments of this application should not be construed as being more preferred or advantageous than other embodiments or design solutions. Exactly, use of the words such as "example" or "for example" is intended to present a related concept in a specific manner.

A user may record a video by using an electronic device, and generate a video file; and may further play the video file, that is, play the video. The video file includes a video stream and an audio stream, the video stream is a set of image frames, and the audio stream is a set of audio frames. It should be noted that, in embodiments of this application, processing the video stream (for example, detecting the video stream) is processing a video including image frames, and processing the audio stream (for example, detecting the audio stream) is processing audio including audio frames. In the following embodiments, the video stream may be replaced with a video including image frames, and the audio stream may be replaced with audio including audio frames.

A quantity of image frames shot (recorded) by the electronic device in unit time is a shooting frame rate of a video, which is also referred to as a recording frame rate, a video frame rate, or the like. A quantity of image frames played by the electronic device in unit time is a playing frame rate of a video. In an example, a unit of the shooting frame rate or the playing frame rate is frames per second (frames per second, fps), representing a quantity of image frames shot or played per second.

It should be noted that the shooting frame rate and the playing frame rate in the embodiments of this application are frame rates of image frames. A frame rate of audio frames is related to an audio encoding format, and the frame rate of the audio frames is not necessarily equal to a frame rate of image frames, that is, the audio frames are not in a one-to-one correspondence with the image frames. The audio frames and the image frames are kept synchronized through consistency on a timeline.

Generally, when the electronic device normally records a video, a shooting frame rate is the same as a playing frame rate. For example, as shown in FIG. 1A, a mobile phone records a video whose duration is 2 seconds (s) based on a shooting frame rate of 24 fps, and plays the video based on a playing frame rate of 24 fps, where playing duration is also 2 s.

Figure 1B:
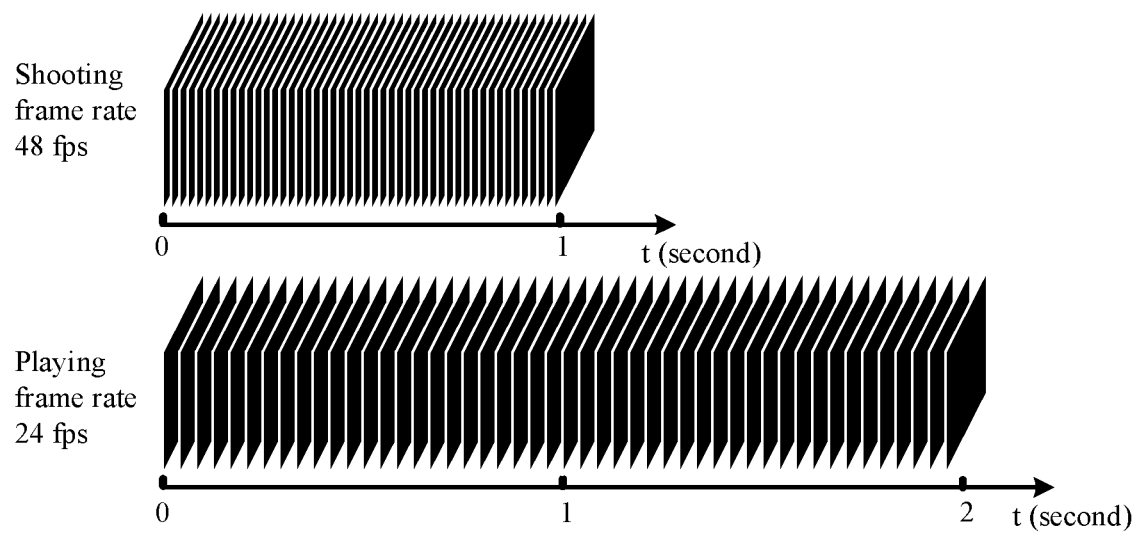
FIG. 1B is a schematic diagram of an example of video collection and playing.

In some scenarios, a shooting frame rate of a video file is greater than a playing frame rate of the video file. For example, as shown in FIG. 1B, a mobile phone records a video whose duration is 1s based on a shooting frame rate of 48 fps, and plays the video based on a playing frame rate of 24 fps. Playing duration of the video file is 2s. It may be learned that when a shooting frame rate is twice a playing frame rate, playing duration is twice shooting duration. In this way, a 2× slow-motion effect is generated.

Figure 1C:
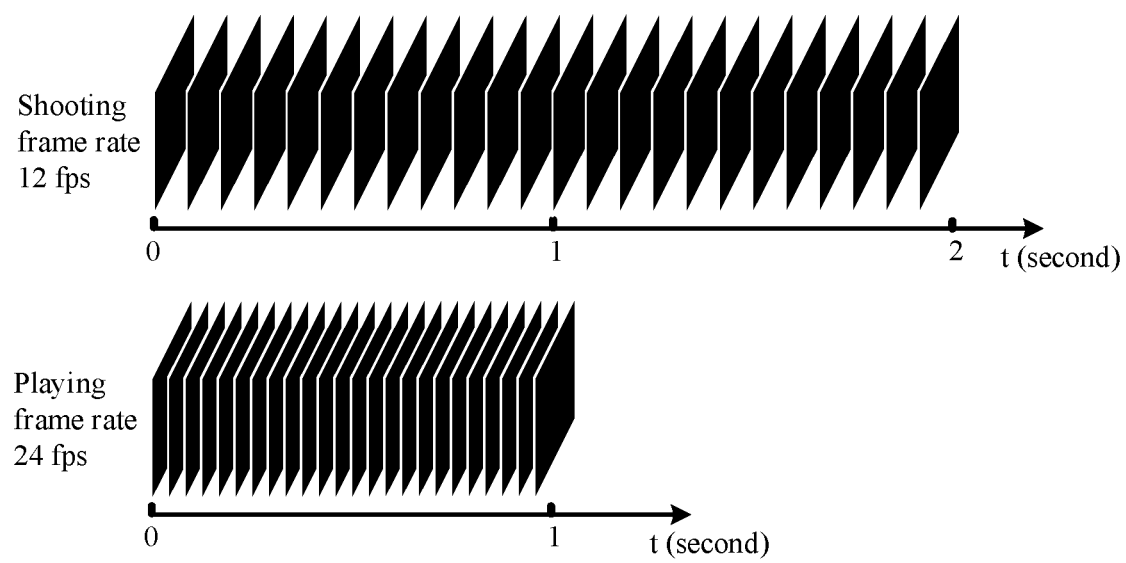
FIG. 1C is a schematic diagram of an example of video collection and playing.

In some other scenarios, a shooting frame rate of a video file is less than a playing frame rate of the video file. For example, as shown in FIG. 1C, a mobile phone records a video whose duration is 2s based on a shooting frame rate of 12 fps, and plays the video based on a playing frame rate of 24 fps. Playing duration of the video file is 1s. It may be learned that when a playing frame rate is twice a shooting frame rate, playing duration is half shooting duration. In this way, a 2× fast-motion effect is generated.

In a conventional technology, a shooting frame rate or a playing frame rate is generally adjusted, so that the shooting frame rate is different from the playing frame rate, thereby implementing a slow-motion effect or a fast-motion effect. However, in some scenarios, some shooting frame rates or playing frame rates affect video quality. For example, a playing frame rate of a video on a mobile phone is usually 24 fps. A high frame rate greater than 24 fps, such as 48 fps (for 2× slow motion) or 96 fps (for 4× slow motion), needs to be used to shoot a slow-motion video. However, due to a limitation of a sensor of the mobile phone, some advanced capabilities such as DCG (dual conversion gain) and phase detection auto-focus (phase detection auto-focus, PDAF) cannot be supported at the high frame rate greater than 24 fps, and consequently a frame effect of a slow-motion video is poorer than a frame effect of a normal-speed video.

According to a video processing method provided in the embodiments of this application, a video is recorded at a shooting frame rate that is the same as a playing frame rate. For example, both the playing frame rate and the shooting frame rate are 24 fps. In this way, an advanced capability such as DCG or PDAF can be used, thereby improving video quality.

In some embodiments, a video stream may be detected to determine image frames including a specified action.

In an example, the specified action is a motion action such as basketball shooting, long jump, shooting, or a racket swinging action during badminton playing. In an implementation, a frame interpolation operation is performed on the image frames including the specified action, and a video file that undergoes frame interpolation processing is played, so that slow-motion playing of the specified action is implemented. In another example, the specified action is a martial art action such as punching or kicking. In an implementation, a frame extraction operation is performed on the image frames including the specified action, and a video file that undergoes frame extraction processing is played, so that fast-motion playing of the specified action is implemented. According to the video processing method provided in the embodiments of this application, if it is detected that a video includes a specified action, slow-motion playing or fast-motion playing is automatically performed on a video interval including the specified action, and a user does not need to manually select a slow-motion playing or fast-motion playing region. Compared with a manner in which the user manually shoots a slow-motion video or a fast-motion video, this operation is more convenient, and it is easier to capture the specified action. It should be noted that the image frames including the specified action include an image frame (a start image frame) whose image includes a start action of the specified action, an image frame (an end image frame) whose image includes an end action of the specified action, and an image frame between the start image frame and the end image frame. For example, the specified action is long jump, the start action of the specified action is an action in which feet leave the ground, and the end action of the specified action is an action in which the feet touch the ground from the air. The start image frame is an image frame whose image includes the action in which the feet leave the ground, and the end image frame is an image frame whose image includes the action in which the feet touch the ground from the air.

Figure 2A:
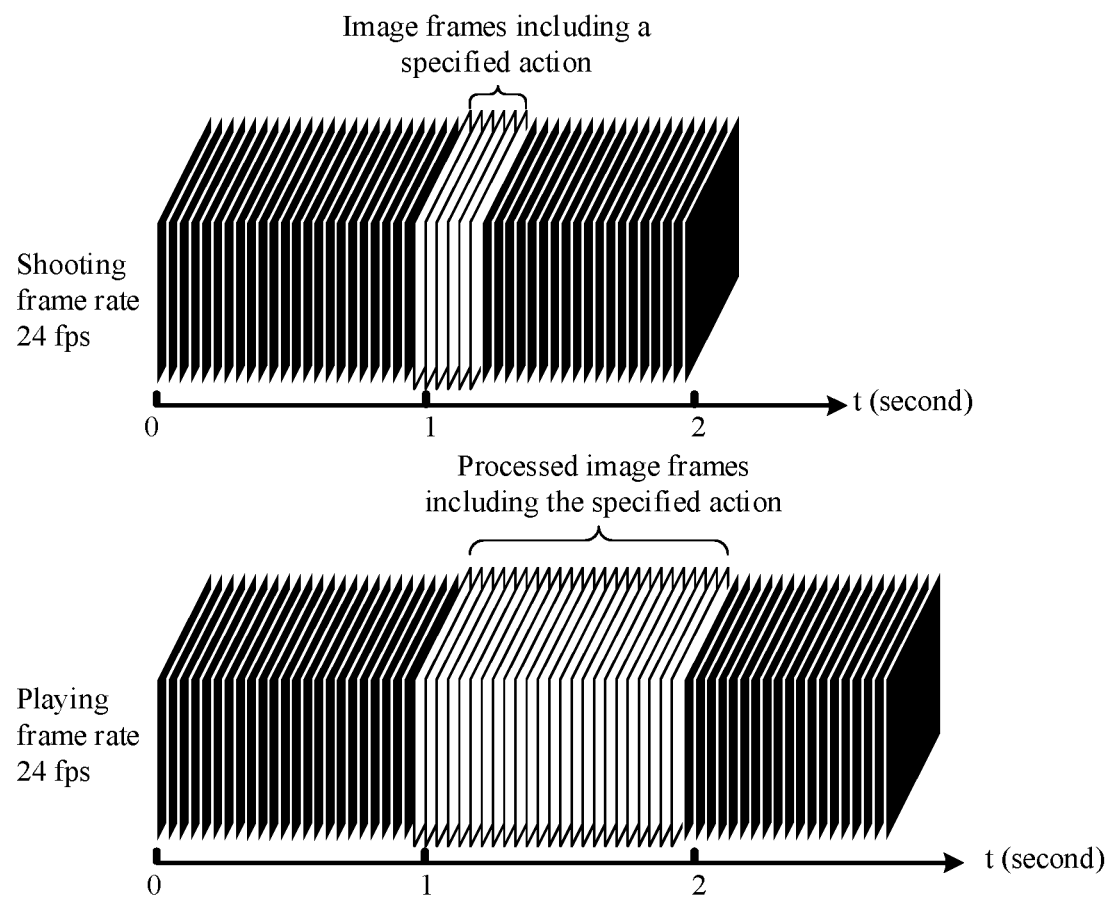
FIG. 2A is a schematic diagram of an example of an applicable scenario of a video processing method according to an embodiment of this application.

For example, as shown in FIG. 2A, a video file whose duration is 2s is recorded based on a shooting frame rate of 24 fps, and a specified action is detected in image frames, where it is detected that six frames are corresponding image frames including the specified action. A 4× frame interpolation operation is performed on the six frames of images. Three frames are interpolated between every two frames to obtain 24 frames of images. In other words, after processing, a video interval including the specified action is changed to 24 frames of images. In this way, when playing is performed based on a playing frame rate of 24 fps, playing duration of the video interval including the specified action becomes longer, thereby implementing a 4× slow-motion effect.

Figure 2B:
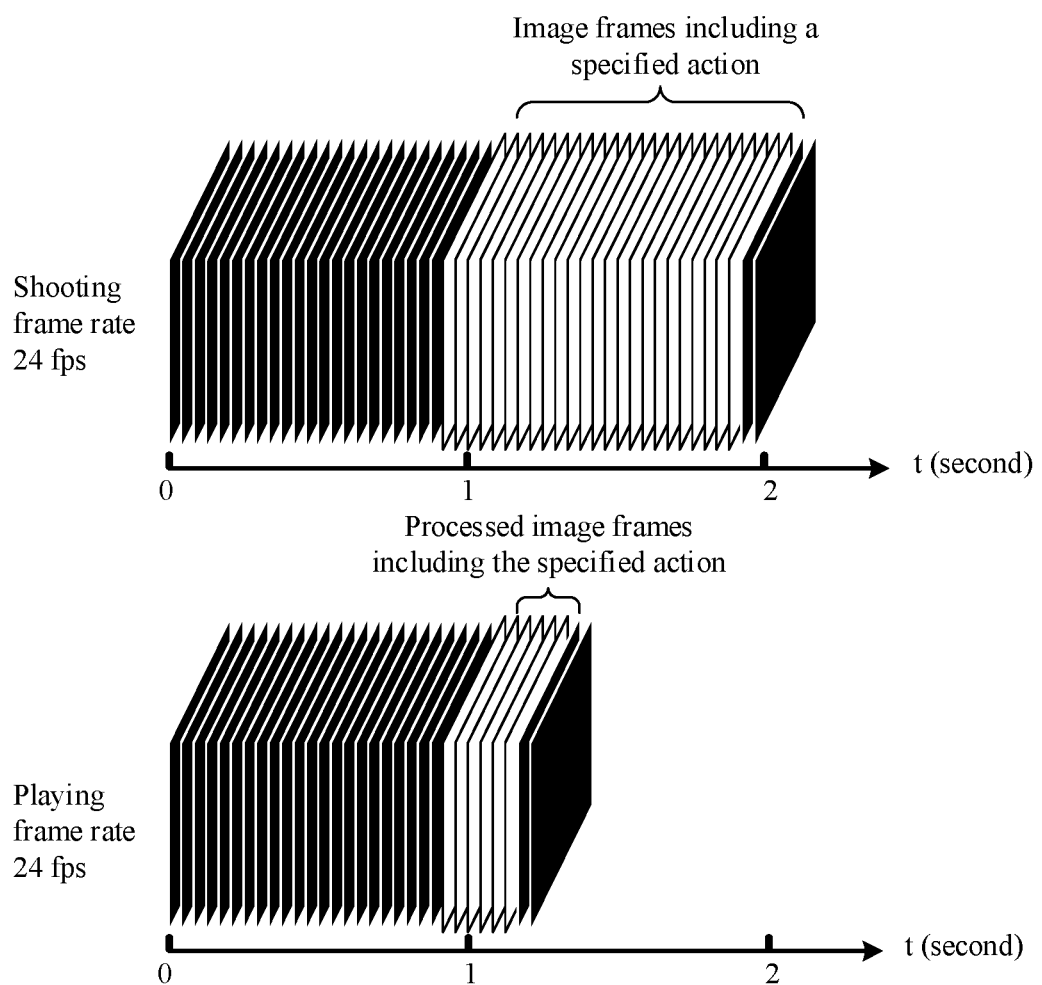
FIG. 2B is a schematic diagram of an example of an applicable scenario of a video processing method according to an embodiment of this application.

For example, as shown in FIG. 2B, a video file whose duration is 2s is recorded based on a shooting frame rate of 24 fps, and a specified action is detected in image frames, where it is detected that 24 frames are corresponding image frames including the specified action. Frame extraction processing is performed on the 24 frames of images. One frame is extracted from every four frames. In other words, after processing, a video interval including the specified action is changed to six frames of images. In this way, when playing is performed based on a playing frame rate of 24 fps, playing duration of the video interval including the specified action becomes shorter, thereby implementing a 0.25× fast-motion effect.

In some embodiments, an audio stream may be detected to determine audio frames including a speech, and determine image frames (referred to as image frames including the speech in the embodiments of this application) corresponding to the audio frames including the speech. Further, audio frames that do not include the speech may be determined, and image frames (referred to as image frames that do not include the speech in the embodiments of this application) corresponding to the audio frames that do not include the speech may be determined.

In an implementation, frame extraction processing is performed on a video stream, and a video file that undergoes frame extraction processing is played, so that a fast-motion playing effect can be implemented. According to the video processing method provided in the embodiments of this application, if a video includes a speech, frame extraction processing is performed on image frames (that is, image frames corresponding to audio frames that do not include the speech) that do not include the speech, frame extraction processing is not performed on image frames including the speech, and a processed video file is played. In this way, a fast-motion playing effect is implemented in a video interval that does not include the speech, and a video interval including the speech is normally played, so that hearing feeling of original sound of the speech can be retained, and damage caused by fast-motion playing to the speech is avoided.

Figure 2C:
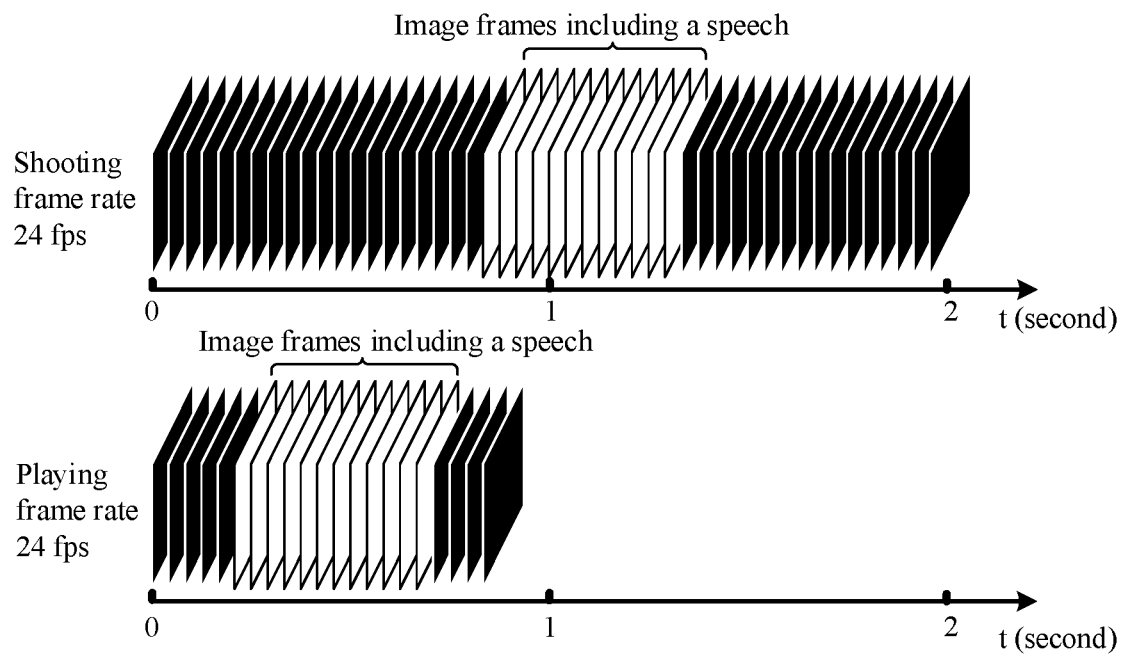
FIG. 2C is a schematic diagram of an example of an applicable scenario of a video processing method according to an embodiment of this application.

For example, as shown in FIG. 2C, a video file whose duration is 2s is recorded based on a shooting frame rate of 24 fps, and a speech is detected in an audio stream, where it is determined that 12 frames in a video stream are image frames including the speech. Frame extraction processing is performed on image frames that do not include the speech.

One frame is extracted from every four frames. Frame extraction processing is not performed on the 12 frames including the speech. In this way, when playing is performed based on a playing frame rate of 24 fps, playing duration of a video interval that does not include the speech becomes shorter, thereby implementing a 0.25× fast-motion effect. The image frames including the speech are normally played, thereby retaining hearing feeling of original sound of the speech.

In an implementation, frame interpolation processing is performed on a video stream, and a video file that undergoes frame interpolation processing is played, so that a slow-motion playing effect can be implemented. According to the video processing method provided in the embodiments of this application, if a video includes a speech, frame interpolation processing is performed on image frames that do not include the speech, frame interpolation processing is not performed on image frames including the speech, and a processed video file is played. In this way, a slow-motion playing effect is implemented in a video interval that does not include the speech, and a video interval including the speech is normally played, so that hearing feeling of original sound of the speech can be retained, and damage caused by slow-motion playing to the speech is avoided.

Figure 2D:
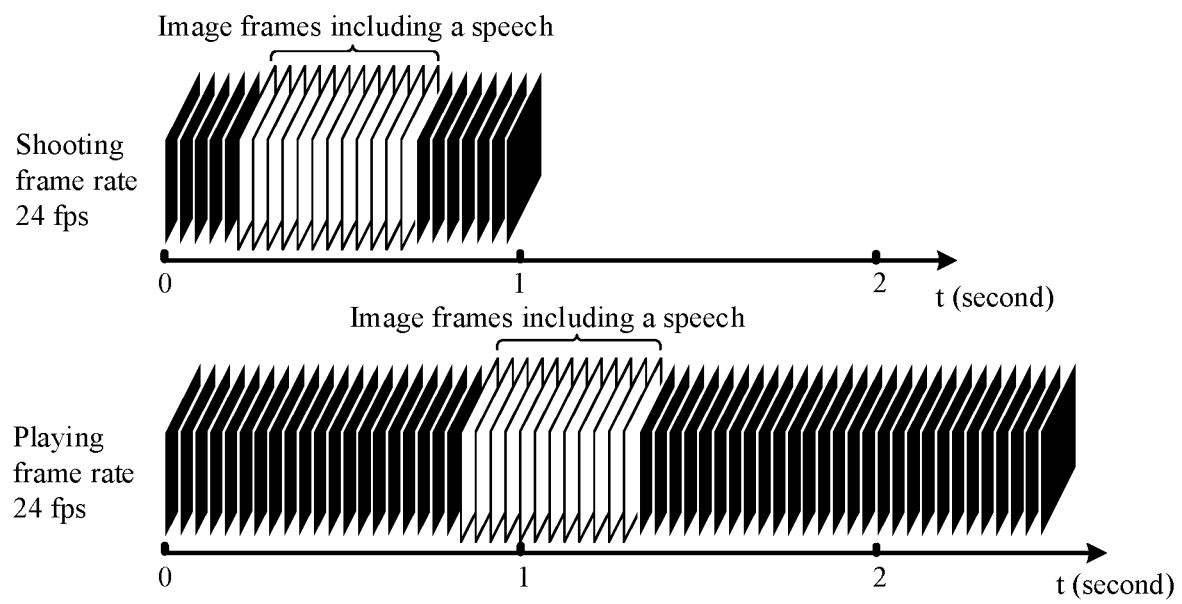
FIG. 2D is a schematic diagram of an example of an applicable scenario of a video processing method according to an embodiment of this application.

For example, as shown in FIG. 2D, a video file whose duration is 1s is recorded based on a shooting frame rate of 24 fps, and a speech is detected in an audio stream in the video file, to determine an audio stream including the speech, where it is determined that 12 frames in a video stream are image frames including the speech. A 4× frame interpolation operation is performed on image frames that do not include the speech, and frame interpolation processing is not performed on the 12 frames including the speech. In this way, when playing is performed based on a playing frame rate of 24 fps, playing duration of a video interval that does not include the speech becomes longer, thereby implementing a 4× slow-motion effect. The image frames including the speech are normally played, thereby retaining hearing feeling of original sound of the speech.

The video processing method provided in the embodiments of this application may be applied to an electronic device having a shooting function. For example, the electronic device may be a mobile phone, GoPro (GoPro), a digital camera, a tablet computer, a desktop, laptop, or handheld computer, a notebook computer, an onboard device, a smart home device (such as a smart TV, a smart screen, a large screen, or a smart speaker), an ultra-mobile personal computer (ultra-mobile personal computer, UMPC), a netbook, a cellular phone, a personal digital assistant (personal digital assistant, PDA), an augmented reality (augmented reality, AR)\a virtual reality (virtual reality, VR) device, or the like. A specific form of the electronic device is not specially limited in the embodiments of this application.

Figure 3:
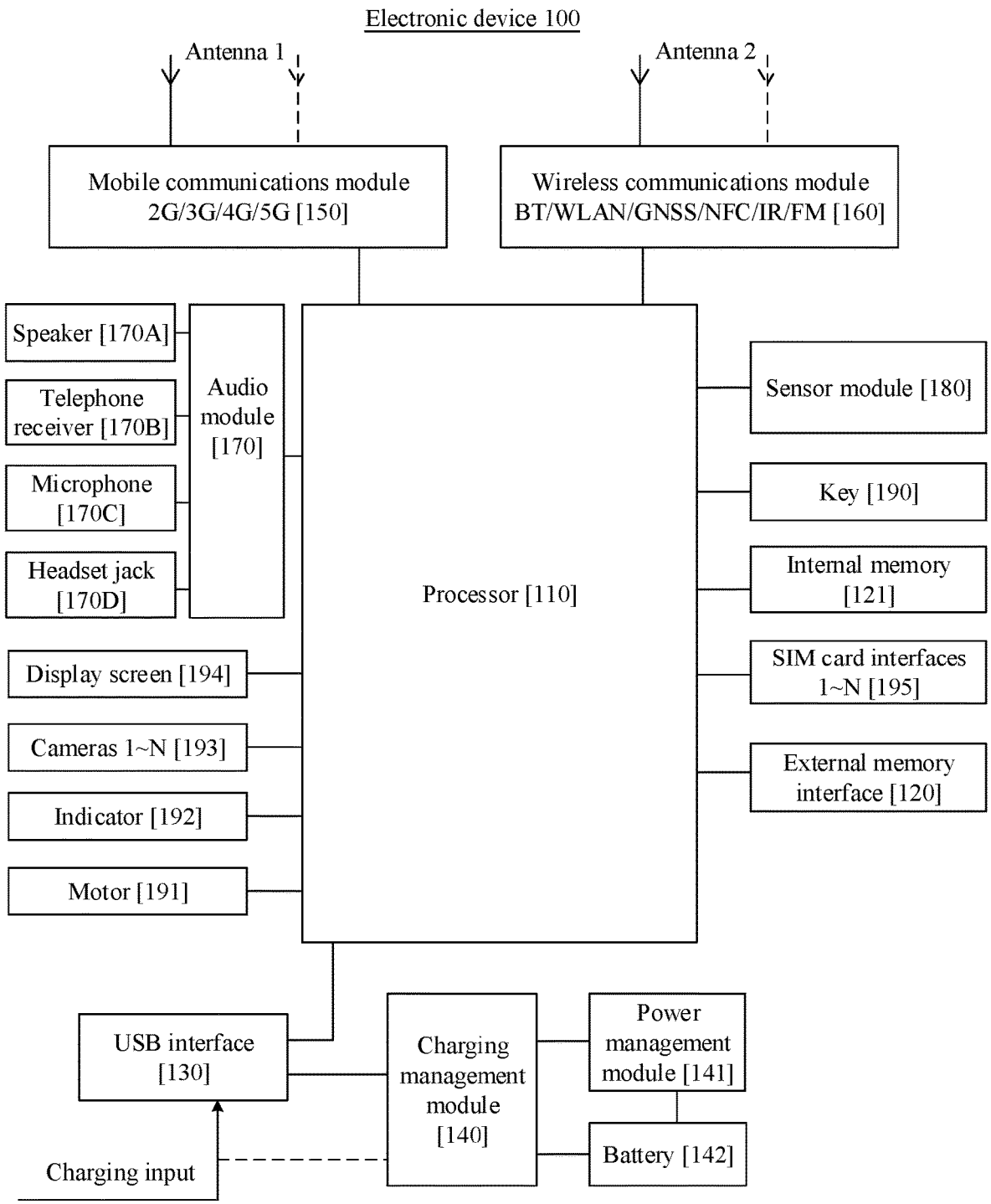
FIG. 3 is a schematic diagram of a hardware structure of an applicable electronic device of a video processing method according to an embodiment of this application.

FIG. 3 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a temperature sensor, an ambient light sensor, and the like.

It may be understood that the structure shown in this embodiment does not constitute a specific limitation on the electronic device 100. In some other embodiments, the electronic device 100 may include more or fewer components than those shown in the figure, may combine some components, may split some components, or may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and command center of the electronic device 100. The controller may generate an operation control signal based on instruction operation code and a timing signal, to complete control of instruction fetching and instruction execution.

A memory may be further disposed in the processor 110, to store instructions and data. In some embodiments, the memory in the processor 110 is a cache. The memory may store instructions or data just used or cyclically used by the processor 110. If the processor 110 needs to use the instructions or data again, the processor 110 may directly invoke the instructions or data from the memory. This avoids repeated access and reduces waiting time of the processor 110, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that the interface connection relationship between the modules shown in this embodiment is merely an example for description, and does not constitute a limitation on the structure of the electronic device. In some other embodiments, the electronic device may alternatively use an interface connection manner different from that in the foregoing embodiment, or a combination of a plurality of interface connection manners.

The charging management module 140 is configured to receive charging input from a charger. The charger may be a wireless charger, or may be a wired charger. In some embodiments of wired charging, the charging management module 140 may receive charging input of a wired charger by using the USB interface 130. In some embodiments of wireless charging, the charging management module 140 may receive wireless charging input by using a wireless charging coil of the electronic device. While charging the battery 142, the charging management module 140 may further supply power to the electronic device by using the power management module 141.

The power management module 141 is configured to be connected to the battery 142, the charging management module 140, and the processor 110. The power management module 141 receives input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (leakage or impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communications module 150, the wireless communications module 160, the modem processor, the baseband processor, and the like.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric computing for graphics rendering. The processor 110 may include one or more GPUs, executing program instructions to generate or change display information.

The display screen 194 is configured to display an image, a video, or the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Mini-LED, a Micro-OLED, a Micro-OLED, a quantum dot light emitting diode (quantum dot light emitting diodes, QLED), or the like.

The electronic device 100 may implement a shooting function by using the ISP, the camera 193, the video codec, the GPU, the display screen 194, the application processor, and the like.

The ISP is configured to process data fed back by the camera 193. For example, at the time of photographing, a shutter is opened, and light is transmitted to a photosensitive element of the camera by using a lens. An optical signal is converted into an electrical signal. The photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a shooting scene. In some embodiments, the ISP may be disposed in the camera 193.

The camera 193 is configured to capture a still image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device may include one or N cameras 193, where N is a positive integer greater than 1. In this embodiment of this application, the camera 193 may be configured to collect video images.

The digital signal processor is configured to process a digital signal. In addition to processing a digital image signal, the digital signal processor can further process another digital signal. For example, when the electronic device performs frequency selection, the digital signal processor is configured to perform Fourier transform or the like on frequency energy.

The video codec is configured to compress or decompress a digital video. The electronic device 100 can support one or more types of video codecs. In this way, the electronic device can play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, fast processes input information by referring to a biological neural network structure, for example, by referring to a transmission mode between human brain neurons, and may further continuously perform self-learning. Applications such as intelligent cognition of the electronic device, for example, image recognition, face recognition, speech recognition, and text understanding, may be implemented by using the NPU.

The electronic device 100 may implement audio functions such as music playing and recording by using the audio module 170, the speaker 170A, the telephone receiver 170B, the microphone 170C, the headset jack 170D, the application processor, and the like. In this embodiment of this application, the audio module 170 may be configured to collect audio during video recording.

The audio module 170 is configured to convert digital audio information into analog audio signal for output, and is also configured to convert analog audio input into a digital audio signal. The audio module 170 may be further configured to encode and decode audio signals. In some embodiments, the audio module 170 may be disposed in the processor 110, or some functional modules in the audio module 170 may be disposed in the processor 110. The speaker 170A, also referred to as a "loudspeaker", is configured to convert an audio electrical signal into a sound signal. The telephone receiver 170B, also referred to as an "earpiece", is configured to convert an audio electrical signal into a sound signal. The microphone 170C, also referred to as a "mic" or "mike", is configured to convert a sound signal into an electrical signal. The headset jack 170D is configured to be connected to a wired headset. The headset jack 170D may be the USB interface 130, or may be a 3.5-mm open mobile terminal platform (open mobile terminal platform, OMTP) standard interface or a cellular telecommunications industry association of the USA (cellular telecommunications industry association of the USA, CTIA) standard interface.

The external memory interface 120 may be configured to be connected to an external memory card, for example, a Micro SD card, to expand a storage capacity of the electronic device. The external memory card communicates with the processor 110 by using the external memory interface 120, to implement a data storage function, for example, store a file such as audio or a video in the external memory card.

The internal memory 121 may be configured to store computer-executable program code, and the executable program code includes instructions. The processor 110 runs the instructions stored in the internal memory 121, to perform various functional applications and data processing of the electronic device. For example, in this embodiment of this application, the processor 110 may execute the instructions stored in the internal memory 121, and the internal memory 121 may include a program storage region and a data storage region. The program storage region may store an operating system and an application required by at least one function (for example, a sound playing function and an image playing function). The data storage region may store data (such as a video file) and the like created in a use process of the electronic device. In addition, the internal memory 121 may include a high-speed random access memory, and may further include a nonvolatile memory, for example, at least one magnetic disk storage device, a flash memory device, or a universal flash storage (universal flash storage, UFS).

The key 190 includes a power-on key, a volume key, and the like. The key 190 may be a mechanical key, or may be a touch key. The motor 191 may generate a vibration prompt. The motor 191 may be configured to provide a vibration prompt for an incoming call, and may also be configured to provide vibration feedback for a touch. The indicator 192 may be an indicator light; and may be configured to indicate a charging status or a change in charge, and may also be configured to indicate a message, a missed incoming call, a notification, or the like. The SIM card interface 195 is configured to be connected to a SIM card. The SIM card may be inserted into the SIM card interface 195 or removed from the SIM card interface 195, to implement contact with or separation from the electronic device. The electronic device may support one or N SIM card interfaces, where N is a positive integer greater than 1. The SIM card interface 195 may support a Nano SIM card, a Micro SIM card, a SIM card, or the like.

In some embodiments, a software system of the electronic device 100 may use a layered architecture, an event-driven architecture, a microkernel architecture, or a cloud architecture. In the embodiments of this application, the software structure of the electronic device 100 is illustrated by using an Android® system of a layered architecture as an example.

Figure 4:
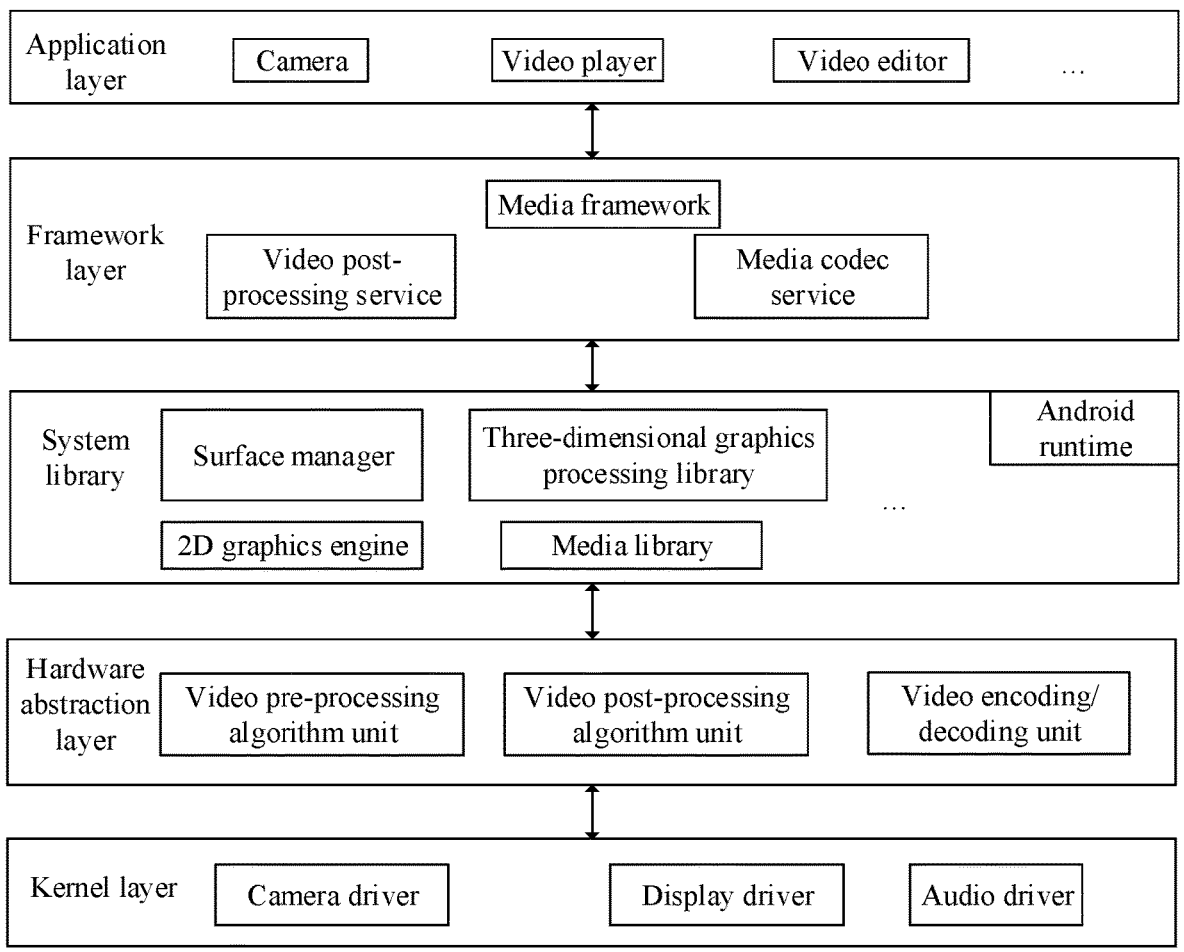
FIG. 4 is a schematic diagram of a software architecture of an applicable electronic device of a video processing method according to an embodiment of this application.

FIG. 4 is a diagram of a software structure of an electronic device according to an embodiment of this application.

It may be understood that, in a layered architecture, software is divided into several layers, and each layer has a clear role and task. Layers communicate with each other by using a software interface. In some embodiments, the Android® system may include an application (application, APP) layer, a framework (framework, FWK) layer, a hardware abstraction layer (hardware abstraction layer, HAL), and a kernel (Kernel) layer. As shown in FIG. 4, the Android® system may further include Android runtime (Android runtime) and a system library.

The application layer may include a series of application packages. As shown in FIG. 4, the application packages may include Camera, Video player, Video editor, and the like. The camera application is used for photo taking, photographing, or the like. Video player is used to play a video file. Video editor is used to edit a video file. In some embodiments, the application packages may further include applications such as Gallery, Calendar, Phone, Music, and Messages.

The application framework layer provides an application programming interface (application programming interface, API) and a programming framework for the applications at the application layer. The application framework layer includes some predefined functions. The application framework layer provides a programming service for the application layer for invocation by using the API interface. As shown in FIG. 4, the application framework layer includes a media framework, a video post-processing service, a media codec service, and the like. The media framework is used to manage multimedia resources such as a photo, a picture, a video, and audio. The media codec service is used to perform encoding and decoding management on multimedia resources such as a photo, a picture, a video, and audio. The video post-processing service is used to manage and schedule processing of a video file.

The Android runtime includes a kernel library and a virtual machine. The Android runtime is responsible for scheduling and managing the Android system.

The kernel library includes two parts. One part is a functional function that needs to be invoked by a java speech, and the other part is a kernel library of Android.

The application layer and the application framework layer run in the virtual machine. The virtual machine executes java files at the application layer and the application framework layer as binary files. The virtual machine is used to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is used to manage a display subsystem, and provide 2D and 3D layer fusion for a plurality of applications.

The media library supports playback and recording in a plurality of common audio and video formats, a static image file, and the like. The media library may support a plurality of audio encoding formats, for example, MPEG 4, H.264, MP 3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The hardware abstraction layer is used to abstract hardware, encapsulate a driver of the kernel layer, and provide an interface upward. For example, as shown in FIG. 4, the hardware abstraction layer includes a video pre-processing algorithm unit, a video post-processing algorithm unit, and a video encoding/decoding unit.

The kernel layer provides underlying drivers for various types of hardware of the electronic device. For example, as shown in FIG. 4, the kernel layer may include a camera driver, a display driver, and an audio driver.

A video processing method provided in the embodiments of this application is described below with reference to the accompanying drawings by using an example in which the electronic device is a mobile phone.

The mobile phone obtains a video, and may detect a video stream (image frames) in a video file to determine image frames including a specified action. An embodiment of this application provides a video processing method, to process image frames including a specified action. For example, in an implementation, a frame interpolation operation is performed on the image frames including the specified action, and a video file that undergoes frame interpolation processing is played, to implement slow-motion playing of the specified action. In another implementation, a frame extraction operation is performed on the image frames including the specified action, and a video file that undergoes frame extraction processing is played, to implement fast-motion playing of the specified action. The following embodiments provide detailed descriptions by using an example in which frame interpolation processing is performed on the image frames including the specified action to implement slow-motion playing.

Figure 5A:
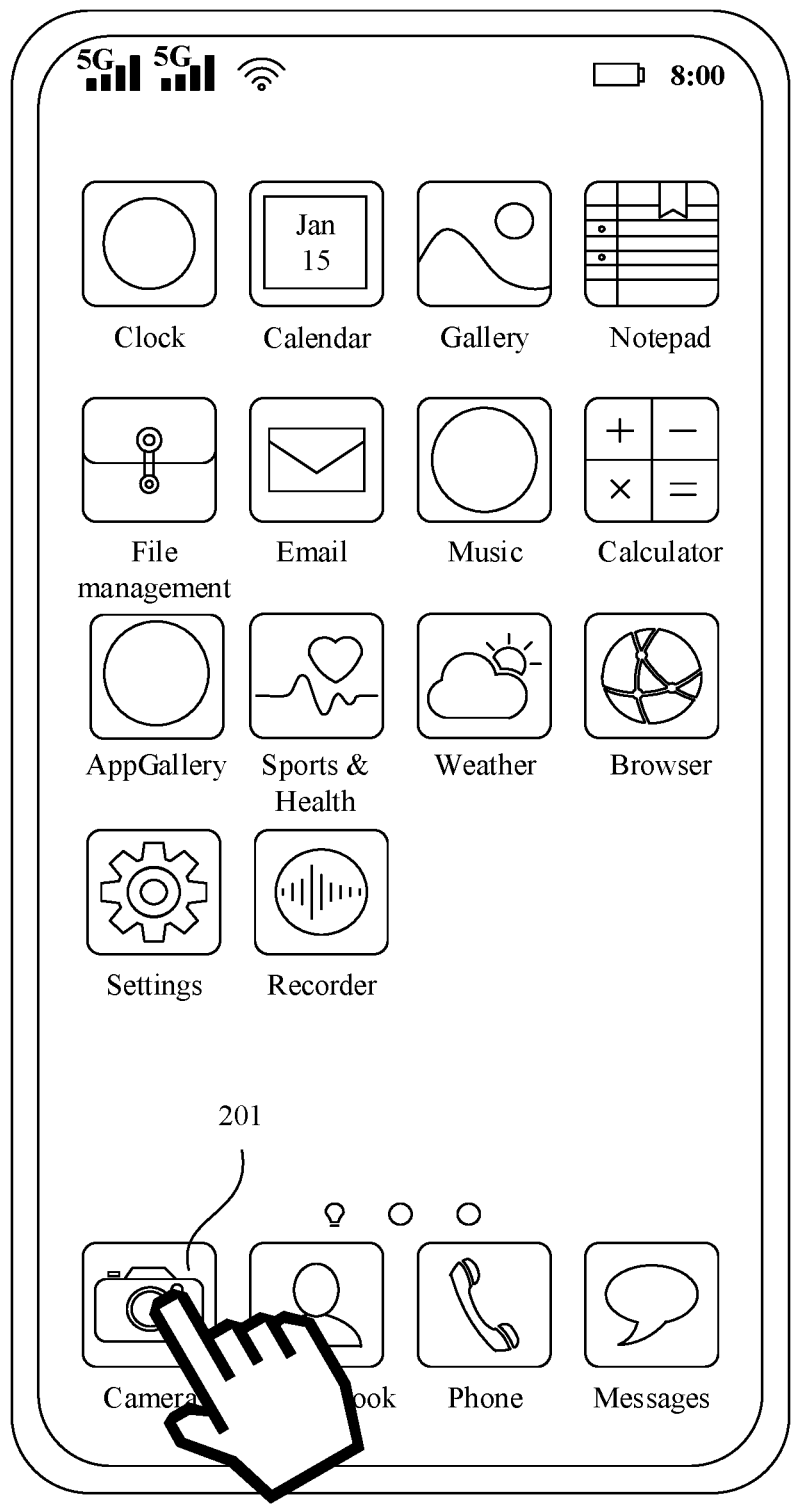
FIG. 5A to FIG. 5E are schematic diagrams of an example of a scenario of a video processing method according to an embodiment of this application.
Figure 5B:
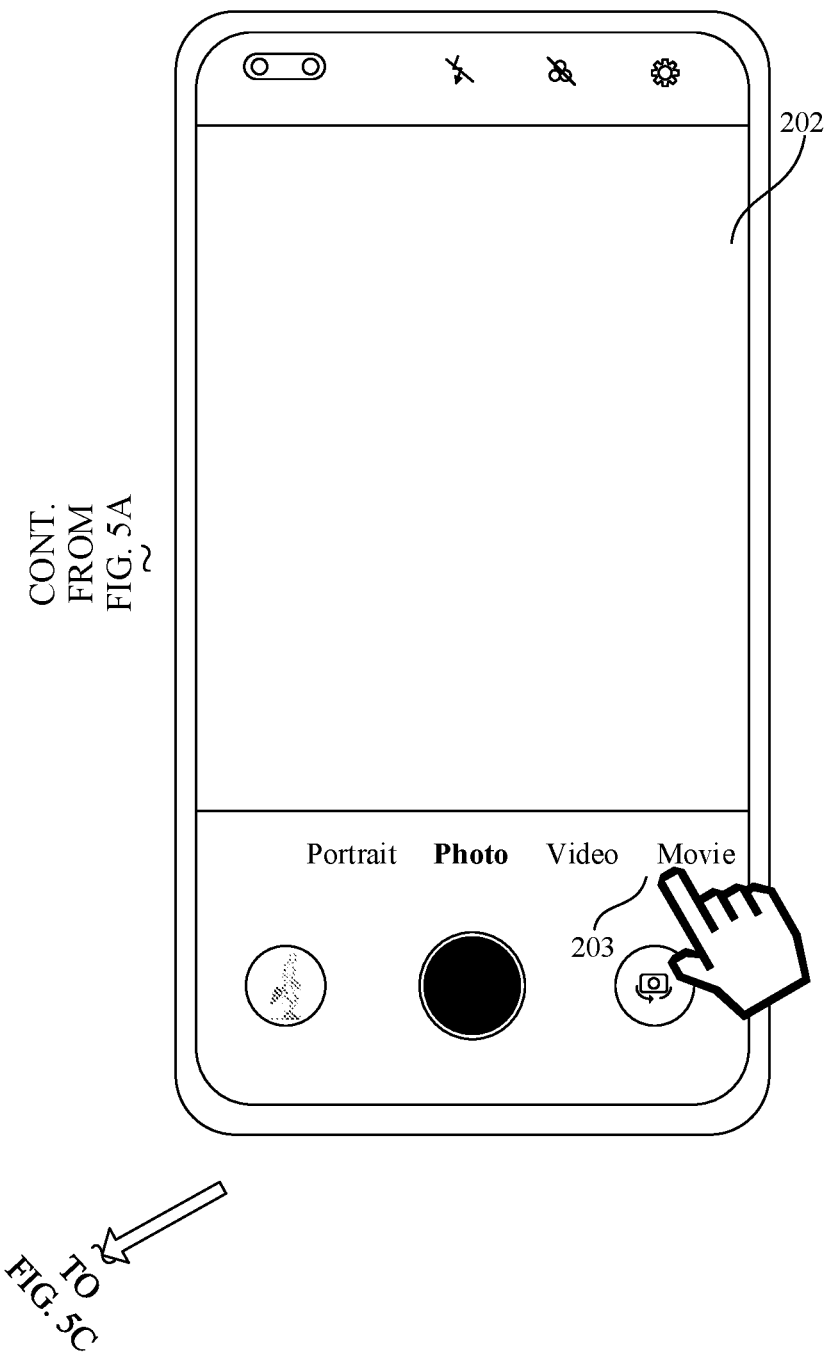
Figure 5C:
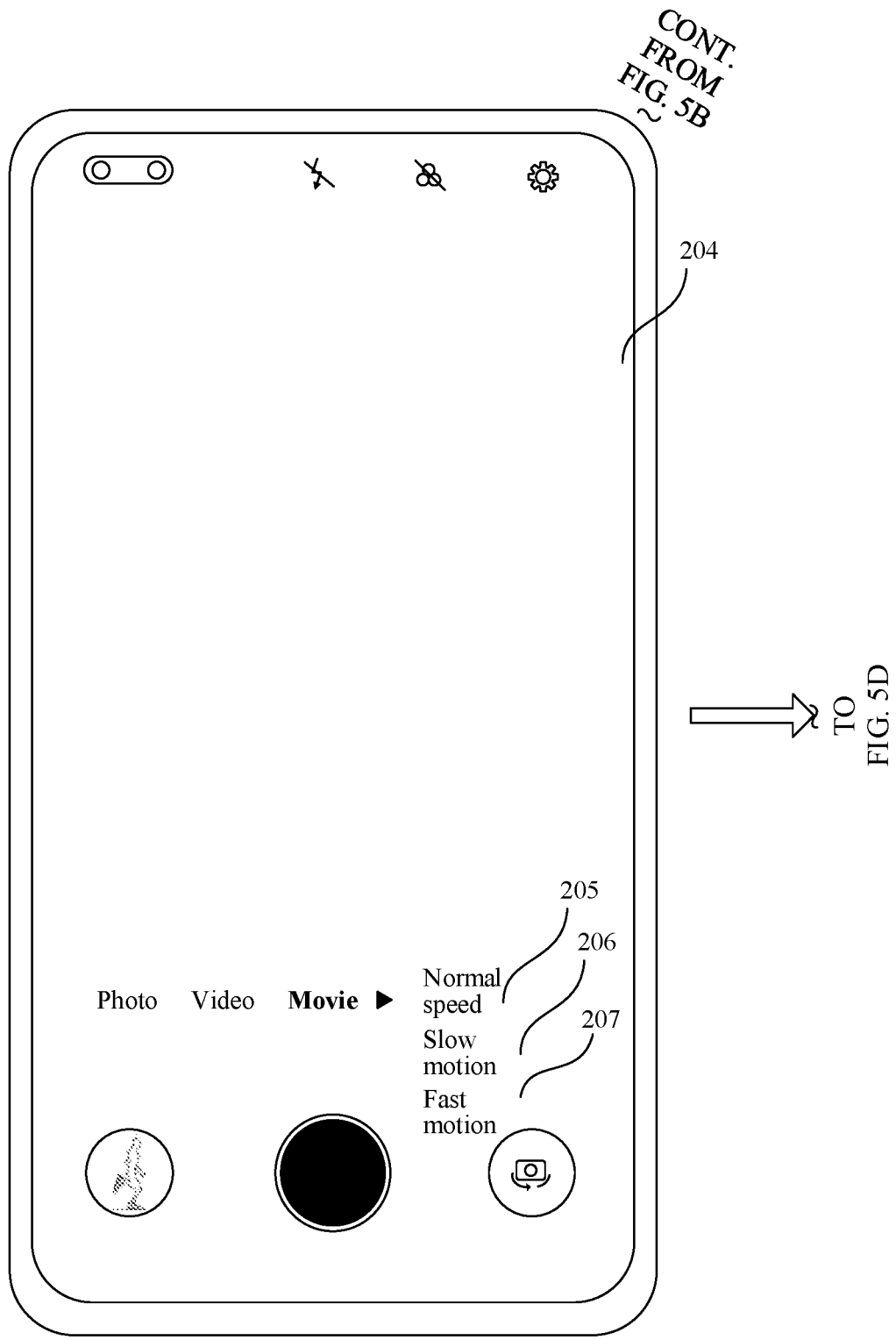
Figure 5D:
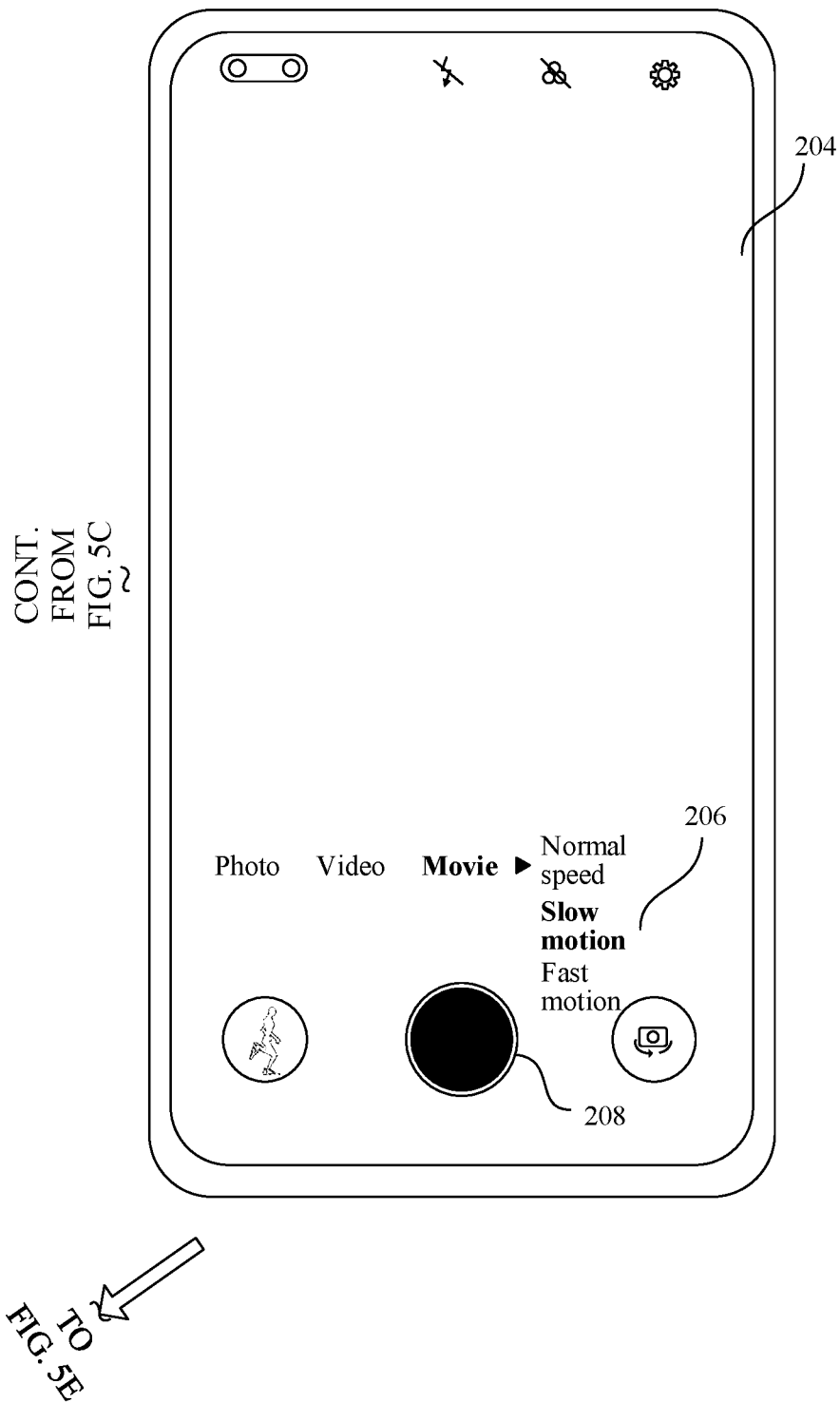
Figure 5E:
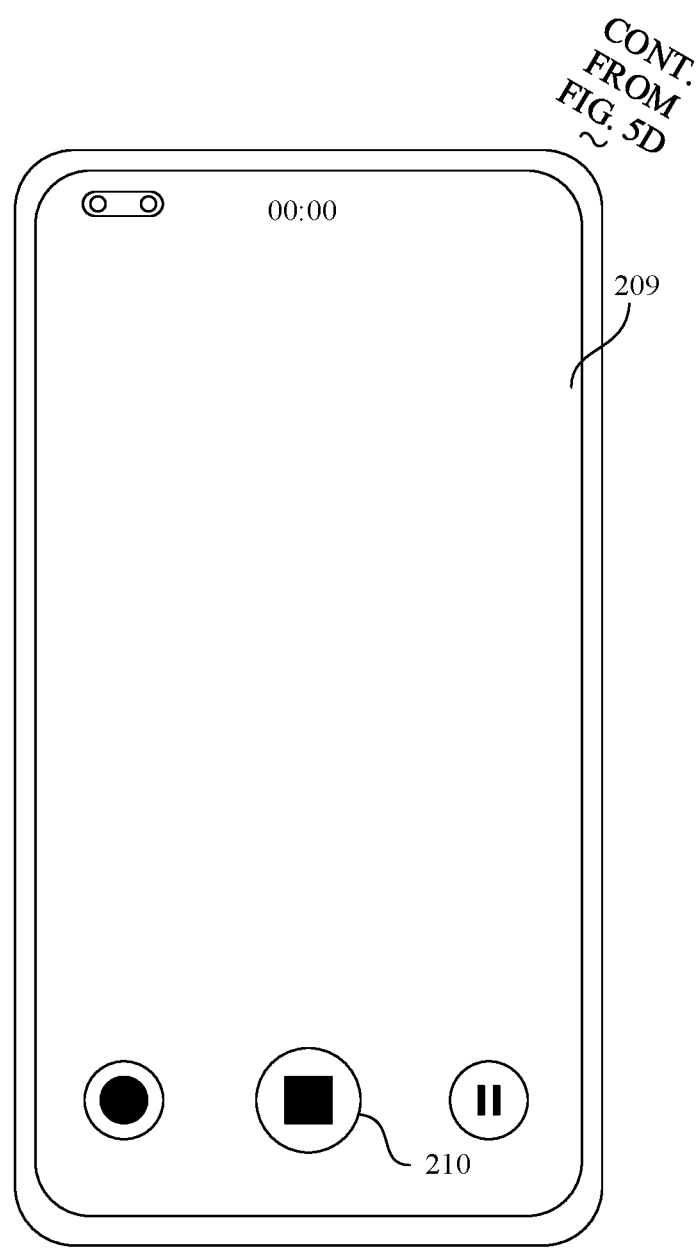

In an implementation, the mobile phone obtains a video, that is, obtains a normal-speed video file. For example, a preset playing frame rate of the mobile phone is 24 fps. If a video is shot based on a shooting frame rate of 24 fps, in other words, the shooting frame rate is equal to the playing frame rate, a normal-speed video file is obtained. In an implementation, the mobile phone collects a video by using a camera (for example, the camera 193 in FIG. 3) and an audio module (for example, the audio module 170 in FIG. 3), to obtain a normal-speed video file. In an example, a user enables a camera application. When running the camera application, the mobile phone enables a camera to collect images by using the camera, to obtain a video stream, and enables a microphone to collect audio, to obtain an audio stream. For example, as shown in FIG. 5A, in response to tapping, by the user, a "Camera" icon 201 on a home screen of the mobile phone, the mobile phone displays an interface 202 shown in FIG. 5B. The interface 202 is a photographing preview interface of the mobile phone, and the preview interface is used to display a preview image (that is, a photographing preview image) obtained when the mobile phone performs photographing. Still as shown in FIG. 5B, the interface 202 further includes a "Portrait" option, a "Video" option, a "Movie" option, and the like. The "Video" option and the "Movie" option are used to record video files, and the "Portrait" option is used for photographing. As shown in FIG. 5B, the user may tap the "Movie" option 203 to enter a video recording mode. In an example, as shown in FIG. 5C, the mobile phone displays a "Movie" interface 204. The "Movie" option in the "Movie" interface 204 further includes a "Normal speed" sub-option 205, a "Slow motion" sub-option 206, a "Fast motion" sub-option 207, and the like. The "Normal speed" sub-option 205 is used for a normal-speed video mode, the "Slow motion" sub-option 206 is used for a slow-motion video mode, and the "Fast motion" sub-option 207 is used for a fast-motion video mode. For example, as shown in FIG. 5D, the user may tap the "Slow motion" sub-option 206 to choose to enter the slow-motion video mode. The "Movie" interface 204 further includes a "Record" button 208, and the user can tap the "Record" button 208 to start to record a video. In response to a tapping operation of the user on the "Record" button 208, the mobile phone enables the camera to collect images by using the camera, and enables the microphone to collect audio by using the microphone; and displays the collected images in a preview interface. In an implementation, the camera collects image frames based on a preset first shooting frame rate (for example, 24 fps). For example, as shown in FIG. 5E, the mobile phone displays an interface 209. The interface 209 is a recording preview interface of the mobile phone, and the preview interface is used to display video preview images (collected image frames). Optionally, the interface 209 includes a "Stop" button 210. In response to a tapping operation of the user on the "Stop" button 210, the mobile phone stops collecting image frames by using the camera, and stops collecting audio by using the microphone.

Figure 6:
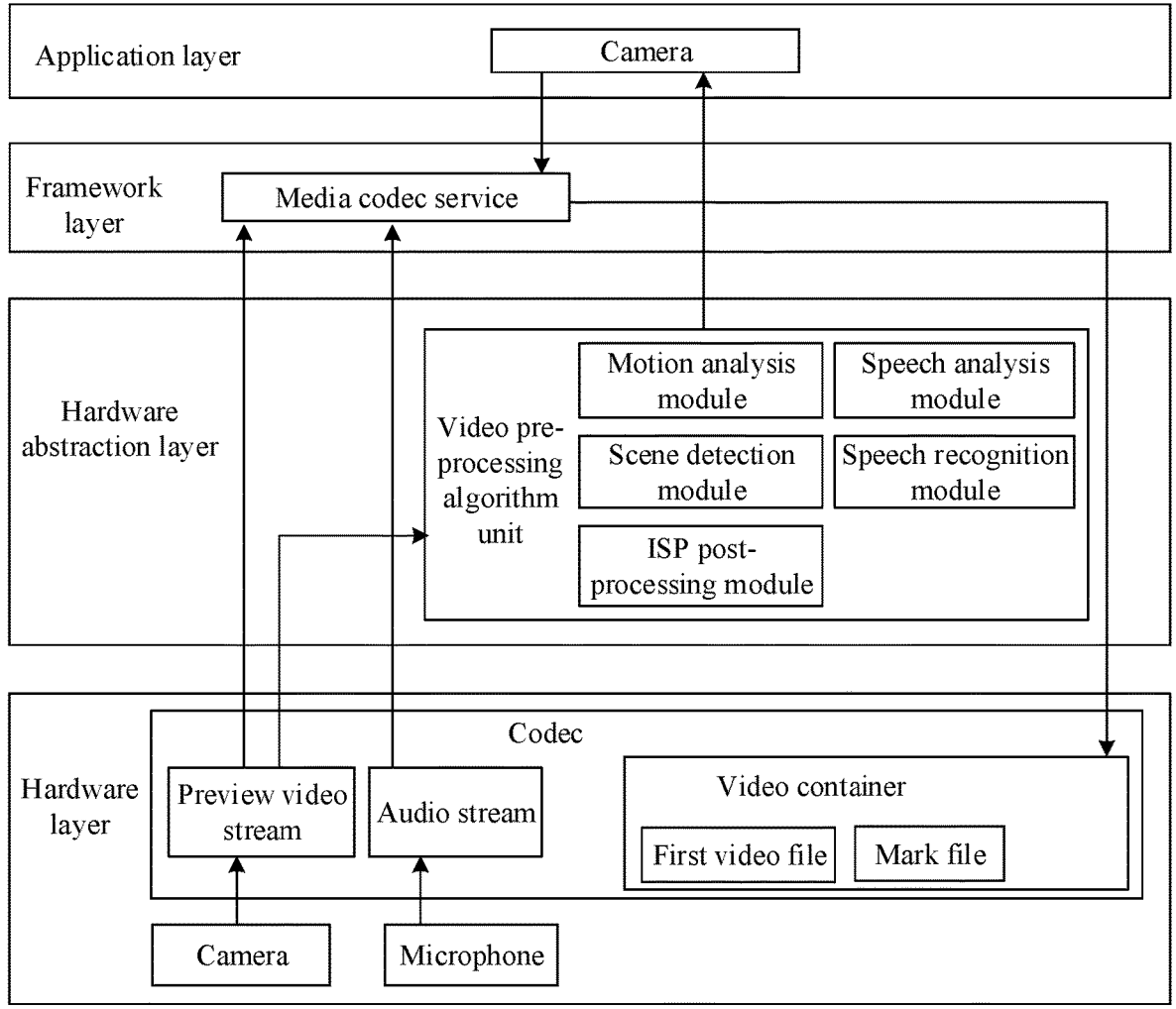
FIG. 6 is a schematic diagram of a video processing method according to an embodiment of this application.

For example, as shown in FIG. 6, in response to an operation of the user on the camera application, the camera application enables the camera and the microphone. The camera of the mobile phone collects images, and generates a video stream, namely, image frames displayed in the preview interface, by using a codec. The video stream is referred to as a preview video stream. The microphone of the mobile phone collects audio, and generates an audio stream by using the codec. The preview video stream includes image frames collected by using the camera after the mobile phone receives a tapping operation of the user on the "Record" button 208 and before the mobile phone receives a tapping operation of the user on the "Stop" button 210. The audio stream includes audio frames collected by using the microphone after the mobile phone receives the tapping operation of the user on the "Record" button 208 and before the mobile phone receives the tapping operation of the user on the "Stop" button 210.

In an implementation, the video pre-processing algorithm unit at the hardware abstraction layer analyzes the preview video stream, to obtain a specified-motion video interval in the video stream. In an implementation, the video pre-processing algorithm unit obtains a preview video stream, performs resolution reduction processing (down-sampling) on the preview video stream, generates a low-resolution preview stream, and analyzes the low-resolution preview stream instead of a full-resolution preview stream. In this way, a processing speed of the video pre-processing algorithm unit can be improved, thereby improving performance.

A scene detection module of the video pre-processing algorithm unit detects a specified action based on the low-resolution preview stream. For example, the specified action is a motion action such as basketball shooting, long jump, shooting, or a racket swinging action during badminton playing. In some embodiments, the scene detection module may perform motion detection by using any motion detection algorithm in conventional technologies. This is not limited in this embodiment of this application. In an implementation, the scene detection module needs to determine a motion interval based on a posture change of a human body in a plurality of consecutive image frames. After receiving the low-resolution preview stream, the scene detection module buffers the plurality of image frames, to determine the motion interval.

As shown in FIG. 6, the scene detection module obtains one or more motion intervals in a low-resolution preview stream by using a motion detection algorithm. For example, the scene detection module obtains the twenty-fourth image frame to the twenty-ninth image frame in the low-resolution preview stream as a motion interval, and transmits a motion interval result to a motion analysis module.

It may be understood that different color gamut formats may be processed in different motion detection algorithms. In an implementation, as shown in FIG. 6, the video pre-processing algorithm unit includes an ISP post-processing module. The ISP post-processing module may convert a color gamut format of a low-resolution preview stream based on a preset motion detection algorithm in the scene detection module, for example, convert the color gamut format of the low resolution preview stream into a BT.709 format, and transmit a converted low-resolution preview stream to the scene detection module for motion interval detection.

After the scene detection module transmits a motion interval result to the motion analysis module, the motion analysis module marks a motion start tag and a motion end tag based on the motion interval result. For example, the motion analysis module obtains the twenty-fourth image frame to the twenty-ninth image frame as a motion interval. In an example, the motion start tag is marked as the twenty-fourth image frame, and the motion end tag is marked as the twenty-ninth image frame. In another example, the twenty-fourth frame of image corresponds to a first moment on a timeline, the twenty-ninth frame of image corresponds to a second moment on the timeline, the motion start tag is marked as the first moment, and the motion end tag is marked as the second moment.

In an implementation, the video pre-processing algorithm unit sends the marked motion start tag and motion end tag to the camera application through a reporting channel at the hardware abstraction layer. The camera application sends the marked motion start tag and motion end tag to a media codec service at a framework layer.

In addition, the preview video stream and an audio stream at a hardware layer are sent to the media codec service at the framework layer through the reporting channel at the hardware abstraction layer.

The media codec service combines the preview video stream and the audio stream into a normal-speed video file (a first video file), and further stores the marked motion start tag and motion end tag in a mark file as metadata (Metadata). The normal-speed video file and the corresponding mark file are jointly stored in a video container. In other words, each video container stores related files (such as a video file and a mark file) of one video.

In an example, the mark file includes content in the following Table 1, indicating that a motion start tag of the first motion interval is the twenty-fourth image frame, a motion end tag of the first motion interval is the twenty-ninth image frame, a motion start tag of the second motion interval is the forty-ninth image frame, and a motion end tag of the second motion interval is the seventieth image frame.

TABLE 1

| Sequence number of a motion interval | Start frame | End frame |
| --- | --- | --- |
| 1 | 24 | 29 |
| 2 | 49 | 70 |

In another example, the mark file includes content in the following Table 2.

TABLE 2

| Sequence number of a motion interval | Start tag | End tag |
| --- | --- | --- |
| 1 | First moment | Second moment |

It should be noted that Table 1 and Table 2 are merely examples for describing the mark file. A specific form of the mark file is not limited in this embodiment of this application. During specific implementation, information in the mark file may not be in a form of a table, and a manner of recording the information in the mark file is not limited, either. For example, in an example, the mark file includes the following content:

```
Frame sequence number 1, TAG = 0
Frame sequence number 2, TAG = 0
Frame sequence number 3, TAG = 0
...
Frame sequence number 24, TAG = 1
Frame sequence number 25, TAG = 1
...
Frame sequence number 29, TAG = 1
...
Frame sequence number 48, TAG = 0
```

The mark file includes frame sequence numbers of all image frames in the preview video stream. TAG=0 indicates that the image frame does not belong to a motion interval, and TAG=1 indicates that the image frame belongs to a motion interval.

After the first video file is generated, a video part that is in the video stream and that includes a specified action may be obtained based on the mark file, and processing (for example, frame interpolation processing) may be performed on the video part including the specified action, to generate a video file that undergoes frame interpolation processing. In this way, during video playing, the video file that undergoes frame interpolation processing may be directly played, to automatically play a video with a slow-motion effect.

In an implementation, after receiving, for the first time, an operation in which the user starts to play the video, the mobile phone performs processing (for example, frame interpolation processing) on the video part including the specified action, to generate the video file that undergoes frame interpolation processing. In this way, a slow-motion effect of the specified action. Subsequently, after receiving, again, the operation in which the user starts to play the video, the mobile phone may directly play the video file that undergoes frame interpolation processing, without performing frame interpolation processing again.

It may be understood that a trigger occasion for processing the video part including the specified action is not limited in this embodiment of this application. For example, the video part including the specified action may be alternatively processed after the first video file is generated. The following describes in detail an implementation of this embodiment of this application by using an example in which after receiving, for the first time, the operation in which the user starts to play the video, the mobile phone processes the video part including the specified action.

Figure 7:
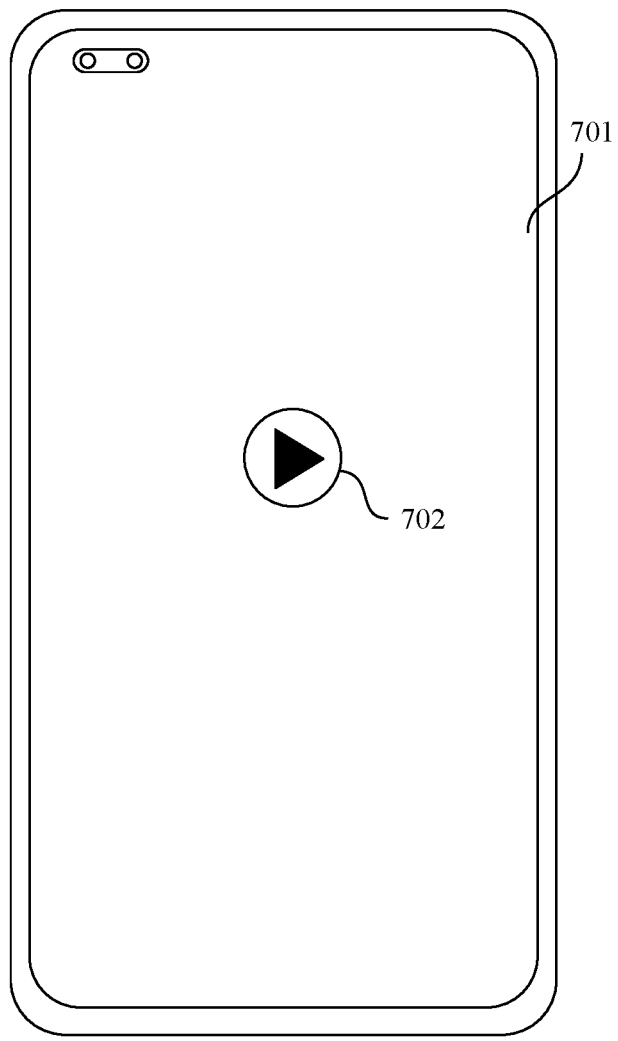
FIG. 7 is a schematic diagram of an example of a scenario of a video processing method according to an embodiment of this application.

The user may start to play a video or edit a video on the mobile phone. Playing a video is used as an example. For example, as shown in FIG. 7, the mobile phone displays a play interface 701 of a video 1. The play interface 701 includes a play button 702, and the user may tap the play button 702 to start to play the video 1.

Figure 8:
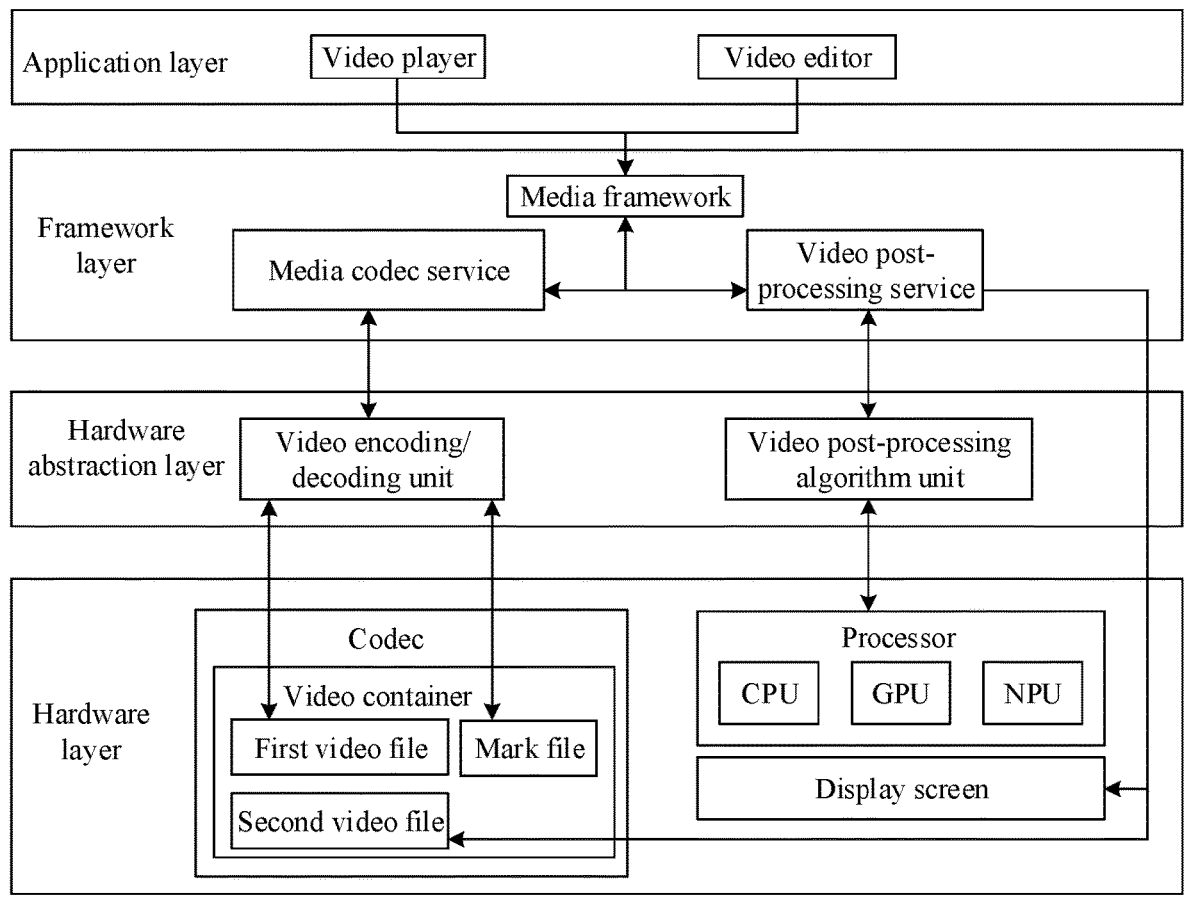
FIG. 8 is a schematic diagram of a video processing method according to an embodiment of this application.

In an example, in response to a tapping operation of the user on the play button 702, the mobile phone enables a video player application. As shown in FIG. 8, the video player application determines to start the video 1, and invokes a media framework to start to play the video 1. For example, the video player application sends an identifier of the video 1 to the media framework. The media framework obtains a video file corresponding to the video 1 from a codec by using a media codec service. Video files recorded or received by the mobile phone are stored in the codec. For example, a video container corresponding to the video 1 includes a first video file and a mark file. The video encoding/decoding unit decodes the first video file and the mark file in the video container to obtain a decoded first video file and mark file, and transmits the decoded first video file and mark file to the media framework. The media framework obtains a motion start tag and a motion end tag in the mark file, and obtains image frames corresponding to a motion interval based on the first video file, the motion start tag, and the motion end tag.

For example, the first video file includes a first video stream and a first audio stream. As shown in FIG. 2A, a shooting frame rate of the first video stream is 24 fps, duration of the first video file is 2s, and the first video stream includes 48 image frames. The motion start tag corresponds to the twenty-fourth image frame, and the motion end tag corresponds to the twenty-ninth image frame. It should be noted that, in FIG. 2A, for example, the motion interval is some image frames in the first video stream. In some other embodiments, the motion interval may be alternatively all image frames in the first video stream.

The media framework requests a video post-processing service to perform slow-motion image processing on the motion interval. For example, the media framework sends the image frames corresponding to the motion interval to the video post-processing service. The video post-processing service transmits the request (including the image frames corresponding to the motion interval) of the media framework to the video post-processing algorithm unit at the hardware abstraction layer. The video post-processing algorithm unit performs frame interpolation processing on the image frames corresponding to the motion interval by using a preset frame interpolation algorithm and a related hardware resource (for example, a CPU, a GPU, or an NPU).

Figure 9:
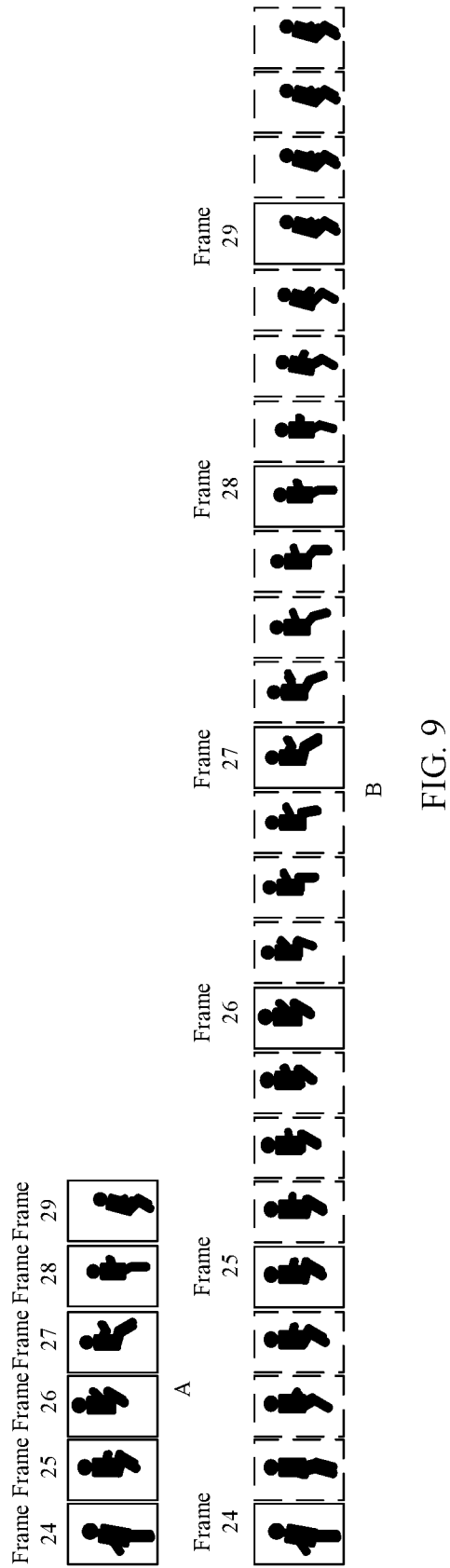
FIG. 9 is a schematic diagram of an example of a scenario of a video processing method according to an embodiment of this application.

The video post-processing algorithm unit may perform frame interpolation processing by using any frame interpolation algorithm in conventional technologies, for example, a motion estimation and motion compensation (motion estimate and motion compensation, MEMC) algorithm. For example, as shown in FIG. 9A, the image frames corresponding to the motion interval are the twenty-fourth frame to the twenty-ninth frame in the first video stream, and there are six frames in total. 4× frame interpolation processing is performed on the twenty-fourth image frame to the twenty-ninth image frame by using the MEMC algorithm, that is, three frames are interpolated between two adjacent frames. Image frames that undergo frame interpolation processing are shown in FIG. 9B.

The video post-processing service returns, to the media frame, the image frames that undergo frame interpolation processing and that are generated by the video post-processing algorithm unit. The media framework replaces the image frames in the first video stream that correspond to the motion interval with the image frames that undergo frame interpolation processing, to obtain a second video stream. Image frames in the second video stream that correspond to the motion interval are four times the image frames in the first video stream that correspond to the motion interval. For example, as shown in FIG. 2A, the image frames in the first video stream that correspond to the motion interval are six frames, and the image frames in the second video stream that correspond to the motion interval are 24 frames.

In an implementation, the media framework invokes the video post-processing service to send the second video stream to a display screen for display, that is, play the second video stream on the display screen. A playing frame rate of the second video stream is a preset value and is equal to the shooting frame rate, for example, 24 fps. In this way, duration of the first video stream is 2s, and duration of the second video stream is greater than 2s. The image frames in the first video stream that correspond to the motion interval include six frames, and the image frames in the second video stream that correspond to the motion interval include 24 frames, so that playing time of the motion interval is longer, thereby implementing slow-motion playing in the motion interval.

In some embodiments, a frame interpolation multiple used in a frame interpolation algorithm is a preset value. For example, in the foregoing example, a frame interpolation multiple used in the MEMC algorithm is 4x, that is, 4× slow-motion is implemented. In some embodiments, a plurality of preset values (for example, 4, 8, and 16) of the frame interpolation multiple may be preset in the mobile phone, and the user may select one of the preset values as the frame interpolation multiple used in the frame interpolation algorithm. In other words, the user may select a slow-motion multiple.

Figure 10:
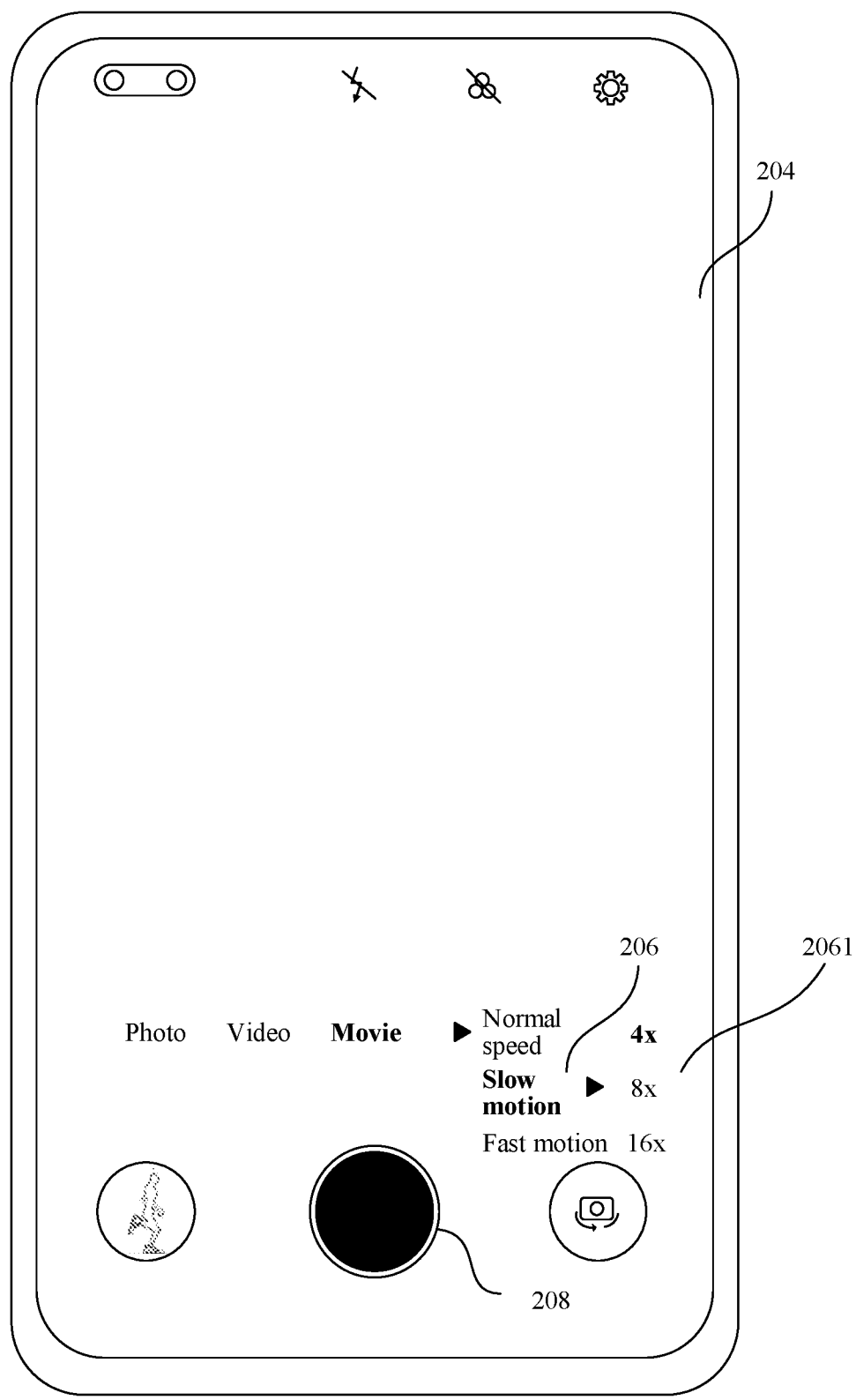
FIG. 10 is a schematic diagram of an example of a scenario of a video processing method according to an embodiment of this application.

In an example, the user may select a slow-motion multiple (a frame interpolation multiple) when recording a video. For example, as shown in FIG. 10, after the user selects the "Slow motion" sub-option 206, the mobile phone displays multiple options 2061, including options such as "4×", "8×", and "16×". "4×" indicates that the frame interpolation multiple is 4× and corresponds to the preset value 4, "8×" indicates that the frame interpolation multiple is 8× and corresponds to the preset value 8, and "16×" indicates that the frame interpolation multiple is 16× and corresponds to the preset value 16. For example, if the user selects the "4×" option, when the video post-processing algorithm unit performs frame interpolation processing by using the frame interpolation algorithm, the used frame interpolation multiple is 4x.

In some embodiments, the media framework processes the first audio stream based on the motion start tag and the motion end tag. For example, the media framework determines, based on the motion start tag and the motion end tag, an audio stream that is in the first audio stream and that corresponds to the motion interval, and cancels sound of the audio stream corresponding to the motion interval. The media framework invokes an audio module to play a processed first audio stream (that is, a second audio stream).

Figure 11:
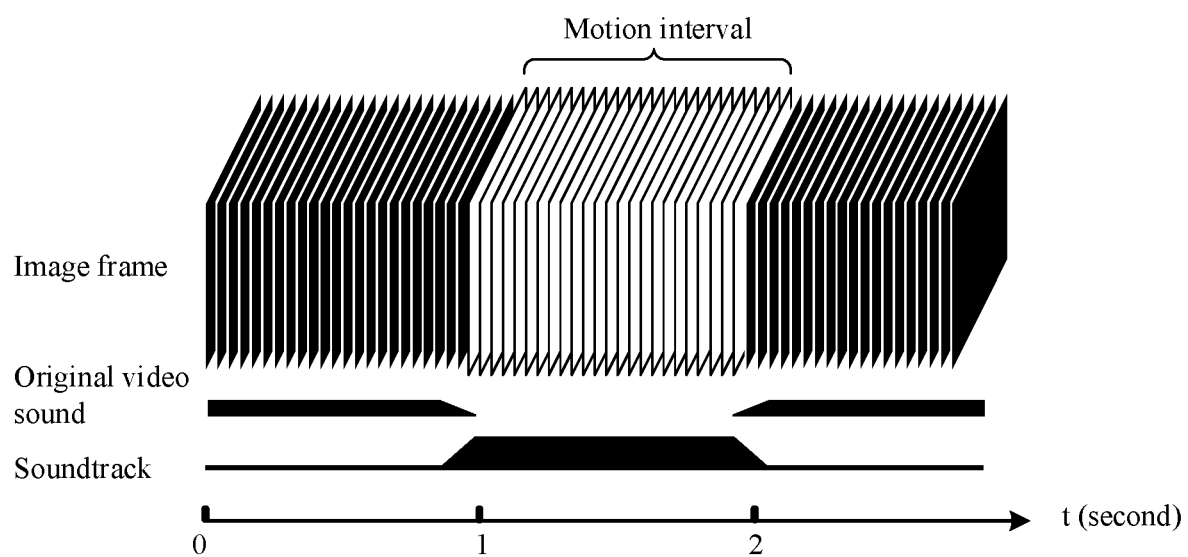
FIG. 11 is a schematic diagram of an example of a scenario of a video processing method according to an embodiment of this application.

In this way, slow-motion playing in the motion interval is implemented, and the sound is not played in the motion interval. For example, as shown in FIG. 11, the motion interval includes 24 image frames, and is played at a playing frame rate of 24 fps to implement slow-motion playing. The sound (original video sound) of the audio stream is not played in the motion interval.

In an implementation, when the motion interval is entered, volume of the original video sound gradually decreases, and when the motion interval is exited, the volume of the original video sound gradually increases. In this way, smoother sound experience is brought to the user.

In an implementation, when the video file is played, a soundtrack is further played. For example, the soundtrack is played at low volume in a normal-speed interval, and the soundtrack is played at high volume in the motion interval. When the motion interval is entered, volume of the soundtrack gradually increases, and when the motion interval is exited, the volume of the soundtrack gradually decreases.

For example, as shown in FIG. 11, in the normal-speed interval (a non-motion interval), volume of the original video sound is high, and volume of the soundtrack is low. When the motion interval is entered, the volume of the original video sound gradually decreases, and the volume of the soundtrack gradually increases; and when the motion interval is exited, the volume of the original video sound gradually increases, and the volume of the soundtrack gradually decreases.

In some embodiments, the media framework further generates a second video file based on the second video stream and the second audio stream. Optionally, the media framework also incorporates an audio stream of the soundtrack into the second video file. Further, as shown in FIG. 8, the media framework invokes the video post-processing service to store the second video file in the video container corresponding to the video 1. In other words, the video container corresponding to the video 1 includes the first video file, the mark file, and the second video file. The first video file is an original video file. The mark file is a file that records a motion start tag and a motion end tag after motion detection is performed on the original video file. The second video file is a video file that undergoes slow-motion processing is performed on the original video file based on the motion start tag and the motion end tag.

The second video file may be used for playing, editing, forwarding, or the like. In an example, only when the user starts to play the video 1 for the first time or starts to edit the video 1 for the first time, the mobile phone may perform the foregoing processing procedure shown in FIG. 8, to perform slow-motion playing based on the first video file and the mark file, and generate the second video file. When the user subsequently starts to play the video 1 or edit the video 1, the mobile phone may directly play or edit the second video file without repeatedly performing the processing procedure shown in FIG. 8. In some embodiments, the user may forward a slow-motion video to another electronic device. For example, as shown in FIG. 12A(1), in response to receiving a tapping operation of the user in a blank region of the play interface 701, the mobile phone displays a play interface 703 shown in FIG. 12A(2). The play interface 703 includes a "Share" button 704. The user may tap the "Share" button 704 to forward a video file corresponding to the interface. For example, the play interface 703 is a play interface of the video 1. After receiving an operation in which the user taps the "Share" button 704, the mobile phone searches for the video container corresponding to the video 1. If the video container corresponding to the video 1 includes the second video file, the mobile phone forwards the second video file, that is, forwards a video file that undergoes slow-motion processing. In this way, the another electronic device receives the second video file, and plays the second video file, thereby implementing slow-motion playing in the motion interval.

It should be noted that the foregoing embodiment provides descriptions by using an example in which the slow-motion video mode is selected when the mobile phone records a video. In some other embodiments, the mobile phone records a video (the first video file) in the normal-speed video mode, or receives a video (the first video file) recorded in the normal-speed video mode from another device, and the user may select the slow-motion video mode when playing the video or editing the video. For example, as shown in FIG. 12B(1) and FIG. 12B(2), the mobile phone displays a playing start interface 1301 of the video 1. The playing start interface 1301 includes a "Play" button 1302. In response to a tapping operation of the user on the "Play" button 1302, the mobile phone displays an interface 1303. The interface 1303 includes a "Normal speed" option 1304, a "Slow motion" option 1305, a "Fast motion" option 1306, and the like. For example, the user selects the "Slow motion" option 1305, and taps an "OK" button 1307. In response to the tapping operation of the user on the "OK" button 1307, the mobile phone generates a corresponding mark file based on the first video file (for specific steps, refer to the descriptions in FIG. 6), and performs the processing procedure shown in FIG. 8, to play a slow-motion video, and store the second video file. For functions of the modules and specific implementation steps, refer to FIG. 6 and FIG. 8. Details are not described herein again. Optionally, as shown in FIG. 12B(1) and FIG. 12B(2), in response to selecting, by the user, the "Slow motion" option 1305, the interface 1303 of the mobile phone further displays slow-motion multiple options such as "4×", "8×", and "16×", and the user may select one of the options as a frame interpolation multiple used in a frame interpolation algorithm.

In some embodiments, the mobile phone determines, based on a motion start tag and a motion end tag, an audio stream that is in a first audio stream and that corresponds to a motion interval, and recognizes a speech in the audio stream corresponding to the motion interval by using a speech recognition algorithm. If recognition succeeds, corresponding text is generated, and the text corresponding to the speech is displayed in a caption form when a video of a slow-motion interval is played. It may be understood that an audio stream including the speech may be a part or all of the audio stream corresponding to the motion interval.

It may be understood that, based on a timeline, there is a correspondence between an image frame in the first video stream and an audio frame in the first audio stream. For example, one image frame corresponds to one audio frame, one image frame corresponds to a plurality of audio frames, or a plurality of image frames correspond to one audio frame. An image frame from which a caption starts to be displayed may be determined based on an audio frame that is in the motion interval and from which the speech starts.

In an example, text corresponding to a speech is combined and displayed in image frames corresponding to the speech. For example, the text corresponding to the speech in the motion interval is "Come on". If duration of the speech "Come on" is first duration, and the frame interpolation multiple is N (N>1), display duration of the text "Come on" is first duration*N. In other words, if the speech "Come on" in the first audio stream corresponds to M image frames in the first video stream, and the frame interpolation multiple for performing frame interpolation processing on image frames of the motion interval in the first video stream is N (N>1), the text "Come on" is displayed in M*N frames in the second video stream.

Figure 13A:
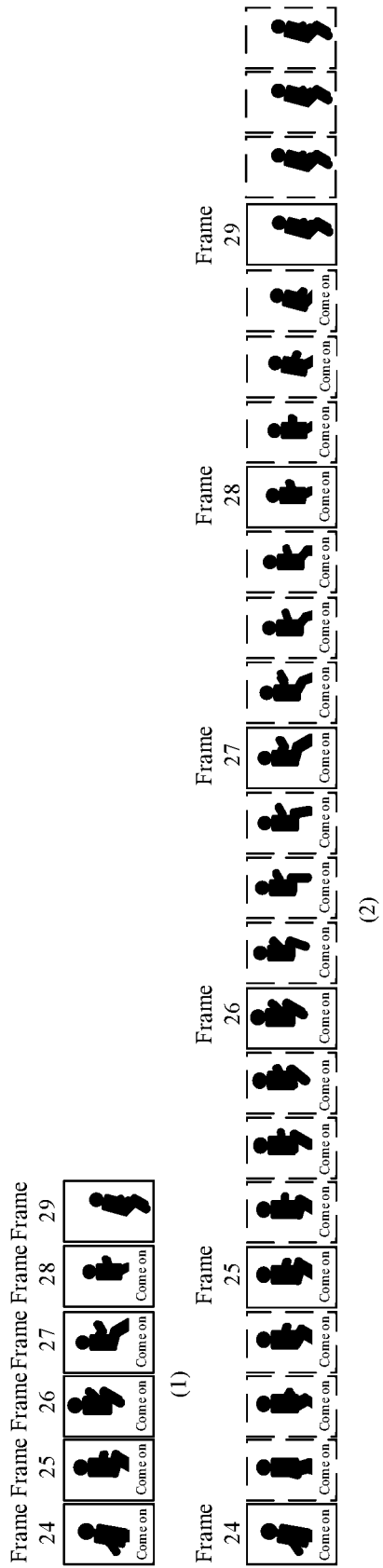
FIG. 13A is a schematic diagram of an example of a scenario of a video processing method according to an embodiment of this application.

For example, as shown in FIG. 13A(1), the image frames in the first video stream that correspond to the motion interval include the twenty-fourth image frame to the twenty-ninth image frame. Speech recognition is performed on the audio stream that is in the first audio stream and that corresponds to the motion interval, and the recognized text is "Come on". The audio stream including the speech "Come on" corresponds to the twenty-fourth image frame to the twenty-eighth image frame (that is, M=5) in the first video stream. It may be determined that the image frame from which the caption starts to be displayed is the twenty-fourth frame, and the frame interpolation multiple for performing frame interpolation processing on the motion interval is 4 (N=4). As shown in FIG. 13A(2), the text "Come on" is displayed in 20 (5*4) frames in the second video stream.

In another example, each word in the speech is displayed in image frames corresponding to the word. For example, the text corresponding to the speech in the motion interval is "Come on". If a speech "Come" corresponds to M1 image frames in the first video stream, and the frame interpolation multiple for performing frame interpolation processing on the image frames of the motion interval in the first video stream is N (N>1), text "Come" is displayed in M1*N frames in the second video stream. If a speech "on" corresponds to M2 image frames in the first video stream, and the frame interpolation multiple for performing frame interpolation processing on the image frames of the motion interval in the first video stream is N (N>1), text "on" is displayed in M2*N frames in the second video stream.

Figure 13B:
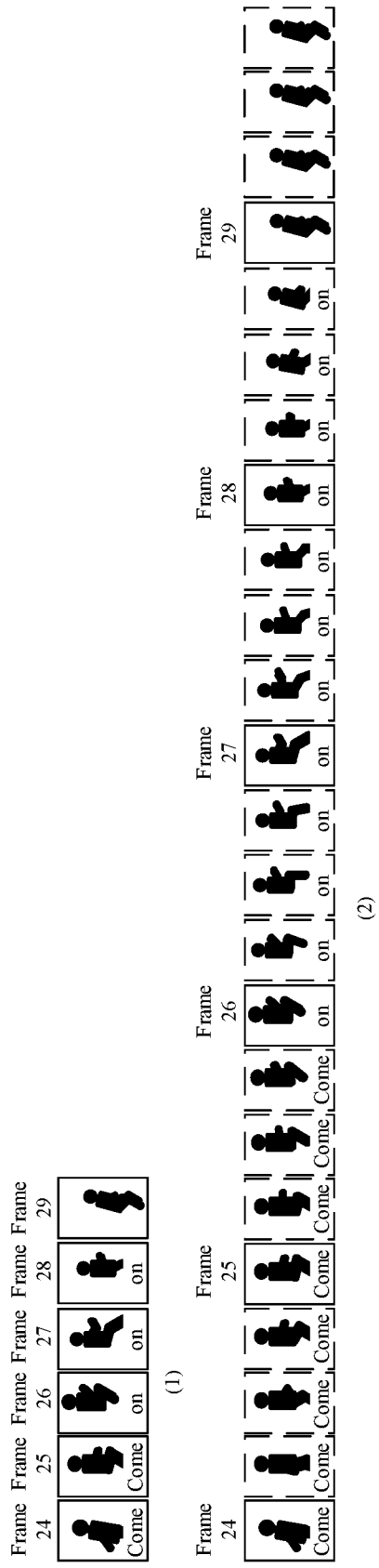
FIG. 13B is a schematic diagram of an example of a scenario of a video processing method according to an embodiment of this application.

For example, as shown in FIG. 13B(1), the image frames in the first video stream that correspond to the motion interval include the twenty-fourth image frame to the twenty-ninth image frame. Speech recognition is performed on the audio stream corresponding to the motion interval, and it is recognized that the text corresponding to the speech is "Come on". An audio stream including the speech "Come" corresponds to the twenty-fourth image frame and the twenty-fifth image frame (that is, M1=2) in the first video stream, and an audio stream including the speech "on" corresponds to the twenty-sixth image frame to the twenty-eighth image frame (that is, M2=3) in the first video stream. It may be determined that an image frame from which a caption "Come" starts to be displayed is the twenty-fourth frame, an image frame from which a caption "on" starts to be displayed is the twenty-sixth frame, and the frame interpolation multiple for performing frame interpolation processing on the motion interval is 4 (N=4). As shown in (b) in FIG. 13B(1) and FIG. 13B(2), in the second video stream, the text "Come" is displayed in eight (2*4) frames, and the text "on" is displayed in 12 (3*4) frames. It may be learned that the text "Come" is displayed in the twenty-fourth image frame, interpolated image frames between the twenty-fourth image frame and the twenty-fifth image frame, the twenty-fifth image frame, and interpolated image frames between the twenty-fifth image frame and the twenty-sixth image frame, and the text "on" is displayed in the twenty-sixth image frame, interpolated image frames between the twenty-sixth image frame and the twenty-seventh image frame, the twenty-seventh image frame, interpolated image frames between the twenty-seventh image frame and the twenty-eighth image frame, the twenty-eighth image frame, and interpolated image frames between the twenty-eighth image frame and the twenty-ninth image frame. In this way, display duration of each word is N times (the frame interpolation multiple) speech duration corresponding to the word. In the played slow-motion video, display duration of each word in the caption is extended by four times (the same as the frame interpolation multiple), and the caption matches slow-motion images.

Figure 14A:
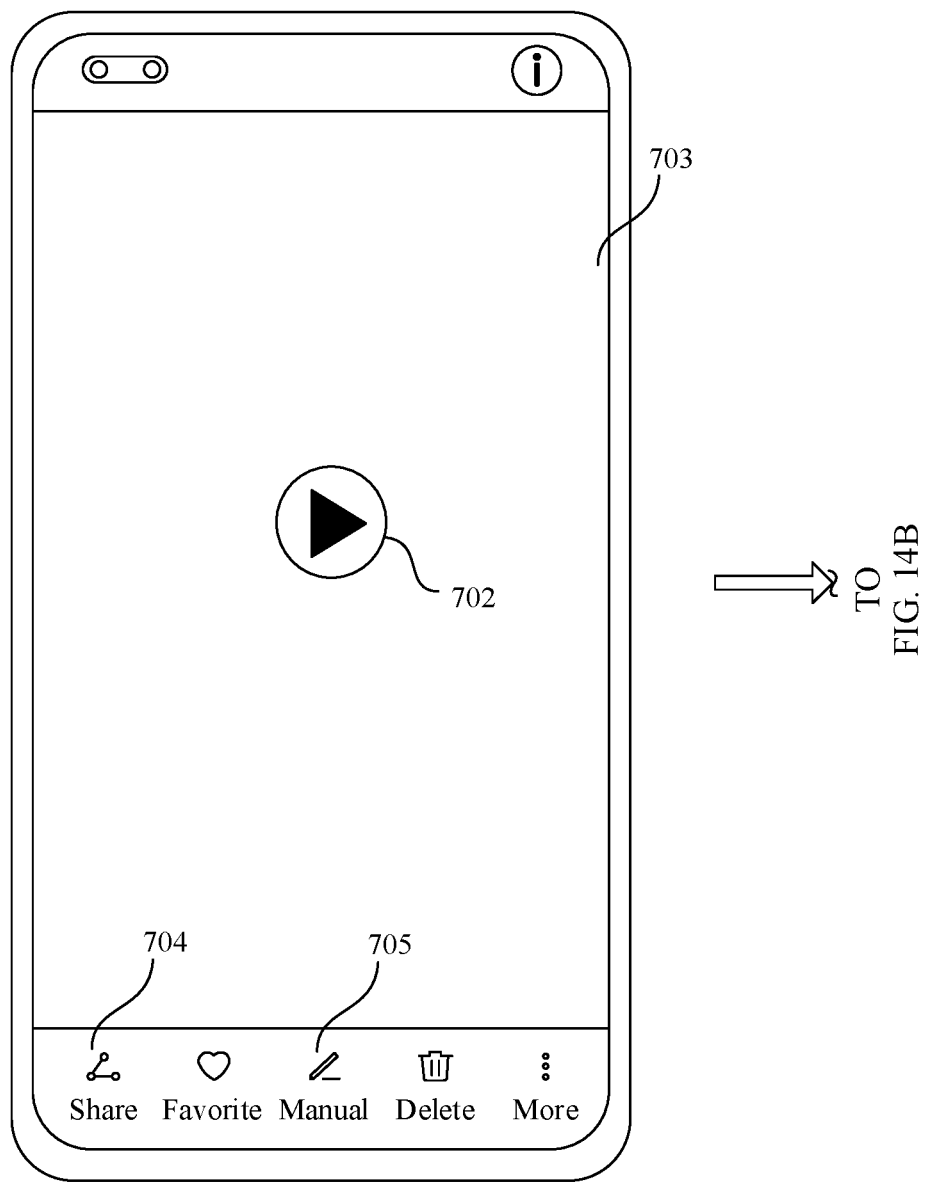
FIG. 14A and FIG. 14B are schematic diagrams of an example of a scenario of a video processing method according to an embodiment of this application.
Figure 14B:
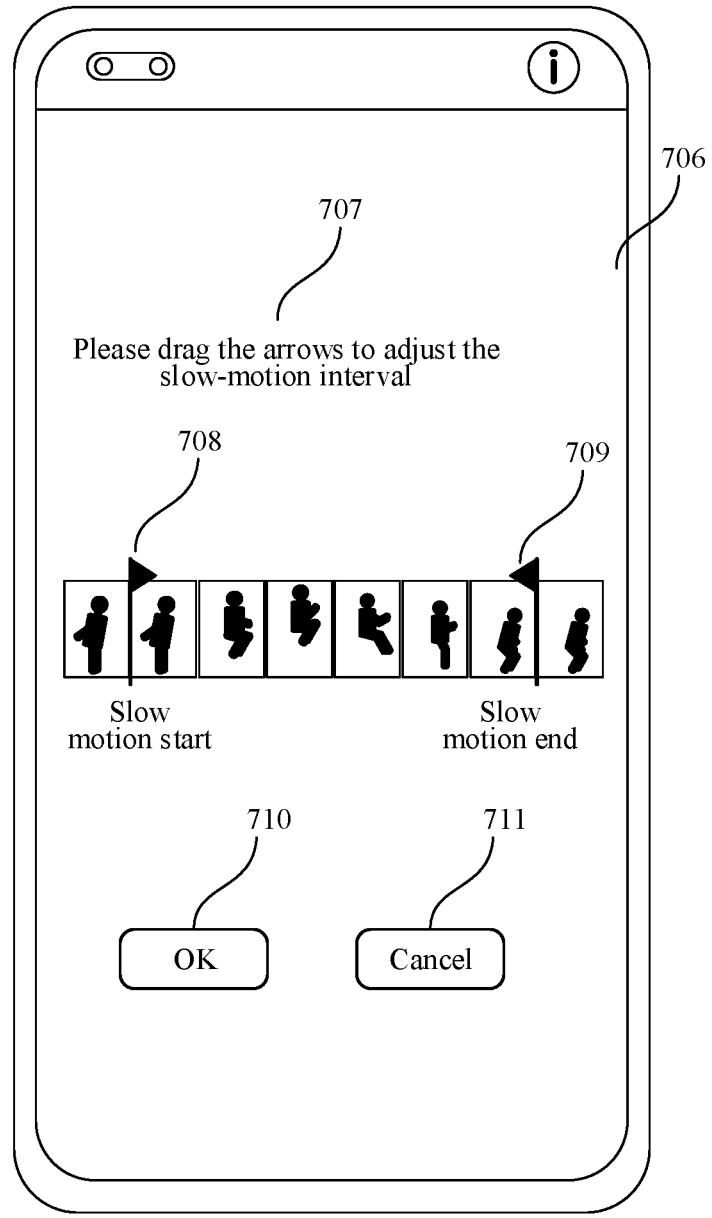

In some embodiments, the user may manually adjust a slow-motion play interval (that is, the motion interval). For example, as shown in FIG. 14A and FIG. 14B, the play interface 703 of the video 1 further includes a "Manual" button 705. The user may tap the "Manual" button 705 to manually adjust the slow-motion play interval. When receiving a tapping operation of the user on the "Manual" button 705, the mobile phone displays an interface 706 for manually adjusting the slow-motion play interval. For example, the interface 706 includes prompt information 707, used to prompt the user to manually adjust the slow-motion play interval. The interface 706 displays a segment of image frames. In an example, the interface 706 displays image frames on which frame interpolation processing is not performed. The interface 706 further includes a "Slow motion start" icon 708 and/or a "Slow motion end" icon 709, and image frames between the "Slow motion start" icon 708 and the "Slow motion end" icon 709 are the slow-motion play interval. The user may separately adjust the "Slow motion start" icon 708 or the "Slow motion end" icon 709. The interface 706 further includes an "OK" button 710 and a "Cancel" button 711. The user may tap the "OK" button 710 to store a change made to the slow-motion play interval, or the user may tap the "Cancel" button 711 to cancel a change made to the slow-motion play interval.

In an implementation, in response to receiving of a tapping operation of the user on the "OK" button 710, the mobile phone determines a motion start tag based on a location of the "Slow motion start" icon 708, determines a motion end tag based on a location of the "Slow motion end" icon 709, and updates a motion start tag and a motion end tag that are stored in a mark file. Further, the mobile phone performs, based on the updated motion start tag and motion end tag, frame interpolation processing on the image frames in the first video stream that correspond to the motion interval, to generate an updated second video stream; and further processes the first audio stream based on the updated motion start tag and motion end tag, to generate an updated second audio stream. Optionally, the mobile phone may further match a soundtrack based on the updated motion start tag and motion end tag, to generate a caption. Further, the mobile phone generates an updated second video file based on the updated second video stream and the updated second audio stream, and replaces a stored second video file with the updated second video file. In this way, when subsequently playing or forwarding the video, the user uses the updated second video file.

Figure 15:
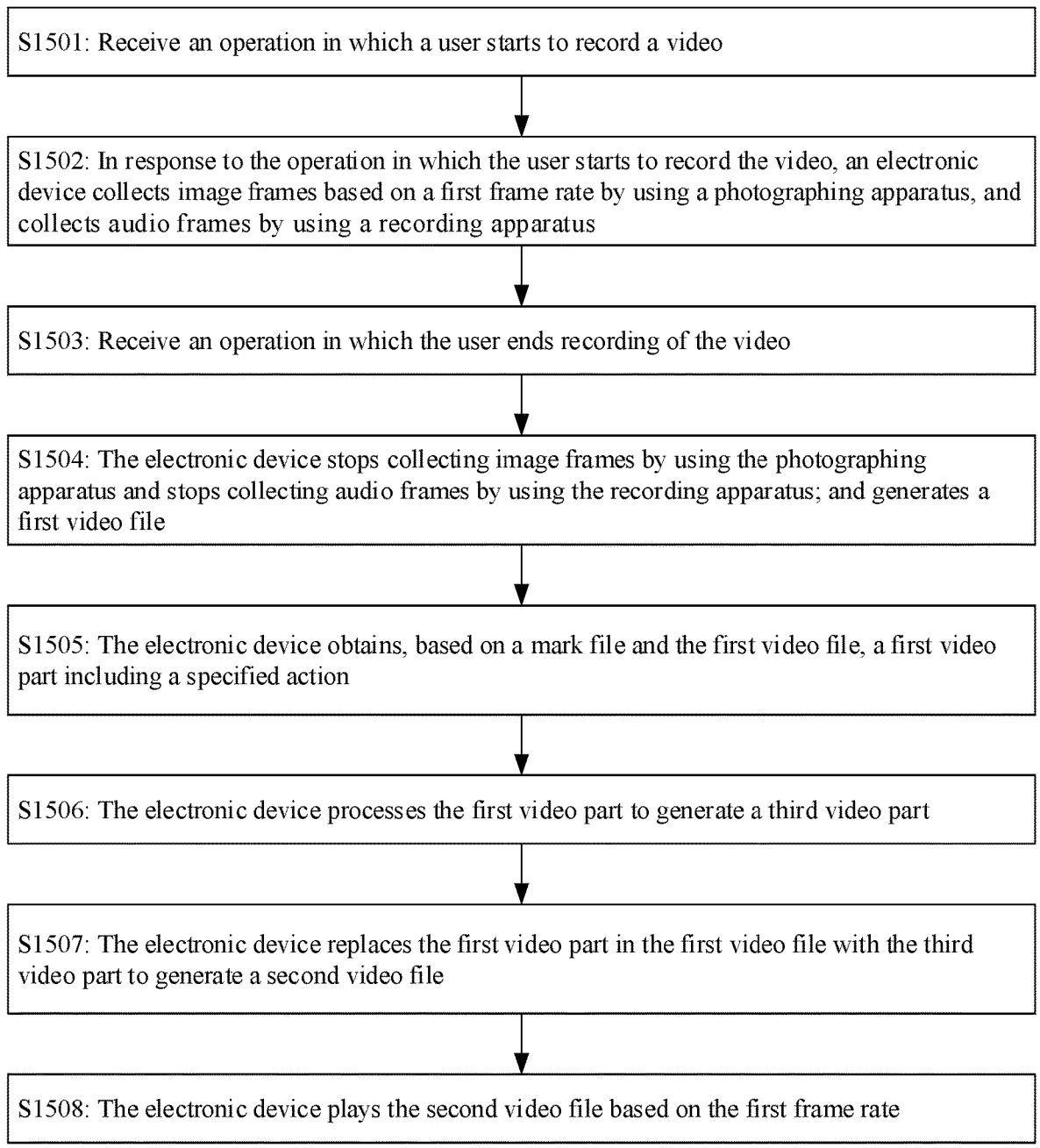
FIG. 15 is a schematic flowchart of a video processing method according to an embodiment of this application.

For example, FIG. 15 is a schematic flowchart of a video processing method according to an embodiment of this application. As shown in FIG. 15, the method may include the following steps.

S1501: Receive an operation in which a user starts to record a video.

For example, the user starts, by using the method shown in FIG. 5A to FIG. 5E, to record the video. For example, when receiving an operation in which the user taps the "Record" button 208, a mobile phone determines that the mobile phone receives the operation in which the user starts to record the video.

S1502: In response to the operation in which the user starts to record the video, an electronic device collects image frames based on a first frame rate by using a photographing apparatus, and collects audio frames by using a recording apparatus.

In an example, the photographing apparatus is a camera of the mobile phone, and the recording apparatus is a microphone. In response to the operation in which the user starts to record the video, the mobile phone collects image frames by using the camera, where a shooting frame rate is the first frame rate; and collects audio frames by using the microphone. For example, the first frame rate is 24 fps.

S1503: Receive an operation in which the user ends recording of the video.

For example, when receiving an operation in which the user taps the "Stop" button 210 in FIG. 5E, the mobile phone determines that the mobile phone receives the operation in which the user ends recording of the video.

S1504: The electronic device stops collecting image frames by using the photographing apparatus and stops collecting audio frames by using the recording apparatus; and generates a first video file.

The electronic device obtains image frames collected by the camera, to generate a preview video stream, and obtains audio frames collected by the recording apparatus, to generate an audio stream. The electronic device combines the preview video stream and the audio stream into a normal-speed video file, namely, the first video file.

In an implementation, the electronic device may perform resolution reduction processing on the preview video stream, detect a specified action in a video stream that undergoes resolution reduction processing, and generate mark information; and record the mark information in a mark file. For example, the mark file may include the foregoing content in Table 1 or Table 2. For example, the mark information includes specified-motion start information and specified-motion end information. The specified-motion start information is used to indicate an image frame whose image includes a start action of the specified action, and the specified-motion end information is used to indicate an image frame whose image includes an end action of the specified action.

S1505: The electronic device obtains, based on the mark file and the first video file, a first video part including the specified action.

The preview video stream includes the first video part including first image frames and a second video part including second image frames. The first image frames are image frames including the specified action, and the second image frames are image frames that do not include the specified action. For example, the first image frames are the twenty-fourth frame to the twenty-ninth frame of a preview video stream in FIG. 2A, and there are six frames in total.

The electronic device determines, based on the mark information in the mark file, the image frames in the preview video stream that include the specified action, in other words, obtains the first video part.

S1506: The electronic device processes the first video part to generate a third video part.

In an implementation, the electronic device performs frame interpolation processing on the first video part to generate the third video part. In this way, a quantity of image frames in the third video part is greater than a quantity of image frames in the first video part, so that slow-motion playing of the specified action can be implemented. For example, as shown in FIG. 9A, the first video part includes the twenty-fourth frame to the twenty-ninth frame, and there are six image frames in total. After frame interpolation processing, as shown in FIG. 9B, the third video part includes 24 image frames.

In an implementation, the electronic device performs frame extraction processing on the first video part. In this way, the quantity of image frames in the third video part is less than the quantity of image frames in the first video part, so that fast-motion playing of the specified action can be implemented.

In some embodiments, the electronic device obtains the first video file, detects the specified action in the preview video stream, and obtains the mark information. Then, the electronic device processes the first video part.

In some other embodiments, when receiving an operation in which the user plays the video for the first time, the electronic device obtains the first video part based on the mark information, and processes the first video part.

S1507: The electronic device replaces the first video part in the first video file with the third video part to generate a second video file.

The second video file includes the third video part and the second video part.

S1508: The electronic device plays the second video file based on the first frame rate.

In an implementation, the audio stream collected by the electronic device includes a first audio part corresponding to the first video part (image frames including the specified action) on a timeline and a second audio part corresponding to the second video part (image frames that do not include the specified action) on the timeline. The electronic device performs speech recognition on the first audio part, and generates text; and determines a video sub-part that is in the first video part and that corresponds to audio (a first audio sub-part) including a speech on the timeline.

When the second video file is played, the text is displayed in a caption form in a first video sub-part in the third video part. The first video sub-part in the third video part is obtained by performing frame interpolation processing on the video sub-part that is in the first video part and that includes the speech. In other words, matching between a caption and image frames that undergo frame interpolation processing is implemented.

In an example, as shown in FIG. 13A, image frames corresponding to the audio including the speech are the twenty-fourth frame to the twenty-eighth frame, and there are five frames in total; and the text corresponding to the speech is "Come on". Duration of audio frames (the first audio sub-part) corresponding to the twenty-fourth image frame to the twenty-eighth image frame is first duration (corresponding duration for displaying five image frames). After N times (a frame interpolation multiple) frame interpolation processing is performed on the twenty-fourth frame to the twenty-eighth frame, the text "Come on" is displayed in 20 image frames (N times the first duration).

In an example, as shown in FIG. 13B, image frames corresponding to the audio including the speech are the twenty-fourth frame to the twenty-eighth frame, and there are five frames in total; and the text corresponding to the speech is "Come on". Text "Come" (first text) corresponds to the twenty-fourth image frame and the twenty-fifth image frame, and duration of corresponding audio frames is first duration (corresponding duration for displaying two image frames). After N times (a frame interpolation multiple) frame interpolation processing is performed on the twenty-fourth frame to the twenty-eighth frame, the text "Come" is displayed in eight image frames (N times the first duration).

In some embodiments, when receiving an operation in which the user edits the video, the electronic device displays a first interface. When receiving an operation in which the user modifies, in the first interface, an interval range of the image frames including the specified action, the electronic device updates the mark information based on a modified interval range of the image frames including the specified action. For example, the first interface is the interface 706 in FIG. 14A and FIG. 14B. When receiving an operation in which the user adjusts the "Slow motion start" icon 708 or the "Slow motion end" icon 709 in the interface 706, the electronic device updates the mark information based on a location of the "Slow motion start" icon 708 or the "Slow motion end" icon 709. In this way, the electronic device may process the first video file based on the updated mark information, to generate an updated second video file.

According to the video processing method provided in this embodiment of this application, the first video file is shot based on a first shooting frame rate, and the specified action (for example, a specified motion action) is detected in image frames (a first video stream) in the first video file. Frame interpolation processing is performed, by using a frame interpolation algorithm, on image frames in the first video stream that correspond to a motion interval. A video stream that undergoes frame interpolation processing is played based on a first playing frame rate (First playing frame rate=First shooting frame rate). Therefore, automatic slow-motion playing of the specified action is implemented. In this method, when the specified action is detected, slow-motion playing is automatically performed, so that a manual operation of the user is avoided, and a captured slow action is more accurate, thereby improving user experience. In addition, the video is recorded at the shooting frame rate that is the same as the playing frame rate, so that the video can be recorded by using an advanced capability such as DCG or PDAF, thereby improving video quality.

The mobile phone obtains a video, and may detect an audio stream in a video file to determine audio frames including a speech, and determine image frames (referred to as image frames including the speech in this embodiment of this application) corresponding to the audio frames including the speech. An embodiment of this application provides a video processing method. Frame extraction or frame interpolation processing is not performed on image frames including a speech, to implement normal-speed playing, and image frames that do not include the speech are processed. For example, in an implementation, frame extraction processing is performed on image frames (that is, image frames corresponding to audio frames that do not include a speech) in a video file that do not include the speech, to implement fast-motion playing. In another implementation, frame interpolation processing is performed on image frames (that is, image frames corresponding to audio frames that do not include a speech) in a video file that do not include the speech, to implement slow-motion playing. The following embodiments provide detailed descriptions by using an example in which frame extraction processing is performed on image frames that do not include a speech, to implement fast-motion playing.

Figure 16A:
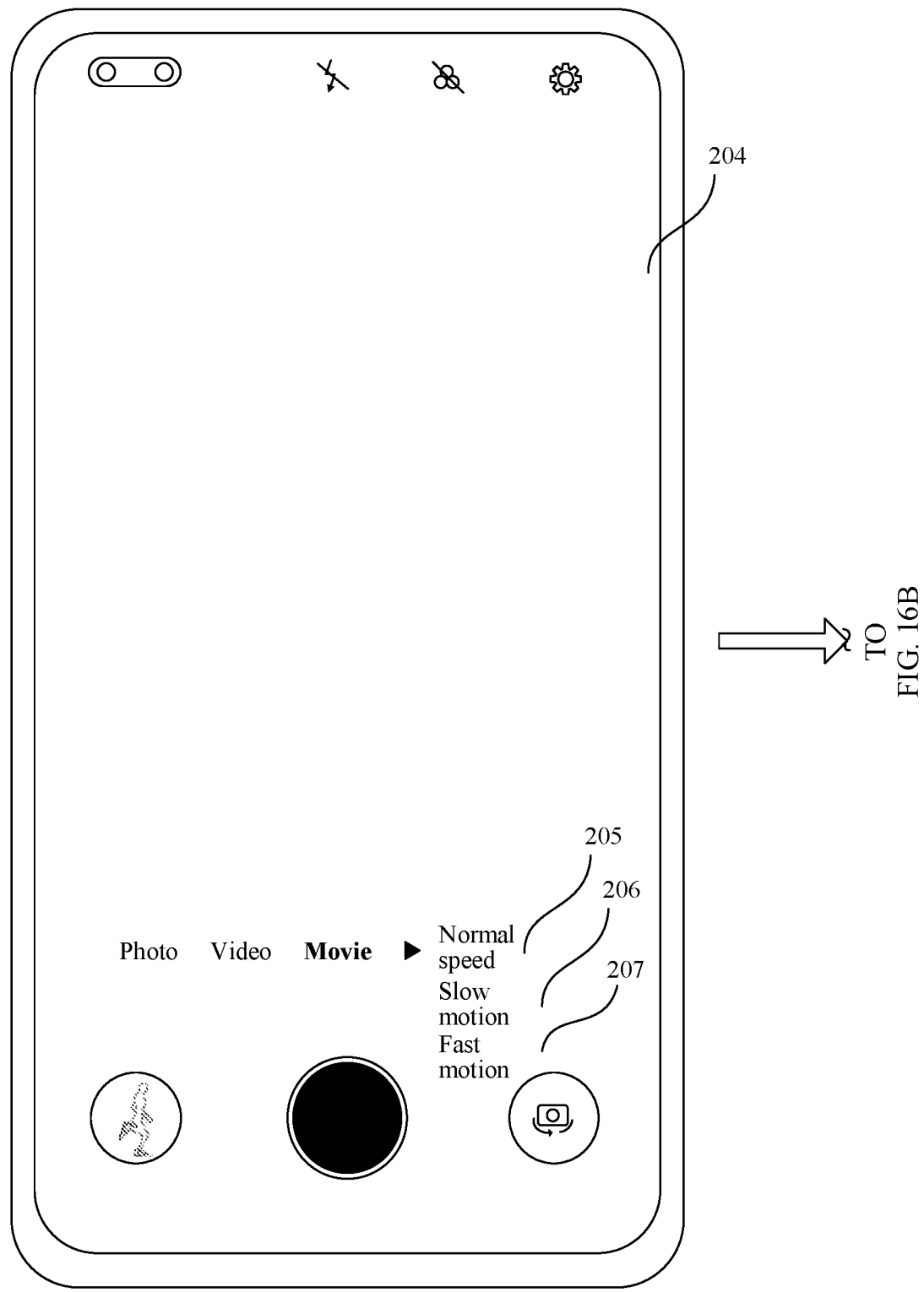
FIG. 16A and FIG. 16B are schematic diagrams of an example of a scenario of a video processing method according to an embodiment of this application.
Figure 16B:
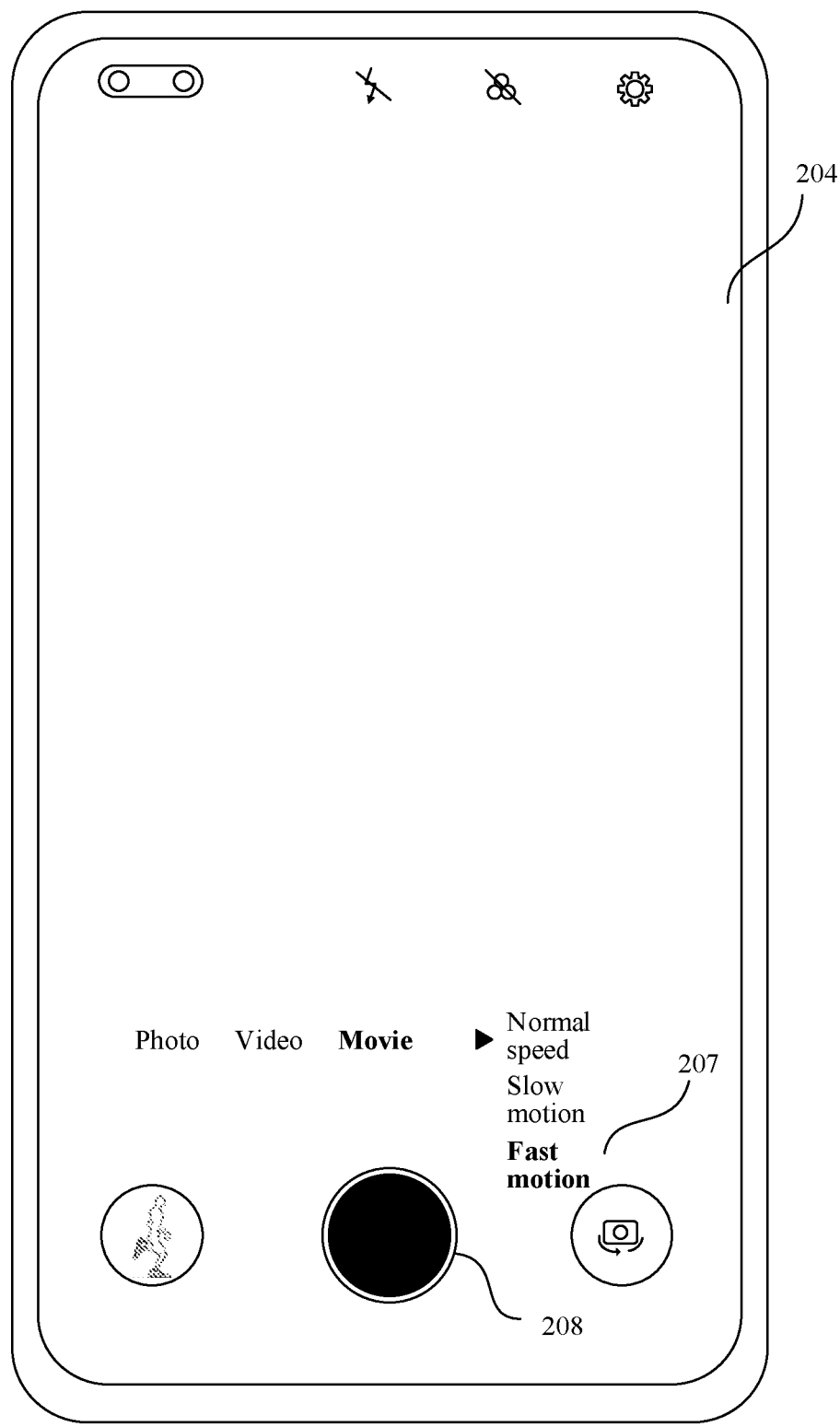

In an implementation, the mobile phone obtains a video, that is, obtains a normal-speed video file. The mobile phone may obtain a normal-speed video file by using a similar method to a slow-motion video. For example, the user opens the "Movie" interface 204 of the mobile phone by using the method shown in FIG. 5A to FIG. 5E. As shown in FIG. 16A and FIG. 16B, the "Movie" option in the "Movie" interface 204 includes the "Fast motion" sub-option 207. The user may tap the "Fast motion" sub-option 207 to choose to enter the fast-motion video mode. When receiving an operation in which the user taps the "Record" button 208, the mobile phone starts to record a video. For example, the camera of the mobile phone collects images based on a preset first shooting frame rate (for example, 24 fps), and the microphone of the mobile phone collects audio.

For example, as shown in FIG. 6, in response to an operation of the user on the camera application, the camera application enables the camera and the microphone. The camera of the mobile phone collects images, and generates a video stream, namely, image frames displayed in a preview interface, by using the codec. The video stream is referred to as a preview video stream. The microphone of the mobile phone collects audio, and generates an audio stream by using the codec.

In an implementation, the video pre-processing algorithm unit at the hardware abstraction layer analyzes the audio stream. For example, the speech recognition module of the video pre-processing algorithm unit performs speech recognition on the audio stream, obtains a speech in the audio stream, and determines audio frames including the speech. Optionally, the speech recognition module analyzes the speech to obtain a speech including effective semantics, and further determines, based on the audio frames including the speech, image frames including the speech. For example, the speech recognition module obtains the twenty-first image frame to the thirty-second image frame as the image frames including the speech. The speech recognition module transmits a result of the image frames including the speech to the speech analysis module.

The speech analysis module marks a speech start tag and a speech end tag based on the result of the image frames including the speech. For example, the speech analysis module obtains the twenty-first image frame to the thirty-second image frame as an interval including the speech. In an example, the speech start tag is marked as the twenty-first image frame, and the speech end tag is marked as the thirty-second image frame. In another example, the twenty-first frame of image corresponds to a first moment on a timeline, the thirty-second frame of image corresponds to a second moment on the timeline, the speech start tag is marked as the first moment, and the speech end tag is marked as the second moment.

In an implementation, the video pre-processing algorithm unit sends the marked speech start tag and speech end tag to the camera application through the reporting channel at the hardware abstraction layer. The camera application sends the marked speech start tag and speech end tag to the media codec service at the framework layer.

In addition, the preview video stream and the audio stream at the hardware layer are sent to the media codec service at the framework layer through the reporting channel at the hardware abstraction layer.

The media codec service combines the preview video stream and the audio stream into a normal-speed video file (the first video file), and further stores the marked speech start tag and speech end tag in a mark file as metadata (Metadata). The normal-speed video file and the corresponding mark file are jointly stored in a video container. A specific form of storing the speech start tag and the speech end tag in the mark file is not limited in this embodiment of this application. As an example, reference may be made to the descriptions (Table 1 and Table 2) in the embodiments related to slow-motion playing.

After the first video file is generated, a video part that is in the video stream and that includes the speech may be obtained based on the mark file, and processing (for example, frame extraction processing) may be performed on a video part that does not include the speech, to generate a video file that undergoes frame extraction processing. In this way, during video playing, the video file that undergoes frame extraction processing may be directly played, to implement automatic playing of a video with a fast-motion effect.

In an implementation, after receiving, for the first time, an operation in which the user starts to play the video, the mobile phone performs processing (for example, frame extraction processing) on the video part that does not include the speech, to generate the video file that undergoes frame extraction processing, thereby implementing automatic playing of a fast-motion effect. Subsequently, after receiving, again, the operation in which the user starts to play the video, the mobile phone may directly play the video file that undergoes frame extraction processing, without performing frame extraction processing again.

It may be understood that a trigger occasion for processing the video part that does not include the speech is not limited in this embodiment of this application. For example, the video part that does not include the speech may be alternatively processed after the first video file is generated. The following describes in detail an implementation of this embodiment of this application by using an example in which after receiving, for the first time, the operation in which the user starts to play the video, the mobile phone processes the video part that does not include the speech.

The user may start to play a video or edit a video on the mobile phone. Playing a video is used as an example. Refer to FIG. 7 and the descriptions of FIG. 7. The user starts to play the video 1.

In an example, in response to a tapping operation of the user on the play button 702, the mobile phone enables a video player application. As shown in FIG. 8, the video player application determines to start the video 1, and invokes a media framework to start to play the video 1. The media framework obtains a video file corresponding to the video 1 from a codec by using a media codec service. For example, a video container corresponding to the video 1 includes a first video file and a mark file. The video encoding/decoding unit decodes the first video file and the mark file in the video container to obtain a decoded first video file and mark file, and transmits the decoded first video file and mark file to the media framework. The media frame obtains the speech start tag and the speech end tag in the mark file, obtains, based on the first video file, the speech start tag, and the speech end tag, image frames including the speech and image frames that do not include the speech.

For example, the first video file includes a first video stream and a first audio stream. As shown in FIG. 2C, a shooting frame rate of the first video stream is 24 fps, duration of the first video file is 2s, and the first video stream includes 48 image frames. The speech start tag corresponds to the twenty-first image frame, and the speech end tag corresponds to the thirty-second image frame. The image frames that do not include the speech include the first image frame to the twentieth image frame and the thirty-third image frame to the forty-eighth image frame.

Figure 17:
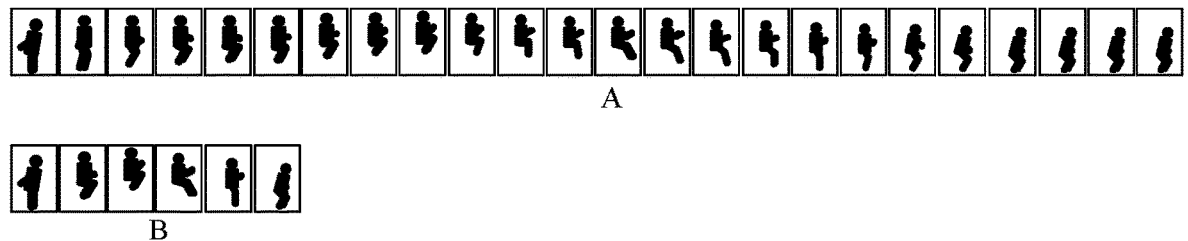
FIG. 17 is a schematic diagram of an example of a scenario of a video processing method according to an embodiment of this application.

The media framework requests the video post-processing service to perform fast-motion image processing on an interval that does not include the speech. For example, the media framework sends the image frames that do not include the speech to the video post-processing service. The video post-processing service transmits the request (including the image frames that do not include the speech) of the media framework to the video post-processing algorithm unit at the hardware abstraction layer. The video post-processing algorithm unit performs, by using a preset frame extraction algorithm and a related hardware resource (for example, a CPU, a GPU, and an NPU), frame extraction processing on the image frames corresponding to the interval that does not include the speech. The video post-processing algorithm unit may perform frame extraction processing by using any frame extraction algorithm in conventional technologies. For example, 4× frame extraction processing is performed on the image frames, that is, one frame is extracted from every four image frames and retained. For example, as shown in FIG. 17A, image frames existing before frame extraction processing are 24 frames. After 4× frame extraction processing, as shown in FIG. 17B, six image frames are retained.

The video post-processing service returns, to the media frame, image frames that undergo frame extraction processing and that are generated by the video post-processing algorithm unit. The media framework replaces the image frames in the first video stream that correspond to the interval that does not include the speech with the image frames that undergo frame extraction processing, to obtain a second video stream. Image frames in the second video stream that correspond to the interval that does not include the speech are one fourth of the image frames in the first video stream that correspond to the interval that does not include the speech. For example, as shown in FIG. 2C, in the first video stream, the interval that does not include the speech correspond to 36 image frames, and in the second video stream, the interval that does not include the speech correspond to nine image frames.

In an implementation, the media framework invokes the video post-processing service to send the second video stream to a display screen for display, that is, play the second video stream on the display screen. A playing frame rate of the second video stream is a preset value and is equal to the shooting frame rate, for example, 24 fps. In this way, duration of the first video stream is 2s, and duration of the second video stream is less than 2s. In the first video stream, a total of 36 image frames do not include the speech, and a total of 12 image frames include the speech. In the second video stream, a total of 9 image frames do not include the speech, and a total of 12 image frames include the speech. Playing time of the interval that does not include the speech is shorter, thereby implementing fast-motion playing. Playing time of an interval including the speech remains unchanged to implement normal-speed playing.

In some embodiments, a frame extraction multiple used in a frame extraction algorithm is a preset value. For example, a frame extraction multiple used in the foregoing example is 4×, that is, 4× fast-motion is implemented. In some embodiments, a plurality of preset values (for example, 4, 8, and 16) of the frame extraction multiple may be preset in the mobile phone, and the user may select one of the preset values as the frame extraction multiple used in the frame extraction algorithm. In other words, the user may select a fast-motion multiple. In an example, the user may select a fast-motion multiple (the frame extraction multiple) when recording a video. For details, refer to the example of setting the slow-motion multiple in FIG. 10.

In some embodiments, the media framework processes the first audio stream based on the speech start tag and the speech end tag. For example, the media framework determines, based on the speech start tag and the speech end tag, an interval that is in the first audio stream and that includes the speech, retains the interval that is in the first audio stream and that includes the speech, and cancels sound of an interval that is in the first audio stream and that does not include the speech. The media framework invokes an audio module to play a processed first audio stream (that is, a second audio stream).

Figure 18:
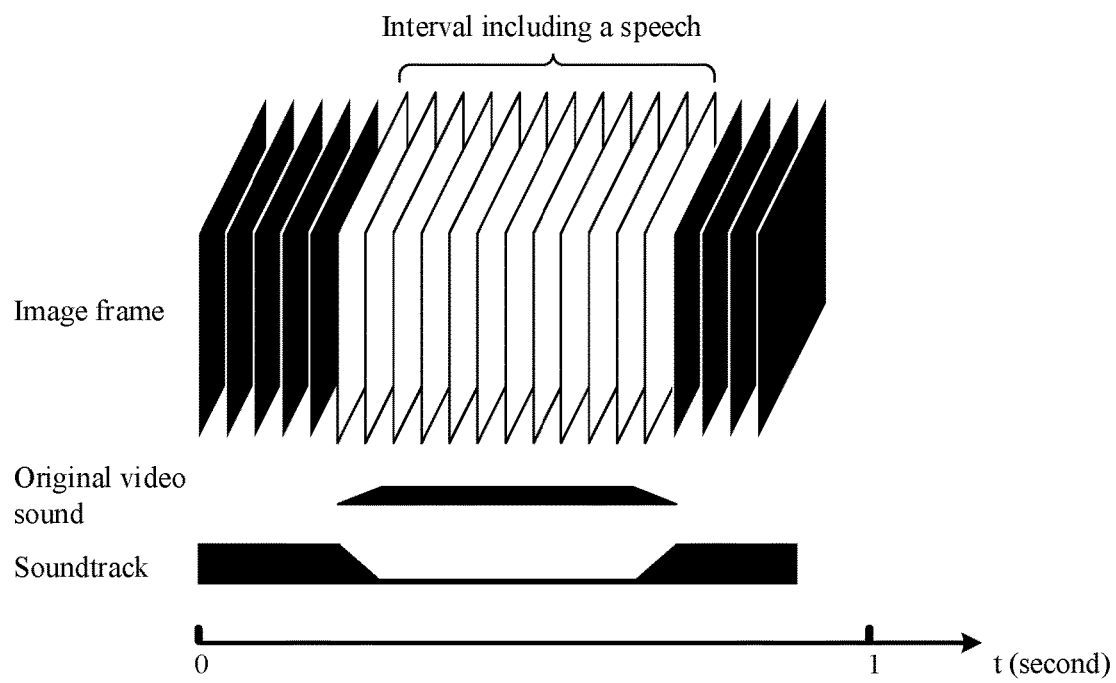
FIG. 18 is a schematic diagram of an example of a scenario of a video processing method according to an embodiment of this application.

In this way, fast-motion playing of the interval that is in the video and that does not include the speech is implemented, and original video sound is not played. The interval that is in the video and that includes the speech is played at the normal speed, and the original video sound is retained. For example, as shown in FIG. 18, the interval that does not include the speech includes nine image frames, and is played at a playing frame rate of 24 fps, to implement fast-motion playing. Sound (the original video sound) of the audio stream is not played in a fast-motion play interval. The interval including the speech includes 12 image frames, and is played at a playing frame rate of 24 fps at the normal speed, and the original video sound is retained.

In an implementation, when the interval including the speech is entered, volume of the original video sound gradually increases; and when the interval including the speech is exited, the volume of the original video sound gradually decreases. In this way, smoother sound experience is brought to the user.

In an implementation, when the video file is played, a soundtrack is further played. For example, the soundtrack is played at low volume in a normal-speed interval (the interval including the speech), and the soundtrack is played at high volume in the fast-motion play interval (the interval that does not include the speech). When the normal-speed interval is entered, volume of the soundtrack gradually decreases; and when the normal-speed interval is exited, the volume of the soundtrack gradually increases.

For example, as shown in FIG. 18, the soundtrack is played in the fast-motion play interval (the interval that does not include the speech). When the normal-speed interval (the interval including the speech) is entered, the volume of the soundtrack gradually decreases, and the volume of the original video sound gradually increases. The volume of the original video sound is higher, and the volume of the soundtrack is lower. When the normal-speed interval (the interval including the speech) is exited, the volume of the original video sound gradually decreases, and the volume of the soundtrack gradually increases.

In some embodiments, the media framework further generates a second video file based on the second video stream and the second audio stream. Optionally, the media framework also incorporates an audio stream of the soundtrack into the second video file. Further, as shown in FIG. 8, the media framework invokes the video post-processing service to store the second video file in the video container corresponding to the video 1. In other words, the video container corresponding to the video 1 includes the first video file, the mark file, and the second video file. The first video file is an original video file. The mark file is a file that records a motion start tag and a motion end tag after motion detection is performed on the original video file. The second video file is a video file that undergoes slow-motion processing is performed on the original video file based on the motion start tag and the motion end tag.

The second video file may be used for playing, editing, forwarding, or the like. In an example, only when the user starts to play the video 1 for the first time or starts to edit the video 1 for the first time, the mobile phone may perform the foregoing processing procedure shown in FIG. 8, to perform fast-motion play based on the first video file and the mark file, and generate the second video file. When the user subsequently starts to play the video 1 or edit the video 1, the mobile phone may directly play or edit the second video file without repeatedly performing the processing procedure shown in FIG. 8. In some embodiments, the user may forward a fast-motion video to another electronic device. For example, as shown in FIG. 12A(1) and FIG. 12A(2), the play interface 703 is a play interface of the video 1, and the user may tap the "Share" button 704 to forward a video file corresponding to the interface. After receiving an operation in which the user taps the "Share" button 704, the mobile phone searches for the video container corresponding to the video 1. If the video container corresponding to the video 1 includes the second video file, the mobile phone forwards the second video file, that is, forwards a video file that undergoes fast-motion processing. In this way, the another electronic device receives the second video file, and plays the second video file, thereby implementing fast-motion playing.

Figure 19A:
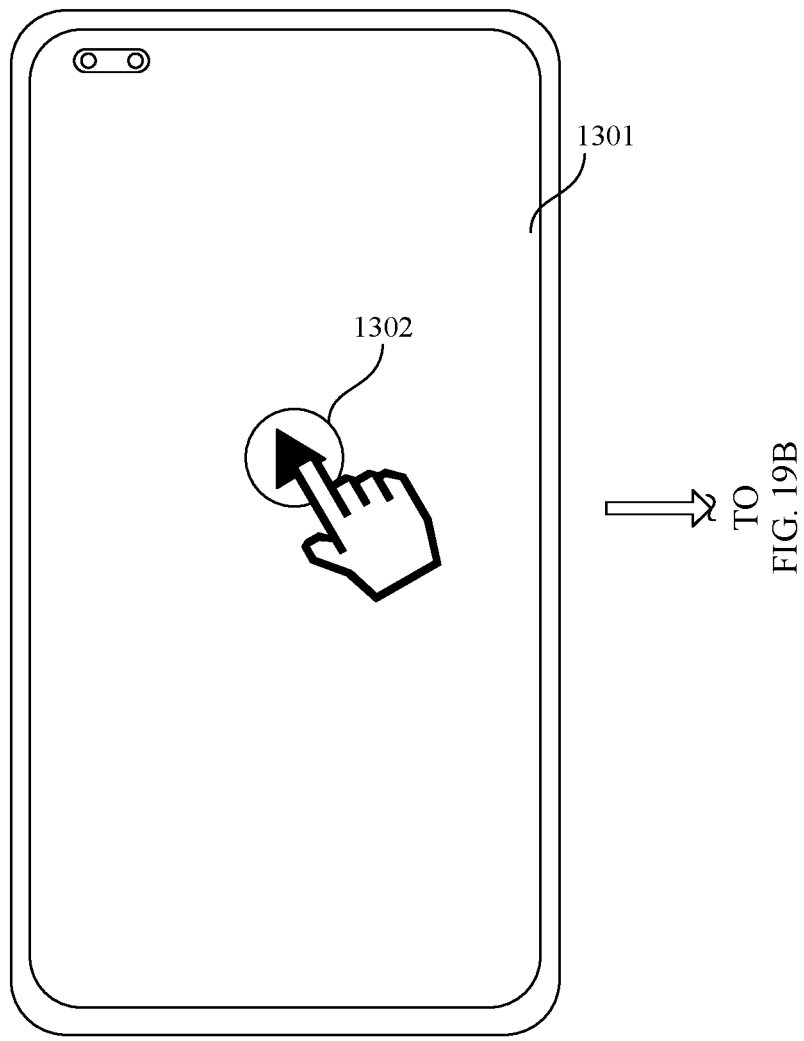
FIG. 19A and FIG. 19B are schematic diagrams of an example of a scenario of a video processing method according to an embodiment of this application.
Figure 19B:
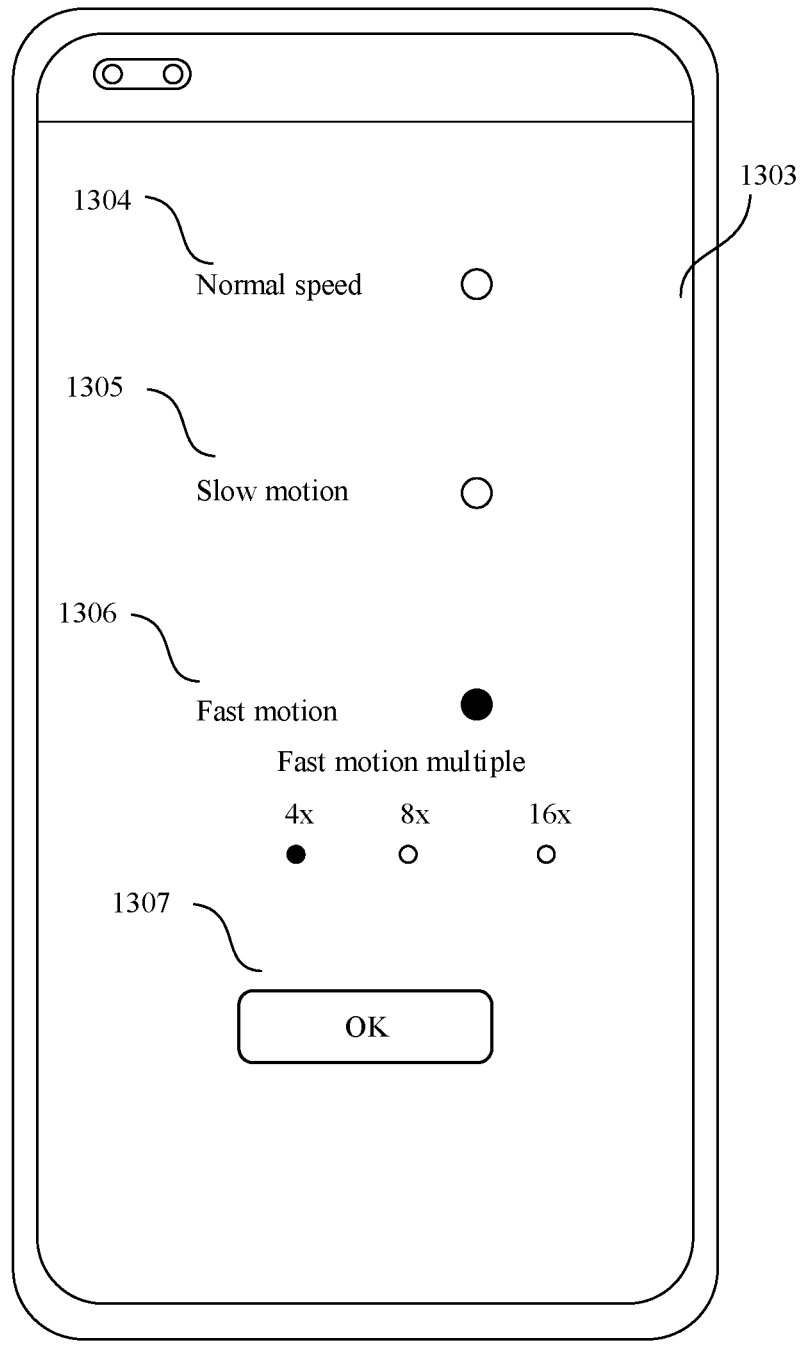

It should be noted that the foregoing embodiment is described by using an example in which the fast-motion video mode is selected when the mobile phone records a video. In some other embodiments, the mobile phone records a video (the first video file) in the normal-speed video mode, or receives a video (the first video file) recorded in the normal-speed video mode from another device, and the user may select the fast-motion video mode when playing the video or editing the video. For example, as shown in FIG. 19A and FIG. 19B, the mobile phone displays a playing start interface 1301 of a video 1, and the playing start interface 1301 includes a "Play" button 1302. In response to a tapping operation of the user on the "Play" button 1302, the mobile phone displays an interface 1303. The interface 1303 includes a "Normal speed" option 1304, a "Slow motion" option 1305, a "Fast motion" option 1306, and the like. For example, the user selects the "Fast motion" option 1306, and taps an "OK" button 1307. In response to the tapping operation of the user on the "OK" button 1307, the mobile phone generates a corresponding mark file based on a first video file (for specific steps, refer to the descriptions in FIG. 6), and performs the processing procedure shown in FIG. 8, to play a fast-motion video, and stores a second video file. For functions of the modules and specific implementation steps, refer to FIG. 6 and FIG. 8. Details are not described herein again. Optionally, as shown in FIG. 19A and FIG. 19B, in response to selecting, by the user, the "Fast motion" option 1306, the interface 1303 of the mobile phone further displays fast-motion multiple options such as "4×", "8×", and "16×", and the user may select one of the options as a frame extraction multiple used in a frame extraction algorithm.

In some embodiments, the mobile phone determines, based on a speech start tag and a speech end tag, an audio stream that is in a first audio stream and that includes a speech, recognizes the speech by using a speech recognition algorithm, generates corresponding text, and displays, in a caption form, the text corresponding to the speech when playing a video of a normal-speed interval.

Figure 20:
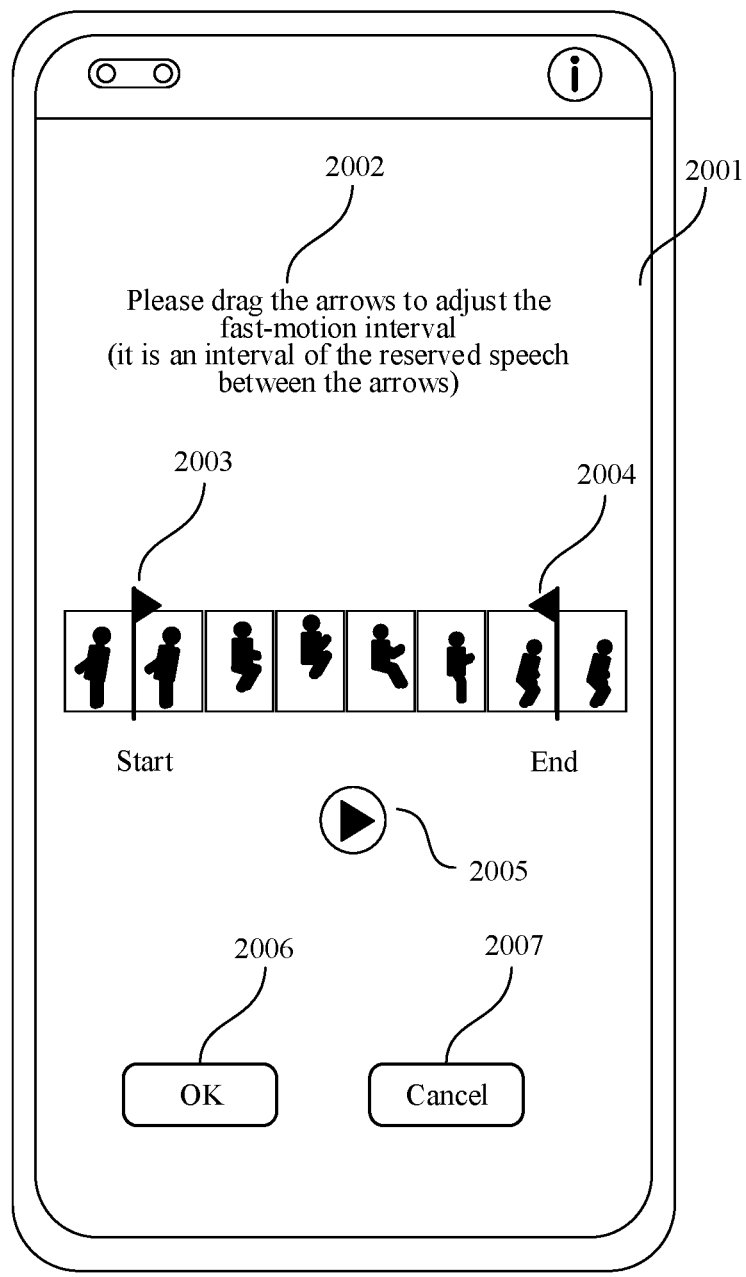
FIG. 20 is a schematic diagram of an example of a scenario of a video processing method according to an embodiment of this application.

In some embodiments, the user may manually adjust a fast-motion play interval. For example, as shown in FIG. 20, the mobile phone displays an interface 2001 for manually adjusting the fast-motion play interval. The interface 2001 includes prompt information 2002, used to prompt the user to manually adjust the fast-motion play interval. The interface 2001 displays a segment of image frames. In an example, the interface 2001 displays image frames existing before frame extraction processing. The interface 2001 further includes a "Start" icon 2003 and an "End" icon 2004, images between the "Start" icon 2003 and the "End" icon 2004 are the normal-speed play interval, and images in front of the "Start" icon 2003 or behind the "End" icon 2004 are the fast-motion play interval. The user may separately adjust the "Start" icon 2003 or the "End" icon 2004.

In an example, a corresponding caption is displayed in the images of the normal-speed play interval. In an implementation, when receiving an operation in which the user moves the "Start" icon 2003 or the "End" icon 2004, the mobile phone determines a speech start tag based on a current location of the "Start" icon 2003, and determines a speech end tag based on a current location of the "End" icon 2004. The mobile phone obtains, based on the current speech start tag and speech end tag, a new interval that is in the first audio stream and that includes the speech; and performs speech recognition on the current interval including the speech, and generates corresponding text. In an example, the mobile phone further displays the generated text in a caption form in images of the current normal-speed play interval. In other words, the normal-speed play interval changes as the user moves the "Start" icon 2003 or the "End" icon 2004, and an interval displaying the caption and caption content are updated as the normal-speed play interval is updated. For example, as shown in FIG. 20, the normal-speed play interval includes six image frames, a caption is displayed in the six frames of images, and caption content is text generated by performing speech recognition based on audio frames corresponding to the six image frames. For example, when the user moves the "Start" icon 2003 backward by one frame, the normal-speed play interval is updated to including five image frames. In this case, the following updating is performed: displaying a caption in the five image frames, and caption content is text generated by performing speech recognition based on audio frames corresponding to the five image frames. In this way, it may be convenient for the user to adjust the normal-speed play interval, that is, adjust the fast-motion play interval, based on speech content (the caption).

In an example, the interface 2001 further includes a "Play" button 2005, and the user may tap the "Play" button 2005 to preview a video that undergoes the "Start" icon 2003 and/or the "End" icon 2004 are/is adjusted. When receiving a tapping operation of the user on the "Play" button 2005, in response to the tapping operation of the user on the "Play" button 2005, the mobile phone updates the speech start tag and the speech end tag, performs fast-motion processing (including frame extraction processing and canceling original video sound, a soundtrack, a generated caption, or the like in the fast-motion play interval) on the first video file based on an updated speech start tag and speech end tag, and plays a video that undergoes fast-motion processing.

In an example, the interface 2001 further includes an "OK" button 2006 and a "cancel" button 2007. The user may tap the "OK" button 2006 to store a change made to the fast-motion play interval, and the user may tap the "Cancel" button 2007 to cancel a change made to the fast-motion play interval. In an implementation, in response to receiving of a tapping operation of the user on the "OK" button 2006, the mobile phone determines a speech start tag based on a location of the "Start" icon 2003, and determines a speech end tag based on a location of the "End" icon 2004; and updates a speech start tag and a speech end tag that are stored in a mark file. Further, the mobile phone performs frame extraction processing, based on an updated speech start tag and speech end tag, on image frames in the first video stream that do not include the speech, to generate an updated second video stream, and further processes the first audio stream based on the updated speech start tag and speech end tag, to generate an updated second audio stream. Optionally, the mobile phone may further match a soundtrack based on the updated speech start tag and speech end tag, to generate a caption. Further, the mobile phone generates an updated second video file based on the updated second video stream and the updated second audio stream, and replaces a stored second video file with the updated second video file. In this way, when subsequently playing or forwarding the video, the user uses the updated second video file.

For example, FIG. 21 is a schematic flowchart of a video processing method according to an embodiment of this application. As shown in FIG. 21, the method may include the following steps.

S2101: An electronic device obtains a first video file, where the first video file includes first image frames and first audio frames, and a shooting frame rate of the first image frames is a first frame rate.

In an implementation, the electronic device obtains the first video file from another device.

In an implementation, the electronic device records the first video file. The electronic device receives an operation in which a user starts to record a video. For example, the user starts, by using the method shown in FIG. 16A and FIG. 16B, to record the video. For example, when receiving an operation in which the user taps a "Record" button, a mobile phone determines that the mobile phone receives the operation in which the user starts to record the video. In response to the operation in which the user starts to record the video, the electronic device collects image frames based on the first frame rate by using a photographing apparatus, and collects audio frames by using a recording apparatus. In an example, the photographing apparatus is a camera of the mobile phone, and the recording apparatus is a microphone. In response to the operation in which the user starts to record the video, the mobile phone collects image frames by using the camera, where a shooting frame rate is the first frame rate; and collects audio frames by using the microphone. For example, the first frame rate is 24 fps. When receiving an operation in which the user ends recording of the video, for example, when receiving an operation in which the user taps a "Stop" button, the mobile phone determines that the mobile phone receives the operation in which the user ends recording of the video. The electronic device stops collecting image frames by using the photographing apparatus and stops collecting audio frames by using the recording apparatus; and generates the first video file. The electronic device obtains image frames collected by the camera, to generate a preview video stream (the first image frames), and obtains audio frames collected by the recording apparatus, to generate an audio stream (the first audio frames). The electronic device combines the preview video stream and the audio stream into a normal-speed video file, namely, the first video file.

The first audio frames include a first audio part including second audio frames and a second audio part including third audio frames, the second audio frames are audio frames that do not include a speech, and the third audio frames are audio frames including the speech.

The first image frames include a first video part including second image frames and a second video part including third image frames, the second image frames (image frames that do not include the speech) correspond to the second audio frames on a timeline, and the third image frames (image frames including the speech) correspond to the third audio frame on the timeline.

In an implementation, the electronic device may perform speech recognition on the first audio frames, mark an interval range of the third audio frames and an interval range of the third image frames, and generate mark information; and record the mark information in a mark file.

S2102: The electronic device obtains, based on the mark file and the first video file, the first video part in the first image frames that does not include the speech.

In other words, the electronic device obtains the image frames in the preview video stream (the first image frames) that do not include the speech.

S2103: The electronic device processes the first video part to generate a third video part.

In an implementation, the electronic device performs frame interpolation processing on the first video part to generate the third video part. In this way, a quantity of image frames in the third video part is greater than a quantity of image frames in the first video part, so that slow-motion playing can be implemented.

In an implementation, the electronic device performs frame extraction processing on the first video part. In this way, the quantity of image frames in the third video part is less than the quantity of image frames in the first video part, so that fast-motion playing can be implemented.

In some embodiments, the electronic device obtains the first video file, and performs speech recognition on the first audio stream, to obtain mark information. Then, the electronic device processes the first video part.

In some other embodiments, when receiving an operation in which the user plays the video for the first time, the electronic device obtains the first video part based on the mark information, and processes the first video part.

S2104: The electronic device replaces the first video part in the first video file with the third video part to generate a second video file.

The second video file includes the third video part and the second video part.

S2105: The electronic device plays the second video file based on the first frame rate.

In other words, the image frames (the second video part) including the speech are played at a normal speed, and hearing feeling of original sound is retained. The image frames that do not include the speech are processed, and a processed video (the third video part) is played, to implement fast-motion playing or slow-motion playing.

In some embodiments, when receiving an operation in which the user edits the video, the electronic device displays a first interface. When receiving an operation in which the user modifies, in the first interface, an image frame interval range corresponding to the audio frames including the speech, the electronic device updates the mark information based on a modified image frame interval range corresponding to the audio frames including the speech. For example, the first interface is the interface 2001 in FIG. 20. When receiving an operation in which the user adjusts the "Start" icon 2003 or the "End" icon 2004 in the interface 2001, the electronic device updates the mark information based on a location of the "Start" icon 2003 or the "End" icon 2004. In this way, the electronic device may process the first video file based on the updated mark information, to generate an updated second video file.

According to the video processing method provided in this embodiment of this application, the first video file is shot based on a first shooting frame rate, and speech recognition is performed on audio frames (the first audio stream) in the first video file, to obtain the image frames including the speech and the image frames that do not include the speech. Frame extraction processing is performed on the image frames that do not include the speech, and a video stream that undergoes frame extraction processing is played at a first playing frame rate (First playing frame rate=First shooting frame rate), to implement fast-motion playing of a video that does not include the speech. Frame extraction processing is not performed on the image frames including the speech, to implement normal-speed playing; and original video sound is normally played, thereby improving user experience.

Two scenarios of slow-motion playing and fast-motion playing are separately described in the foregoing embodiments. It should be noted that the foregoing two scenarios of slow-motion playing and fast-motion playing may be combined. For example, in a video, slow-motion playing is performed in a motion interval, normal-speed playing is performed in an interval including a speech, and fast-motion playing is performed in a remaining part. The embodiments in the foregoing two scenarios may also be randomly combined. For specific implementations, refer to the descriptions in the slow-motion playing scenario and the fast-motion playing scenario in the foregoing embodiments. Details are not described herein.

In some other embodiments, in the foregoing slow-motion playing and fast-motion playing scenarios, the mobile phone may perform atmosphere detection based on a video file, to determine an atmosphere type of the video file, and match a corresponding soundtrack based on the atmosphere type.

For example, a plurality of atmosphere types are preset in the mobile phone. For example, the atmosphere types include childlike, pets, Spring Festival, Christmas, birthday, wedding, graduation, food, arts, travel, sports, and nature. In an implementation, the mobile phone performs image analysis on each image frame in the video file to determine an atmosphere type corresponding to each image frame. For example, if the mobile phone detects that an image frame includes a birthday cake, the mobile phone determines that the image frame corresponds to a "birthday" atmosphere type. The mobile phone determines an atmosphere type of the video with reference to atmosphere types of all image frames in the video file. For example, if the video file includes 48 image frames, and atmosphere types of 35 frames are "birthday", the mobile phone determines that the video corresponds to the "birthday" atmosphere type. In another implementation, the mobile phone performs speech analysis on an audio stream in the video file, and determines an atmosphere type corresponding to the audio stream. For example, based on speech analysis, if the audio stream includes a speech "happy birthday", the mobile phone determines that the video corresponds to the "birthday" atmosphere type. It may be understood that, in another implementation, the mobile phone may determine an atmosphere type of the video with reference to images and audio in the video file.

In an implementation, a plurality of pieces of music are preset in the mobile phone, and a correspondence between an atmosphere type and music is preset. In an example, the correspondence between an atmosphere type and music is shown in Table 3.

TABLE 3

| Atmosphere type | Music |
| --- | --- |
| Childlike, pets, Spring Festival, Christmas, graduation, and travel | Music 1 |
| Birthday, wedding, food, arts, and nature | Music 2 |
| Sports | Music 3 |

In an implementation, a plurality of music types are preset in the mobile phone, and a correspondence between an atmosphere type and a music type is preset. Each music type includes one or more pieces of music. For example, the music type includes cheerful, warm, and intense. In an example, the correspondence between an atmosphere type and music is shown in Table 4.

TABLE 4

| Atmosphere type | Music type | Music |
| --- | --- | --- |
| Childlike, pets, Spring Festival, Christmas, graduation, and travel | Cheerful | Music 1, Music 4, and Music 5 |
| Birthday, wedding, food, arts, and nature | Warm | Music 2 |
| Sports | Intense | Music 3 |

It may be understood that, to achieve the foregoing functions, the electronic device provided in the embodiments of this application includes corresponding hardware structures and/or software modules for performing the functions. A person skilled in the art may be easily aware that, in combination with the example units and algorithm steps described in the embodiments disclosed in this specification, the embodiments of this application can be implemented by hardware or a combination of hardware and computer software. Whether a function is performed by hardware or by driving hardware by using computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the foregoing electronic device may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that division of the modules in the embodiments of this application is an example, and is merely logical function division. During actual implementation, there may be another division manner.

Figure 22:
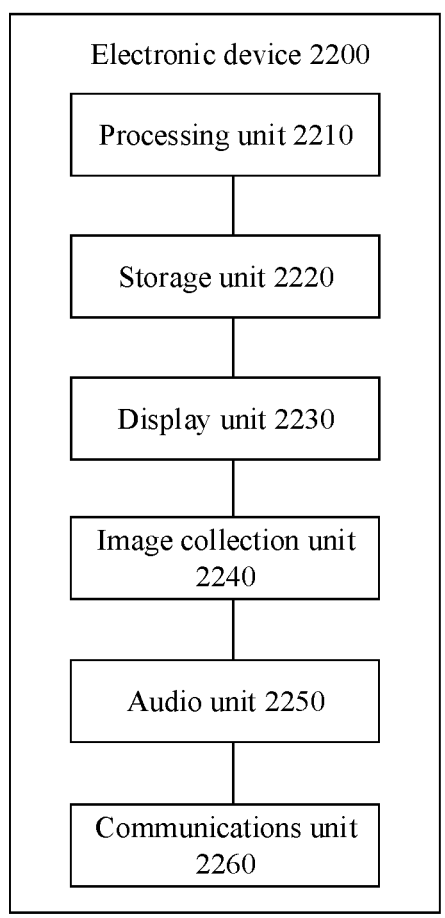
FIG. 22 is a schematic diagram of a structure of an electronic device according to an embodiment of this application.

In an example, FIG. 22 is a schematic diagram of a possible structure of the electronic device in the foregoing embodiments. The electronic device 2200 includes a processing unit 2210, a storage unit 2220, and a display unit 2230.

The processing unit 2210 is configured to control and manage actions of the electronic device 2200, for example, obtaining a first video file, generating a mark file, performing frame interpolation processing or frame extraction processing on image frames, processing an audio stream, and generating a second video file.

The storage unit 2220 is configured to store program code and data of the electronic device 2200, for example, store the first video file, the mark file, and the second video file.

The display unit 2230 is configured to display an interface of the electronic device 2200, for example, display a slow-motion video, display a fast-motion video, or display a normal-speed video.

Certainly, unit modules in the electronic device 2200 include, but are not limited to, the processing unit 2210, the storage unit 2220, and the display unit 2230.

Optionally, the electronic device 2200 may further include an image collection unit 2240. The image collection unit 2240 is configured to collect an image.

Optionally, the electronic device 2200 may further include an audio unit 2250. The audio unit 2250 is configured to collect audio, play audio, and the like.

Optionally, the electronic device 2200 may further include a communications unit 2260. The communications unit 2260 is configured to support the electronic device 2200 in communicating with another device, for example, obtaining a video file from the another device.

The processing unit 2210 may be a processor or a controller, for example, may be a central processing unit (central processing unit, CPU), a digital signal processor (digital signal processor, DSP), an application-specific integrated circuit (application-specific integrated circuit, ASIC), a field programmable gate array (field programmable gate array, FPGA) or another programmable logical device, a transistor logical device, a hardware component, or any combination thereof. The storage unit 2220 may be a memory. The display unit 2230 may be a display screen or the like. The image collection unit 2240 may be a camera or the like. The audio unit 2250 may include a microphone, a speaker, and the like. The communications unit 2260 may include a mobile communications unit and/or a wireless communications unit.

For example, the processing unit 2210 is a processor (the processor 110 shown in FIG. 3), the storage unit 2220 may be a memory (the internal memory 121 shown in FIG. 3), and the display unit 2230 may be a display screen (the display screen 194 shown in FIG. 3). The image collection unit 2240 may be a camera (the camera 193 shown in FIG. 3). The audio unit 2250 may be an audio module (the audio module 170 shown in FIG. 3). The communications unit 2260 may include a mobile communications unit (the mobile communications module 150 shown in FIG. 3) and a wireless communications unit (the wireless communications module 160 shown in FIG. 3). The electronic device 2200 provided in this embodiment of this application may be the electronic device 100 shown in FIG. 3. The foregoing processor, memory, display screen, camera, audio module, mobile communications unit, wireless communications unit, and the like may be connected to each other by using, for example, a bus.

An embodiment of this application further provides a chip system. The chip system includes at least one processor and at least one interface circuit. The processor may be interconnected to the interface circuit by using a line. For example, the interface circuit may be configured to receive a signal from another apparatus (for example, a memory of an electronic device). For another example, the interface circuit may be configured to send a signal to another apparatus (for example, a processor). For example, the interface circuit may read instructions stored in the memory and send the instructions to the processor. When the instructions are executed by the processor, the electronic device may be enabled to perform the steps in the foregoing embodiments. Certainly, the chip system may further include another discrete device. This is not specifically limited in this embodiment of this application.

An embodiment of this application further provides a computer-readable storage medium. The computer-readable storage medium includes computer instructions. When the computer instructions run on the foregoing electronic device, the electronic device is enabled to perform the functions or steps performed by the mobile phone in the foregoing method embodiments.

An embodiment of this application further provides a computer program product. When the computer program product runs on a computer, the computer is enabled to perform the functions or steps performed by the mobile phone in the foregoing method embodiments.

It may be clearly understood by a person skilled in the art from the description of the foregoing implementations, for convenience and brevity of description, only division of the foregoing functional modules is used as an example for description. In actual application, the foregoing functions may be allocated to different functional modules for implementation according to a requirement, that is, an internal structure of an apparatus is divided into different functional modules, to complete all or some of the functions described above.

In the several embodiments provided in this application, it should be understood that the disclosed apparatus and method may be implemented in other manners. For example, the apparatus embodiments described above are merely examples. For example, division of the modules or the units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented by using some interfaces, and indirect couplings or communication connections between apparatuses or units may be implemented in an electrical, mechanical, or another form.

The units described as separate parts may or may not be physically separate, and parts displayed as units may be one or more physical units, that is, may be located in one place, or may be distributed in a plurality of different places. Some or all of the units may be selected according to an actual requirement to achieve the objectives of the solutions in the embodiments.

In addition, the functional units in the embodiments of this application may be integrated into one processing unit, each unit may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the methods described in embodiments of this application. The storage medium includes various media that can store program code, for example, a USB flash drive, a removable hard disk, a read-only memory (read only memory, ROM), a random access memory (random access memory, RAM), a magnetic disk, or an optical disk.

The foregoing content is merely specific implementations of this application, but the protection scope of this application is limited thereto. Any variation or replacement made within the technical scope disclosed in this application shall fall within the protection scope of this application. Therefore, the protection scope of this application shall be subject to the protection scope of the claims.

What is claimed is:

1. A video processing method, applied to an electronic device, wherein the electronic device comprises a photographing apparatus, and the method comprises:
    in response to an operation of starting to record a video, collecting, by the electronic device, image frames based on a first frame rate by using the photographing apparatus;
    when receiving an operation of ending recording of the video, stopping, by the electronic device, collecting image frames, and generating a first video file, wherein the first video file comprises a first video part comprising first image frames and a second video part comprising second image frames, and the first image frames comprise a specified action;
    processing, by the electronic device, the first video file to generate a second video file, wherein the second video file comprises a third video part and the second video part, the third video part is obtained by processing the first video part, and a quantity of image frames in the third video part is different from a quantity of image frames in the first video part; and
    playing, by the electronic device, the second video file based on the first frame rate.

2. The method according to claim 1, wherein after the processing, by the electronic device, the first video file, the method further comprises:
    when receiving an operation of sharing the video, forwarding, by the electronic device, the second video file.

3. The method according to claim 1- or 2, wherein before the processing, by the electronic device, the first video file, the method further comprises:
    marking, by the electronic device, the image frames in the first video file that comprise the specified action, and generating mark information.

4. The method according to claim 3, wherein the mark information comprises specified-action start information and specified-action end information.

5. The method according to claim 3- or 4, wherein before the marking, by the electronic device, the image frame in the first video file that comprise the specified action, the method further comprises:
    performing resolution reduction processing on image frames collected by the photographing apparatus, to obtain corresponding low-resolution image frames; and
    detecting the specified action in the low-resolution image frames.

6. The method according to claim 3, wherein the method further comprises:
    obtaining, by the electronic device, the first video part based on the mark information and the first video file.

7. The method according to claim 3, wherein the method further comprises:
    when receiving an operation of editing the video, displaying, by the electronic device, a first interface, wherein the first interface comprises some or all image frames of the first video file; and
    when receiving an operation in which a user modifies, in the first interface, an image frame interval range comprising the specified action, updating, by the electronic device, the mark information based on a modified image frame interval range comprising the specified action.

8. The method according to claim 1, wherein before the processing, by the electronic device, the first video file, the method further comprises:
    receiving an operation of playing the video.

9. The method according to claim 1, wherein
the processing, by the electronic device, the first video file comprises: performing, by the electronic device, frame interpolation processing on the first video file, wherein
playing duration of the second video file is greater than shooting duration of the first video file.

10. The method according to claim 1, wherein
the processing, by the electronic device, the first video file comprises: performing, by the electronic device, frame extraction processing on the first video file, wherein
playing duration of the second video file is less than shooting duration of the first video file.

11. The method according to claim 9, wherein the electronic device comprises a recording apparatus, and the method further comprises:
    in response to the operation of starting to record the video, collecting, by the electronic device, audio frames by using the recording apparatus;
    when receiving the operation of ending recording of the video, stopping, by the electronic device, collecting audio frames, and generating first audio frames in the first video file, wherein the first audio frames comprise a first audio part corresponding to the first video part on a timeline and a second audio part corresponding to the second video part on the timeline;

performing speech recognition on the first audio part, and generating text corresponding to a first audio sub-part that is in the first audio part and that comprises a speech; and when the electronic device plays the second video file, displaying the text in a caption form in a first video sub-part in the third video part, wherein the first video sub-part in the third video part is obtained by performing frame interpolation processing on a second video sub-part in the first video part, and the second video sub-part is image frames corresponding to the first audio sub-part on the timeline.

12. The method according to claim 11, wherein duration of the first audio sub-part is first duration, display duration of the text is N times the first duration, and N is a frame interpolation multiple of frame interpolation processing.

13. The method according to claim 11, wherein duration of an audio frame corresponding to first text in the text is first duration, display duration of the first text is N times the first duration, and N is a frame interpolation multiple of frame interpolation processing.

14. The method according to claim 1, wherein the first frame rate is 24 frames per second.

15. A video processing method, applied to an electronic device, wherein the method comprises:

obtaining, by the electronic device, a first video file, wherein the first video file comprises first image frames and first audio frames, and a shooting frame rate of the first image frames is a first frame rate, wherein the first audio frames comprise a first audio part comprising second audio frames and a second audio part comprising third audio frames, and the third audio frames comprise a speech; and the first image frames comprise a first video part comprising second image frames and a second video part comprising third image frames, the second image frames correspond to the second audio frames on a timeline, and the third image frames correspond to the third audio frames on the timeline;

processing, by the electronic device, the first video file to generate a second video file, wherein the second video file comprises a third video part and the second video part, the third video part is obtained by processing the first video part, and a quantity of image frames in the third video part is different from a quantity of image frames in the first video part; and playing, by the electronic device, the second video file based on the first frame rate.

16. The method according to claim 15, wherein after the processing, by the electronic device, the first video file, the method further comprises:

when receiving an operation of sharing the video, forwarding, by the electronic device, the second video file.

17. The method according to claim 15, wherein the method further comprises:

when playing the third video part in the second video file, stopping, by the electronic device, playing audio frames; and when playing the second video part in the second video file, playing, by the electronic device, the third audio frames.

18. The method according to claim 17, wherein the method further comprises:

when playing the third video part in the second video file, playing, by the electronic device, a soundtrack at first volume; and when playing the second video part in the second video file, playing, by the electronic device, the soundtrack at second volume, wherein the second volume is less than the first volume, and the second volume is less than playing volume of the third video frames.

19. The method according to claim 15, wherein the processing, by the electronic device, the first video file comprises: performing, by the electronic device, frame interpolation processing on the first video file, wherein playing duration of the second video file is greater than shooting duration of the first video file.

20. An electronic device, wherein the electronic device comprises a processor and a memory, the processor is coupled to the memory, the memory is configured to store computer program code, the computer program code comprises computer instructions, and when the processor executes the computer instructions, the electronic device is enabled to perform the method according to claim 1.

* * * * *

UNITED STATES PATENT AND TRADEMARK OFFICE
CERTIFICATE OF CORRECTION

PATENT NO.       : 12,483,671 B2
APPLICATION NO.  : 18/269894
DATED            : November 25, 2025
INVENTOR(S)      : Cui et al.

Page 1 of 1

It is certified that error appears in the above-identified patent and that said Letters Patent is hereby corrected as shown below:

In the Claims

In Column 42, in Claim 3, Line 6, delete "claim 1- or 2," and insert -- claim 1, --.

In Column 42, in Claim 5, Line 15, delete "claim 3- or 4," and insert -- claim 3, --.

Signed and Sealed this
Twentieth Day of January, 2026

John A. Squires
*Director of the United States Patent and Trademark Office*